US006924893B2

(12) United States Patent
Oldenbourg et al.

(10) Patent No.: US 6,924,893 B2
(45) Date of Patent: Aug. 2, 2005

(54) ENHANCING POLARIZED LIGHT MICROSCOPY

(75) Inventors: Rudolf Oldenbourg, Falmouth, MA (US); Mykhailo Shribak, Woods Hole, MA (US); Clifford C. Hoyt, Wellesley, MA (US); Peter Török, London (GB)

(73) Assignee: Marine Biological Laboratory, Woods Hole, MA (US)

( * ) Notice: Subject to any disclaimer, the term of this patent is extended or adjusted under 35 U.S.C. 154(b) by 0 days.

(21) Appl. No.: 10/435,929

(22) Filed: May 12, 2003

(65) Prior Publication Data

US 2004/0125373 A1 Jul. 1, 2004

Related U.S. Application Data

(60) Provisional application No. 60/379,967, filed on May 13, 2002.

(51) Int. Cl.[7] .................................................. G01J 4/00
(52) U.S. Cl. ...................................................... 356/369
(58) Field of Search ................................ 359/237, 238, 359/240, 245, 246, 249, 251, 276, 256–259, 279–284, 298, 290–292, 296–304, 316, 368, 321–324, 371, 386, 299, 301, 315; 356/364–370

(56) References Cited

U.S. PATENT DOCUMENTS

| | | | |
|---|---|---|---|
| 4,561,731 A | 12/1985 | Kley | 350/510 |
| 4,852,985 A | 8/1989 | Fujihara et al. | 350/523 |
| 5,150,234 A | 9/1992 | Takahashi et al. | 359/65 |
| 5,381,253 A * | 1/1995 | Sharp et al. | 349/18 |
| 5,420,717 A | 5/1995 | Tabata | 359/371 |
| 5,521,705 A | 5/1996 | Oldenbourg et al. | 356/364 |
| 5,835,166 A * | 11/1998 | Hall et al. | 349/15 |
| 5,956,145 A * | 9/1999 | Green et al. | 356/364 |
| 6,034,776 A * | 3/2000 | Germer et al. | 356/369 |
| 2002/0176645 A1 * | 11/2002 | Wein et al. | 385/11 |

* cited by examiner

*Primary Examiner*—Zandra V. Smith
*Assistant Examiner*—Gordon J. Stock, Jr.
(74) *Attorney, Agent, or Firm*—Wilmer Cutler Pickering Hale and Dorr LLP

(57) ABSTRACT

A microscope system for determining optical properties of a specimen includes a source of polarized light, a detector for detecting the intensity of light incident thereon, an optical path extending from the source to the detector, a condenser for providing light from the source to the specimen, an objective for receiving light from the specimen, a support for mounting the specimen, a sectored variable retarder mounted in the optical path, and a polarized light analyzer mounted in the path between the sectored variable retarder and the detector. The variable retarder has a multiple sectors. Each sector is individually addressable by a control signal that affects the light retardation characteristics of the sector.

37 Claims, 29 Drawing Sheets

| MASK ON GROUND ELECTRODE LAYERS | MASK ON PATTERN ELECTRODE LAYERS |
|---|---|
| LC-B 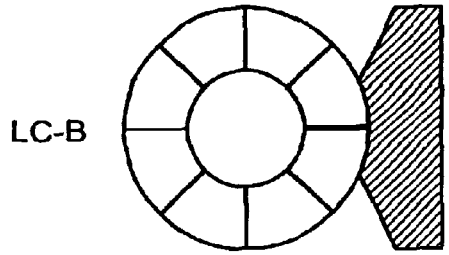 | 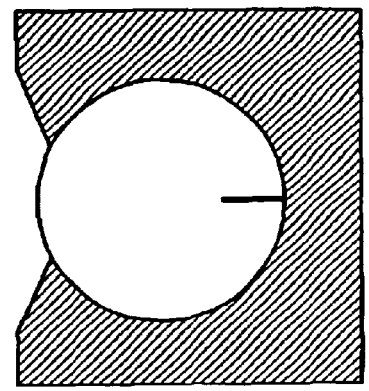 |
| LC-A 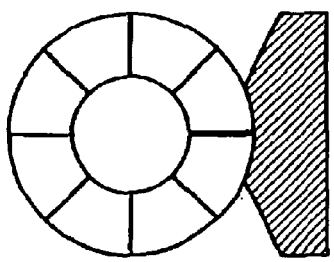 | 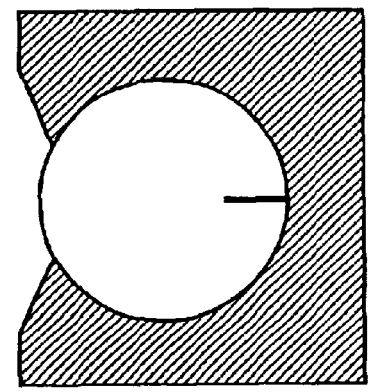 |
| LC-M 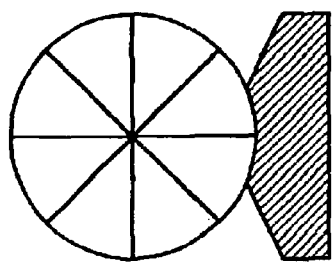 | 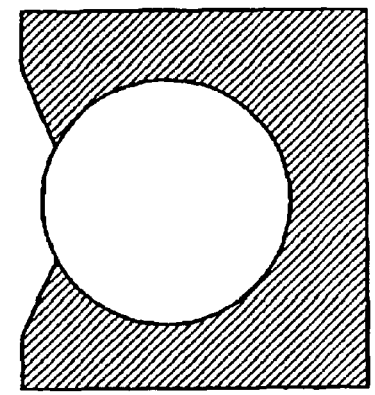 |
FIG. 3A

| | GROUND TRANSPARENT ELECTRODE LAYERS | PATTERN TRANSPARENT ELECTRODE LAYERS |
|---|---|---|
| LC-B | 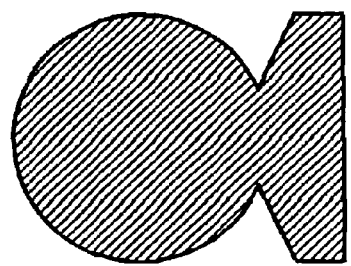 | 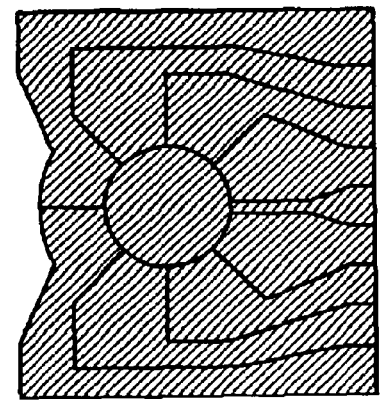 |
| LC-A | 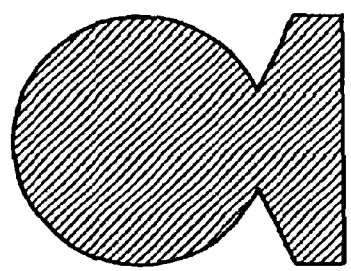 | 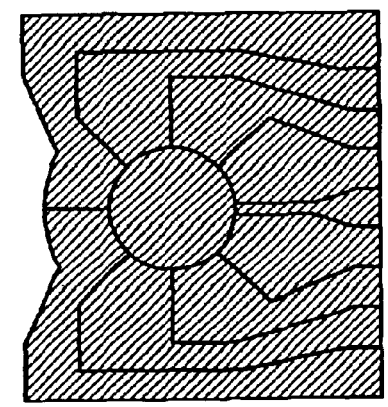 |
| LC-M | 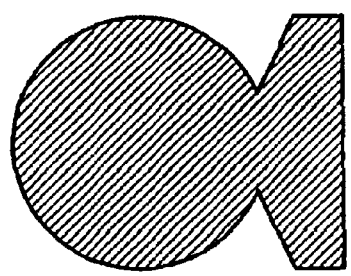 | 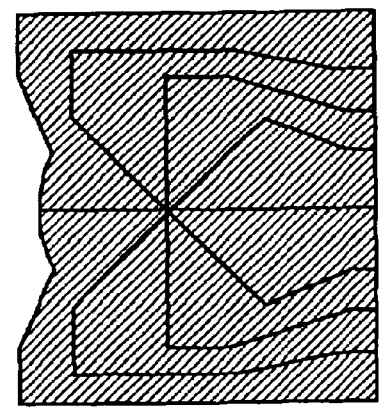 |
FIG. 3B

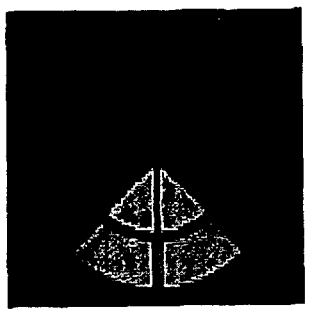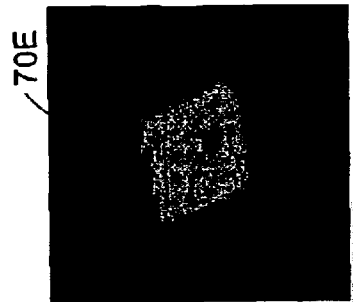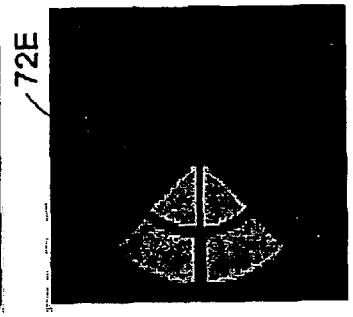
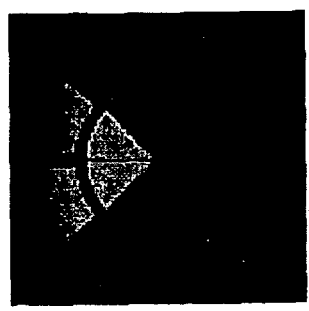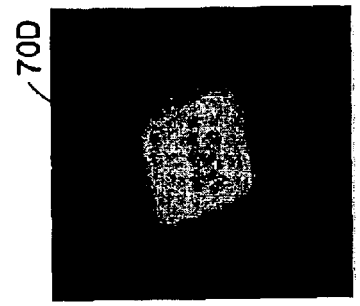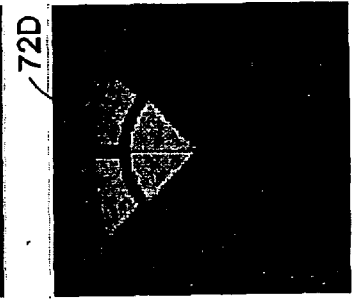
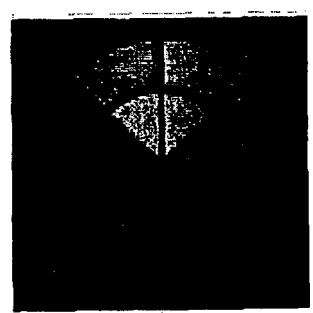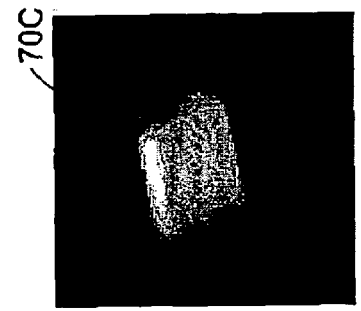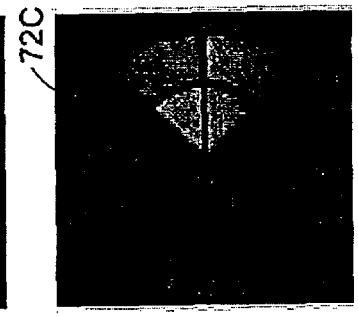
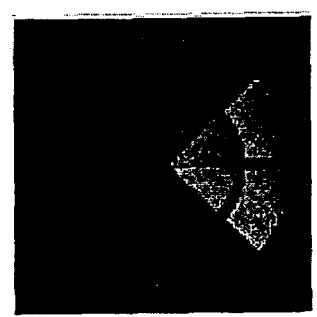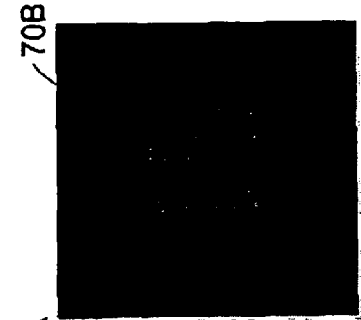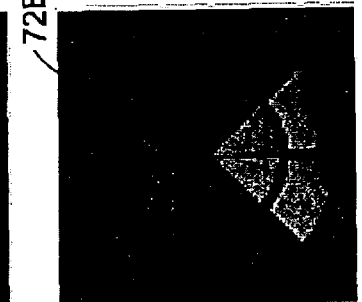
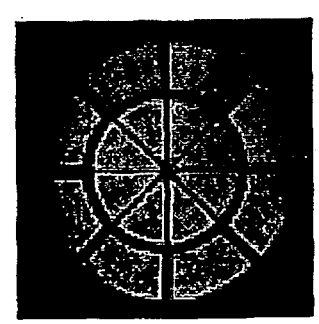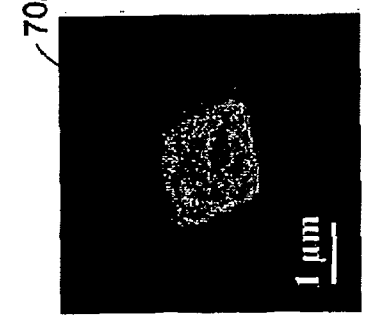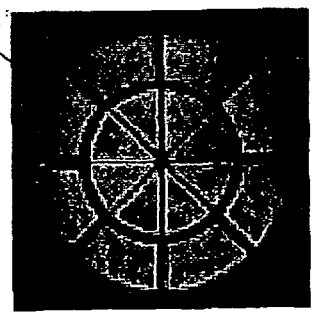
FIG. 6     FIG. 7

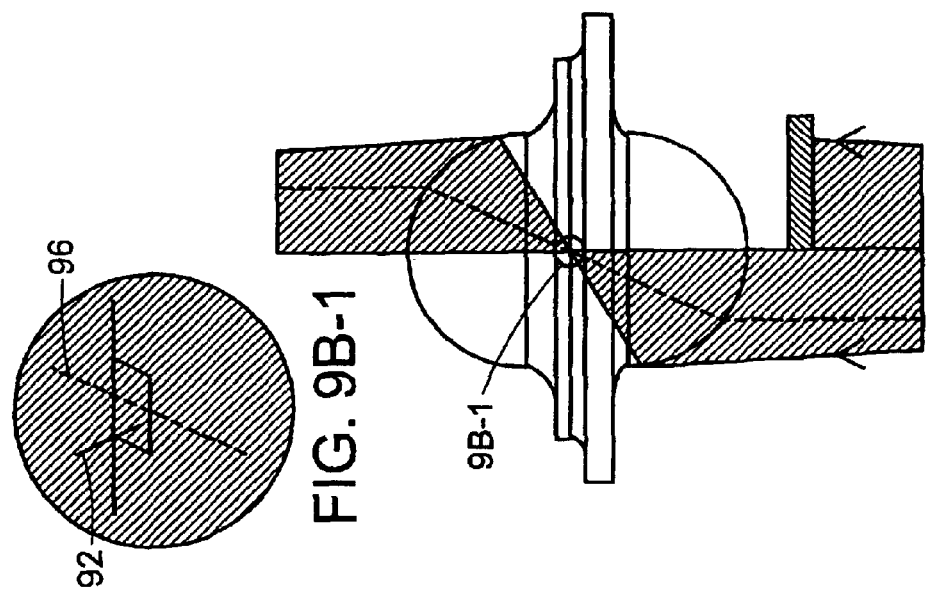
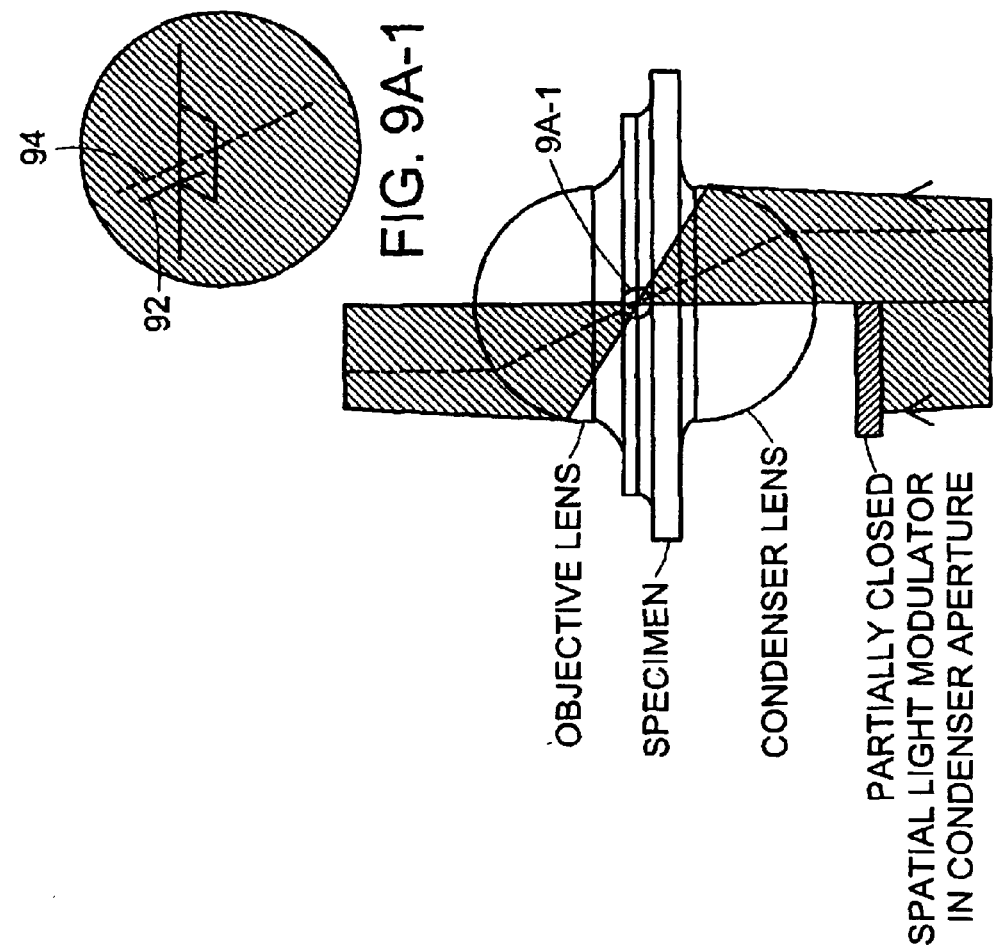

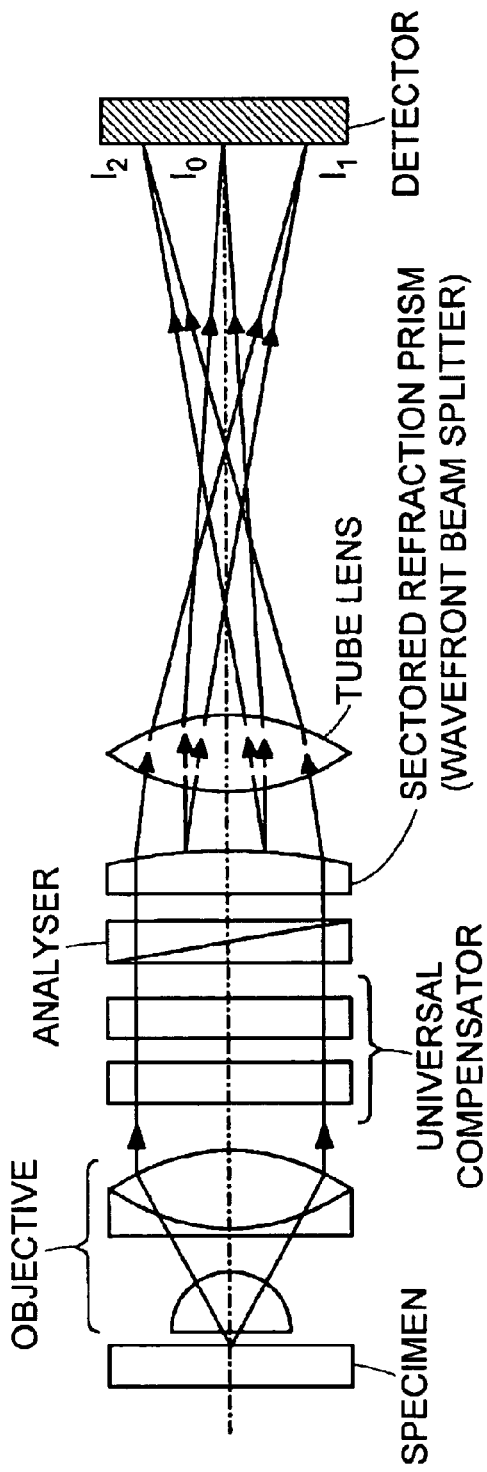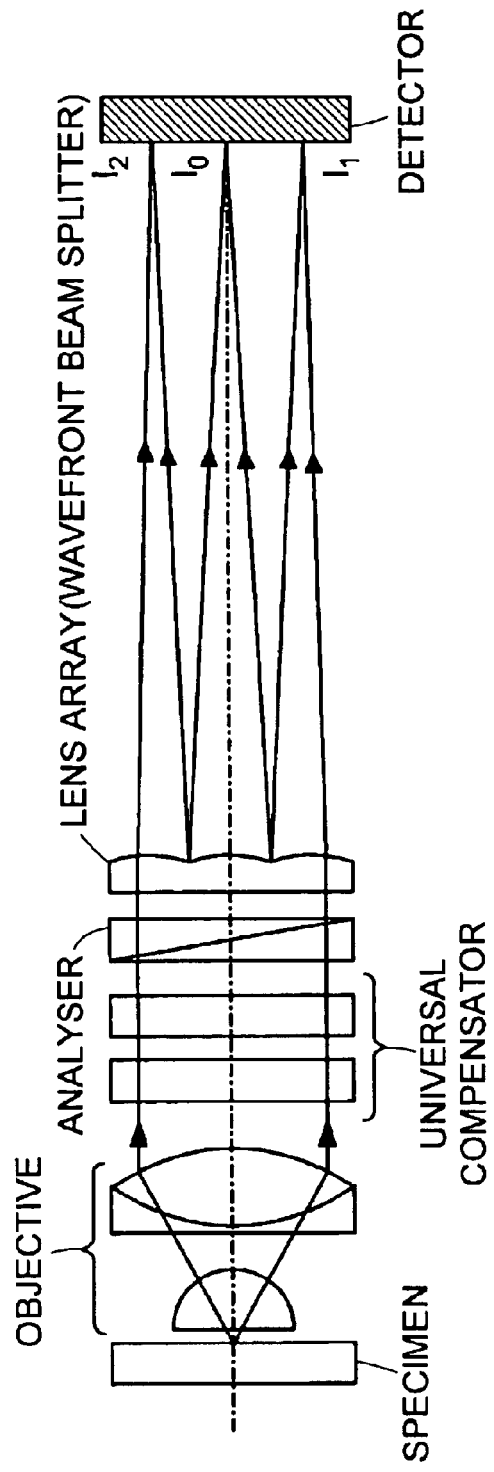
FIG. 24A
FIG. 24B

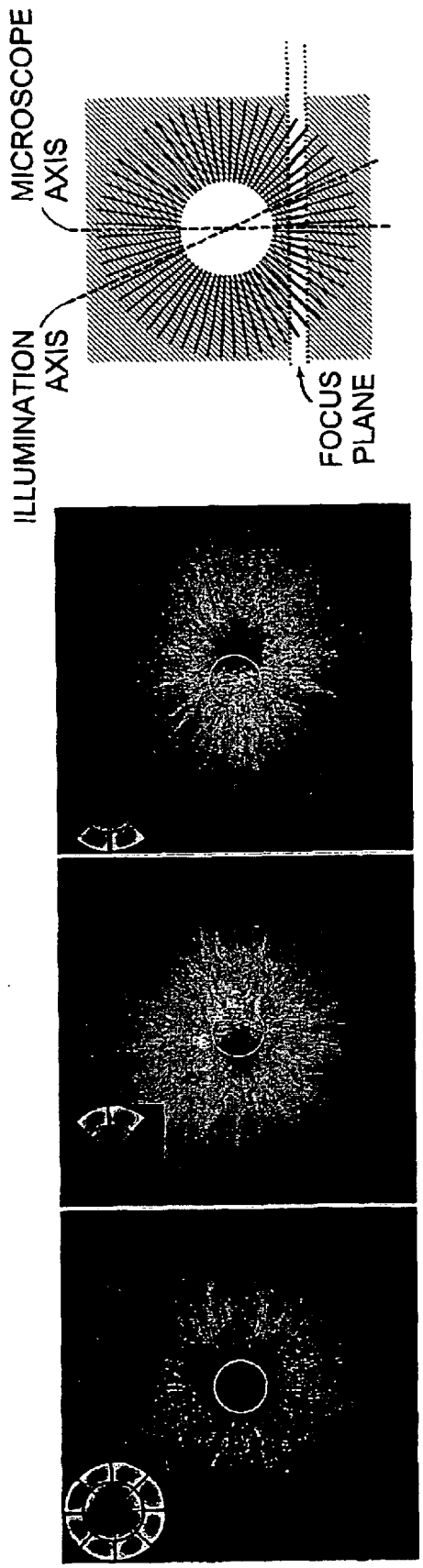
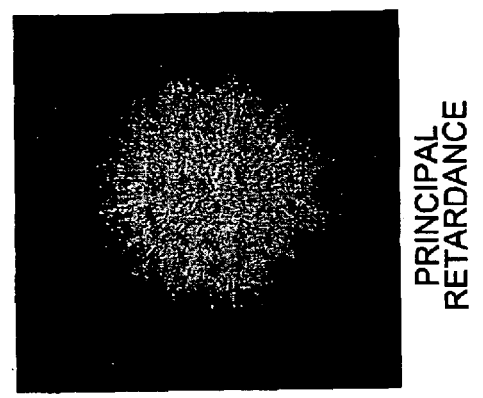
FIG. 26D
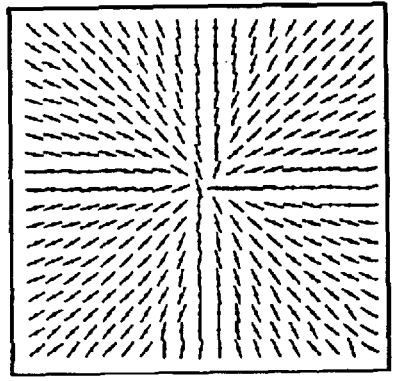
PRINCIPAL RETARDANCE
FIG. 26G
AZIMUTH ORIENTATION
FIG. 26F
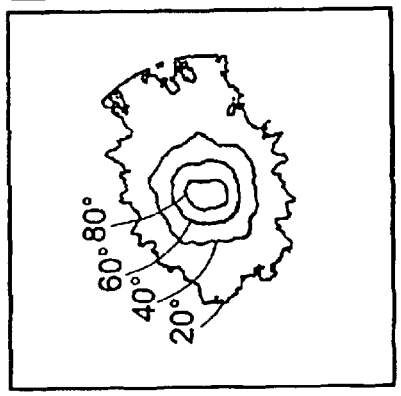
INCLINATION ANGLE
FIG. 26E

ENHANCING POLARIZED LIGHT MICROSCOPY

CROSS-REFERENCE TO RELATED APPLICATION

This application claims the benefit of U.S. Provisional Application Ser. No. 60/379,967 entitled "APERTURE SCANNING DEVICE" filed on May 13, 2002, which is incorporated herein by reference in its entirety.

GOVERNMENT SUPPORT

This invention was supported, in whole or in part, by grant GM 49210 from the National Institutes of Health. The government has certain rights in the invention.

BACKGROUND OF THE INVENTION

This invention relates to polarized light and, more particularly, to enhancing polarized light microscopy.

A polarized light microscope system ("pol-scope") has the ability to measure submicroscopic subjects such as molecular arrangements dynamically and non-destructively, e.g., in living cells and other specimens. For at least this reason, the pol-scope has been widely used in biological research, as described in U.S. Pat. No. 5,521,705 to Oldenbourg, et al., entitled "Polarized light microscopy", ("the '705 patent") which is incorporated herein by reference, and in the publications discussed below, which are incorporated herein by reference.

The use of video cameras to record images of birefringent specimens with the polarized light microscope was described by Allen and collaborators (Allen, R. D., J. L. Travis, N. S. Allen and Ho Yilmaz. 1981. Video-enhanced contrast polarization (AVEC-POL) microscopy: A new method applied to the detection of birefringence in the motile reticulopodial network *Allogromia laticollaris, Cell Motil.* 1:275–289) and by Inoué (1981. Video image processing greatly enhances contrast, quality and speed in polarization-based microscopy. *J. Cell Biol.* 89:346–356). To measure specimen birefringences from recorded images one can use a predetermined calibration curve to relate measured intensities to specimen birefringences in different parts of the image (Schaap, C. J. and A. Forer. 1984. Video digitizer analysis of birefringence along the length of single chromosomal spindle fibres. *Cell Sci.* 65:21–40). This method is relatively fast, but may be subject to errors from variations in light intensities that stem from other sources than birefringence, e.g., light scattering or shading. In a study on edge birefringence, Oldenbourg recorded images of a given specimen at several different compensator settings and used a stack of images to compute the specimen birefringences independent of the overall intensity and the background light in different parts of the viewing field. Oldenbourg, R. 1991. Analysis of edge birefringence. *Biophys. J.* Vol. 60 page 629.

With the traditional pol-scope, thus, single images display only those anisotropic structures that have a limited range of orientations with respect to the polarization axes of the microscope. Furthermore, rapid measurements are restricted to a single image point or single area that exhibits uniform birefringence or other form of optical anisotropy, while measurements comparing several image points take an inordinately long time.

The '705 patent describes a pol-scope that permits data collection and determination of anisotropic structures (e.g., specimen birefringence) irrespective of orientation and over a wide range of magnitude. The '705 patent pot-scope has the sensitivity to observe biological cells and tissue structures that are otherwise either difficult to see or require staining or labeling with exogenous dyes for adequate contrast. The '705 patent pol-scope allows measurement of the birefringence magnitude and the orientation of the birefringence axes in the specimen, thus providing information on the submicroscopic alignment of molecular bonds and fine structural form.

A principal axis of alignment, or birefringence axis, is determined in the plane perpendicular to a microscope axis. Methods are currently available for observing the birefringence component parallel to the microscope axis. One such method, called conoscopic imaging, is typically applied to single crystals. Another method uses a special universal rotation stage known as Fedoroff universal stage (A. N. Winchell, *Elements of Optical Mineralogy*, 1931, New York: John Wiley & Son, at least at pp. 60, 209) that includes two glass hemispheres encapsulating the specimen. Neither method is compatible with biological specimens which typically require immersion objectives for high resolution imaging (which is incompatible with the universal rotation stage) and which include many birefringent structures that are too faint to observe conoscopically.

In addition, with regard to industrial applications such as rock and soil analysis for oil exploration, a typical analysis of rock samples with a polarizing microscope is a labor-intensive process yielding the orientation of one microcrystal at a time. A thin rock section is mounted on a special universal rotation stage and the sample is viewed under different tilt angles (Hartshorne, N. H. and A. Stuart. 1960. *Crystals and the Polarising Microscope: A Handbook for Chemists and Others*. London, Arnold.).

Further, the purity of the polarization is dependent on the characteristics of light extinction in the pol-scope. In general, the higher the extinction, the better the purity and uniformity of the polarization. Polarization distortions may result from reduced extinction caused by a high numerical aperture objective and condenser lenses of the microscope optics. For example, the aperture plane of the '705 patent pol-scope equipped with high angle (NA) lenses and crossed circular polarizers would, without polarization distortions, produce an aperture plane image that would be completely dark. Instead, towards the periphery the plane is brighter because light rays that pass through the periphery of the optical system pick up polarization distortions (Shribak, M., S. Inoué and R. Oldenbourg. 2002. Polarization aberrations caused by differential transmission and phase shift in high NA lenses: theory, measurement and rectification. *Opt. Eng.* 41: 943–954).

SUMMARY OF THE INVENTION

In an aspect of the invention, an optical system includes at least one sectored variable retarder having at least two sectors. The light retardation characteristics of each sector is affected by a control signal specific to each sector. For example, an optical system may include two sectored variable retarder plates, together constituting a sectored universal compensator, and at least one retarder plate may have at least two sectors. In the example, a first set of control signals may affect the light retardation characteristics of the sectors of the first retarder plate and a second set of control signals may affect the light retardation characteristics of the sectors of the second retarder plate.

In another aspect of the invention, a microscope system also includes a condenser lens for providing light from at least one sectored variable retarder to the specimen and an objective lens for receiving light transmitted through, reflected, scattered, or reemitted by the specimen. For example, a microscope system for use in observing a specimen may include a light source and a polarizer for receiving light from the light source and two sectored variable retarder plates for receiving light from the polarizer. In the example, the variable retarder plates may have many sectors that can be individually addressed, and a first set of control signals may affect the light retardation characteristics of the sectors of the first retarder plate and a second set of control signals may affect the retardation characteristics of the sectors of the second retarder plate. The example system also includes a condenser lens for providing light from the sectored variable retarder to the specimen, an objective lens for receiving light transmitted through, reflected, scattered, or reemitted by the specimen, a polarizer for receiving light from the objective lens and a detector for detecting the intensity of light incident thereon. In case of inelastic scattering or reemission from the specimen, such as Raman scattering or fluorescence excitation, appropriate wavelength filters can be added to enhance the performance of the system. One wavelength filter may be mounted between light source and condenser lens for selecting a range of excitation wavelengths, while a different wavelength filter may be mounted between objective and detector to make the detection process specific to a range of emission wavelengths.

In another aspect of the invention, at least one sectored variable retarder plate is located between the specimen under investigation and the detector. For example, a microscope system includes a light source, a polarizer, a condenser lens for providing light to the specimen and an objective lens for receiving light transmitted through, reflected, scattered, or reemitted by the specimen. Light from the objective lens passes through two sectored variable retarder plates constituting a sectored universal compensator. The variable retarder plates may have many sectors that can be individually addressed, and a first set of control signals may affect the light retardation characteristics of the sectors of the first retarder plate and a second set of control signals may affect the retardation characteristics of the sectors of the second retarder plate. The example system also includes a polarizer for polarization analysis and a detector for detecting the intensity of the light. The example system can also include wavelength filters to select specific wavelength ranges for the light that is illuminating the specimen and for the detected light from the specimen.

In another aspect of the invention, an optical system includes a spatial light modulator having an aperture that is divided into at least two sectors. The light attenuation and/or propagation direction is affected by each sector. For example, an optical system may include a polarizer, a sectored variable retarder followed by another polarizer. Said sectored variable retarder plate sandwiched between two polarizers can serve as a means to control the amount of light passing through different regions of the second polarizer.

In another aspect of the invention, a microscope system includes at least one spatial light modulator and at least one variable retarder plate with at least one sector. At least one spatial light modulator is used to control the direction of light propagation in the optical system, and at least one variable retarder plate with at least one sector is used to affect the polarization state of light. For example, a microscope system for use in observing a specimen may include a light source, a first polarizer for receiving light from the light source, a first sectored variable retarder plate for receiving light from the first polarizer, a second polarizer for receiving light from the first sectored retarder, and a second and third sectored variable retarder plate constituting a universal compensator and receiving light from the second polarizer. In the example, the variable retarder plates may have many sectors that can be individually addressed, and a set of control signals may affect the light retardation characteristics of the sectors of the retarder plates. The example system also includes a condenser lens for providing light from the universal compensator to the specimen, an objective lens for receiving light transmitted through, reflected, scattered, or reemitted by the specimen, a polarizer for receiving light from the objective lens and a detector for detecting the intensity of light incident thereon. The example system can also include wavelength filters to select specific wavelength ranges for the illuminating and the detected light.

In another aspect of the invention, a method is provided for use in suppressing depolarization in an optical system. An optical system may induce polarization distortions in light rays that have passed through system elements such as lenses. To counteract said polarization distortions, an optical system may include at least one sectored variable retarder plate, and each retarder plate may have several sectors that can be individually addressed. For example, two sectored variable retarder plates are used together constituting a sectored universal compensator. A first set of control signals may affect the light retardation characteristics of the sectors of the first retarder plate and a second set of control signals may affect the light retardation characteristics of the sectors of the second retarder plate. For use in suppressing depolarization, a universal compensator is positioned in the optical system so that rays that have experienced similar polarization distortions pass through the same region of the universal compensator. For example, in a microscope optical system, an objective lens is provided that is positioned in an optical path such that light from an object is collected by the objective lens, and a condenser lens is provided that is positioned in the optical path such that light that is incident on the object has passed through the condenser lens. The combination of the objective lens and the condenser lens has distortive polarization characteristics such that light rays that pass through the periphery of both lenses acquire polarization distortions. A sectored universal compensator is appropriately positioned in the optical path such that light that is incident on the condenser lens has passed through the sectored universal compensator. In one example, the sectored universal compensator is positioned in or near the front focal plane of the condenser lens. In another example, the sectored universal compensator is positioned in or near the back focal plane of the objective lens. In either example, rays that have experienced similar polarization distortions pass through the same sector of the universal compensator. The method provides for setting said control signals that affect the polarization characteristics of light that has passed through sectors of the universal compensator in such a way that said polarization characteristics at least partially counteract said polarization distortions.

In another aspect of the invention, a method is provided for determining polarization properties of light from an object. A detector detects the intensity of light incident thereon. An optical path extends from the object to the detector. One or more sectored variable retarder plates are positioned in the optical path such that light from the object that is incident on the detector has passed through said retarders in the path. For example, two sectored variable retarder plates are used together constituting a sectored universal compensator. A polarized light analyzer receives light that has passed through said retarders. A third sectored variable retarder plate may be positioned after the polarizer and a second polarizer receives light from the third light retarder. For each light retarder a set of control signals may affect the light retardation characteristics of the sectors of the retarder plate. Said optical path may also include an objective lens that is positioned between the object and the first light retarder. The method provides for setting said control signals as to determine the intensity and polarization state of light that originate from the object and has passed through sectors of the variable retarder plates.

In another aspect of the invention, a first method is provided for determining polarization optical properties of an object. A light source is provided and a detector for detecting the intensity of light incident thereon. An optical path extends from the light source to the detector. An optical system including an object under investigation and at least one sectored variable retarder plate is positioned in the optical path such that light from the light source that is incident on the detector has passed through said optical system. For example, a microscope optical system is provided in which light from the light source is passed through a polarizer. From the polarizer light may be received by a first sectored variable retarder plate followed by a second sectored variable retarder plate together constituting a sectored universal compensator. For each light retarder a set of control signals may affect the light retardation characteristics of the sectors of the retarder plate. A condenser lens receives the light from the sectored universal compensator and focuses it into the specimen. Light that has passed through the specimen is collected by an objective lens and projected onto the detector. Before the light hits the detector it passes through a polarization analyzer. The method provides for setting said control signals as to determine the intensity and polarization state of light that has passed through sectors of the variable retarder plates, through the specimen and the polarization analyzer. The method further provides for measurements of polarization optical properties of said specimen based on measurements of said intensity and polarization states.

In another aspect of the invention, a second method is provided for determining polarization optical properties of an object. The second method makes use of at least one spatial light modulator. A light source is provided and a detector for detecting the intensity of light incident thereon. An optical path extends from the light source to the detector. An optical system including an object under investigation, at least one spatial light modulator and at least one variable retarder plate that has at least one sector is positioned in the optical path such that light from the light source that is incident on the detector has passed through said optical system. For example, a microscope optical system is provided in which light from the light source is passed through a polarizer. From the polarizer light may be received by a first sectored variable retarder plate followed by a second polarizer. Light from the polarizer may be received by two sectored variable retarder plates together constituting a sectored universal compensator. For each light retarder a set of control signals may affect the light retardation characteristics of the sectors of the retarder plate. A condenser lens receives the light from the sectored universal compensator and focuses it into the specimen. Light that has passed through the specimen is collected by an objective lens and projected onto the detector. Before the light hits the detector it passes through a polarization analyzer. The method provides for setting said control signals as to determine the intensity and polarization state of light that has passed through sectors of the variable retarder plates, through the specimen and the polarization analyzer. The method further provides for measurements of polarization optical properties of said specimen based on measurements of said intensity and polarization states.

Other advantages and features will become apparent from the following description, including the drawings, and from the claims.

BRIEF DESCRIPTION OF THE DRAWINGS

FIGS. 2A–2B, 3A–3C, 4, 9A–9B diagrammatically illustrate portions of a polarizing microscope embodying the present invention.

FIGS. 5A–5B, 6 illustrate displays of aperture planes produced by a polarizing microscope embodying the present invention.

FIG. 7 illustrates displays of crystal retardance measured using the present invention.

FIGS. 23, 24A, 24B illustrate optical systems in which a spatial light modulator is constructed of an assembly of mirrors, prisms, and/or lenses to redirect different portions of the aperture light field into separate directions.

FIGS. 26A–26G illustrate the measured magnitude and orientation of retardance of an aster.

DETAILED DESCRIPTION

Systems

Figure 1:
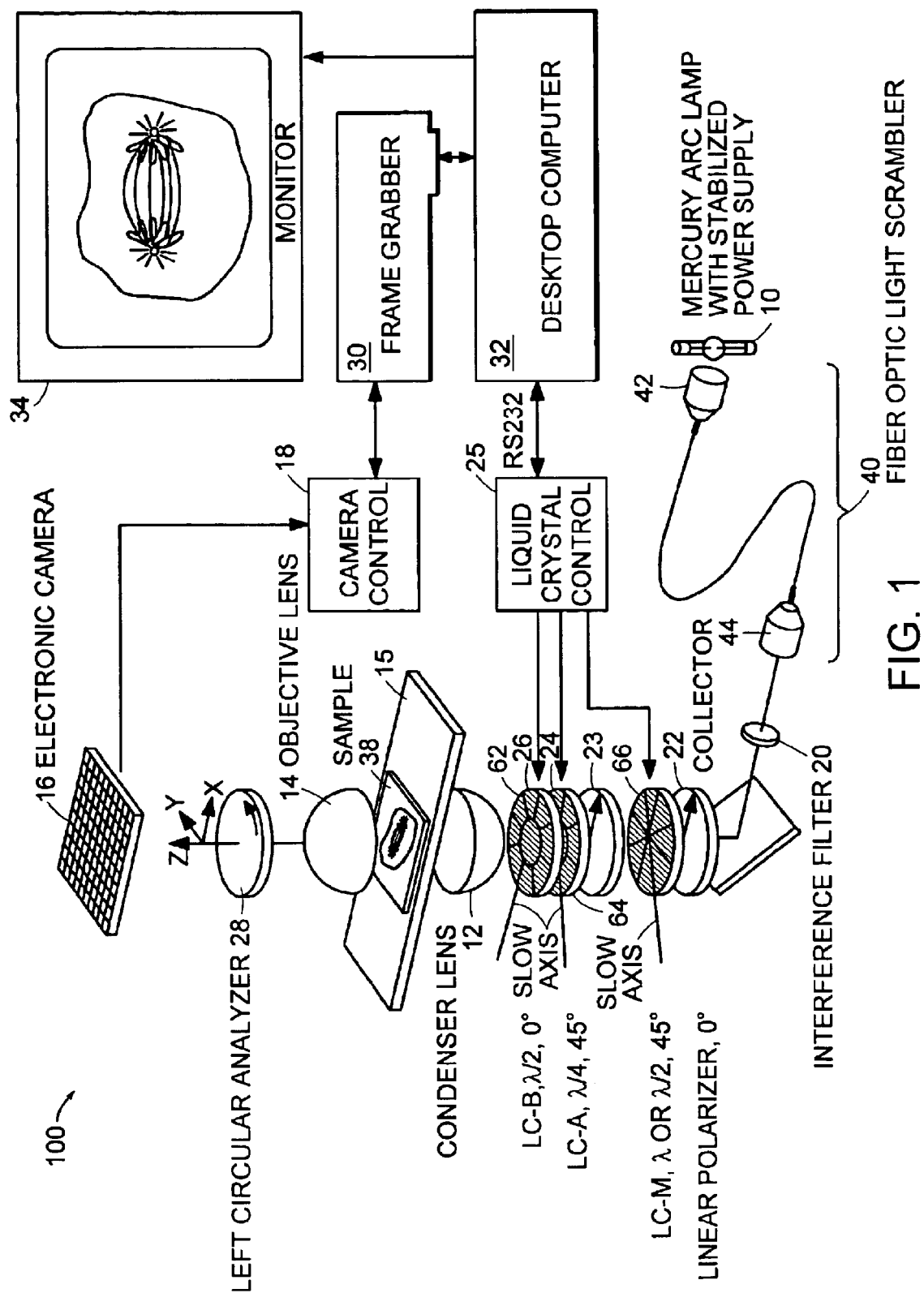
FIG. 1 schematically illustrates a polarizing microscope embodying the present invention.

FIG. 1 illustrates an example 100 of an enhanced pol-scope of the present invention which includes sectored components as described below. The enhanced pol-scope of FIG. 1 is built using a conventional optical microscope such as a Zeiss Axiovert 200. In at least one embodiment, the enhanced pol-scope has, in addition to enhanced components as described below, one or more components that are described in U.S. Pat. No. 5,521,705 to Oldenbourg, et al., entitled "Polarized light microscopy" ("the '705 patent"). As described in the '705 patent, the conventional microscope includes a mercury arc lamp 10, a condenser lens 12, and an objective lens 14 (e.g., a 100×1.30-NA Plan Neofluar objective lens) on opposite sides of a specimen 38 on slide 15. The light from a specimen is directed to a video CCD camera 16 which provides signals to camera control 18 (e.g., a Dage-MTI model CCD-300).

As described below, the enhanced pol-scope includes enhancements to electro-optical components, image acquisition procedures, and data analysis/reduction methods, which allow the enhanced pol-scope to achieve higher resolution, higher sensitivity, and measurement of optical parameters in three-dimensional space.

Figure 2A:
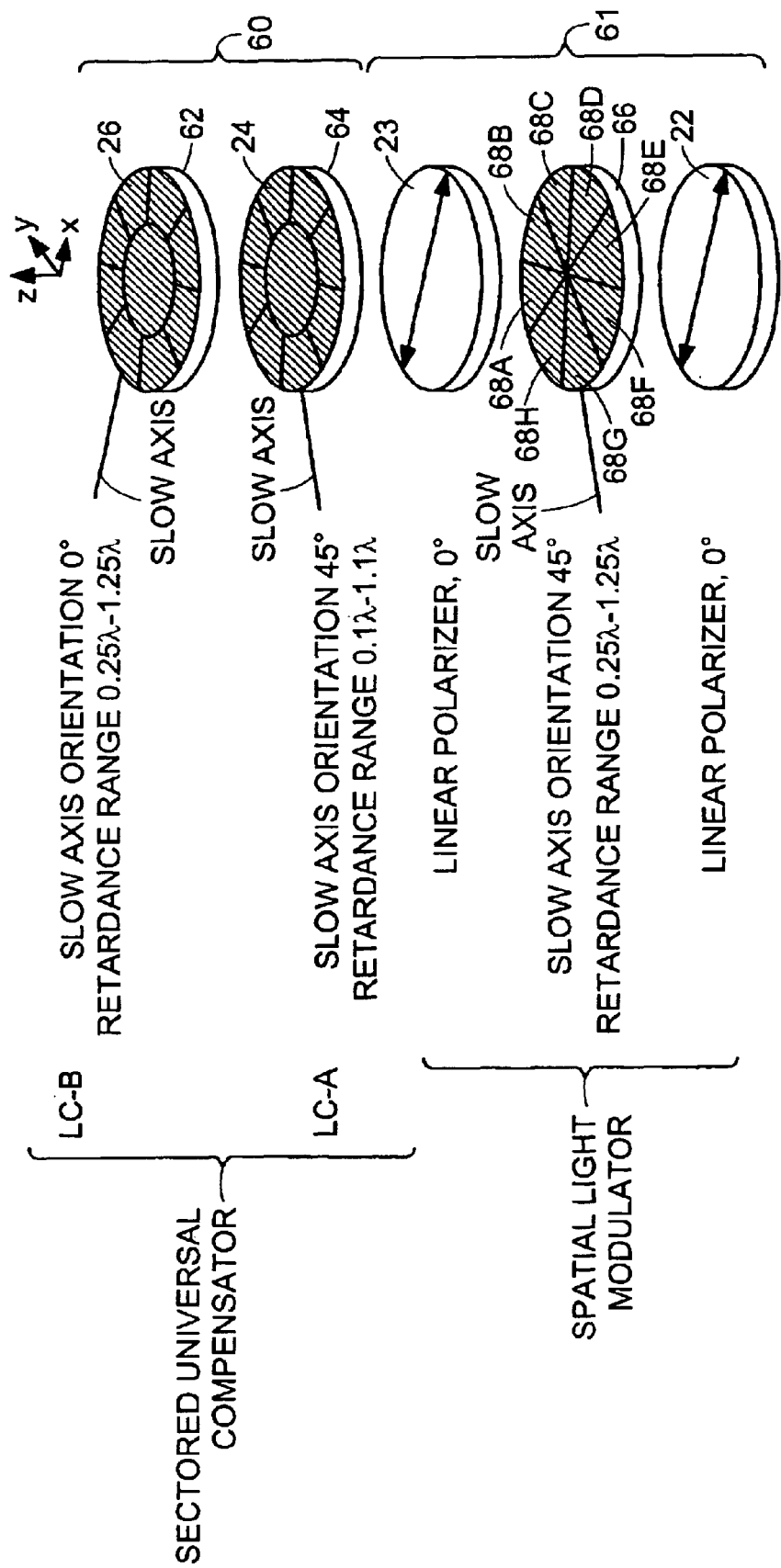

According to the enhanced pol-scope system in this embodiment of the present invention, the light path between the mercury arc lamp 10 and video camera 16 also includes, on the illumination side of the condenser lens 12, an interference filter 20, first and second linear polarizers 22, 23 (mounted with their axes at 0 degrees to a reference axis), a sectored universal compensator including a pair of sectored, variable, liquid crystal, electro-optical retarders 62, 64 (having pairs of corresponding retarder sectors such as sectors 24, 26 as described below in conjunction with FIG. 2A) with their principal slow axes positioned, respectively, at 0 degrees and 45 degrees to the reference axis, and a sectored variable retarder plate 66 that together with polarizers 22 and 23 represent a spatial light modulator. In the optical path on the imaging side of the specimen slide 15 and objective lens 14, i.e., between the objective lens and the video camera 16, is a left circular analyzer 28.

The sectored variable retarders 62, 64, and 66 are liquid crystal devices (e.g., constructed by Cambridge Research and Instrumentation, Inc. of Woburn, Mass.). Linear polarizers 22, 23 and circular analyzer 28 are located in the same positions in the optical path as are the polarizer and analyzer in a conventional microscope, but in conventional microscopes a linear analyzer is conventionally used and a specimen on slide 15 is illuminated with linearly polarized light. Circular polarizers are typically fabricated as a stack that includes a linear polarizer together with, and followed by, a quarter wave plate.

In addition, in the example embodiment of the enhanced pol-scope system, the two variable retarders 62, 64 are located in the illumination path between polarizer 23 and the condenser lens 12.

The example embodiment disclosed in FIG. 1 employs a transmission microscope in which the illuminating and imaging paths are on opposite sides of the specimen stage. As illustrated in connection with the transmission microscope systems of FIG. 1, a pair of variable retarders, a polarizing analyzer, and (depending on the particular embodiment) one or more other polarizing elements, are placed in the illumination and imaging paths.

Figure 2B:
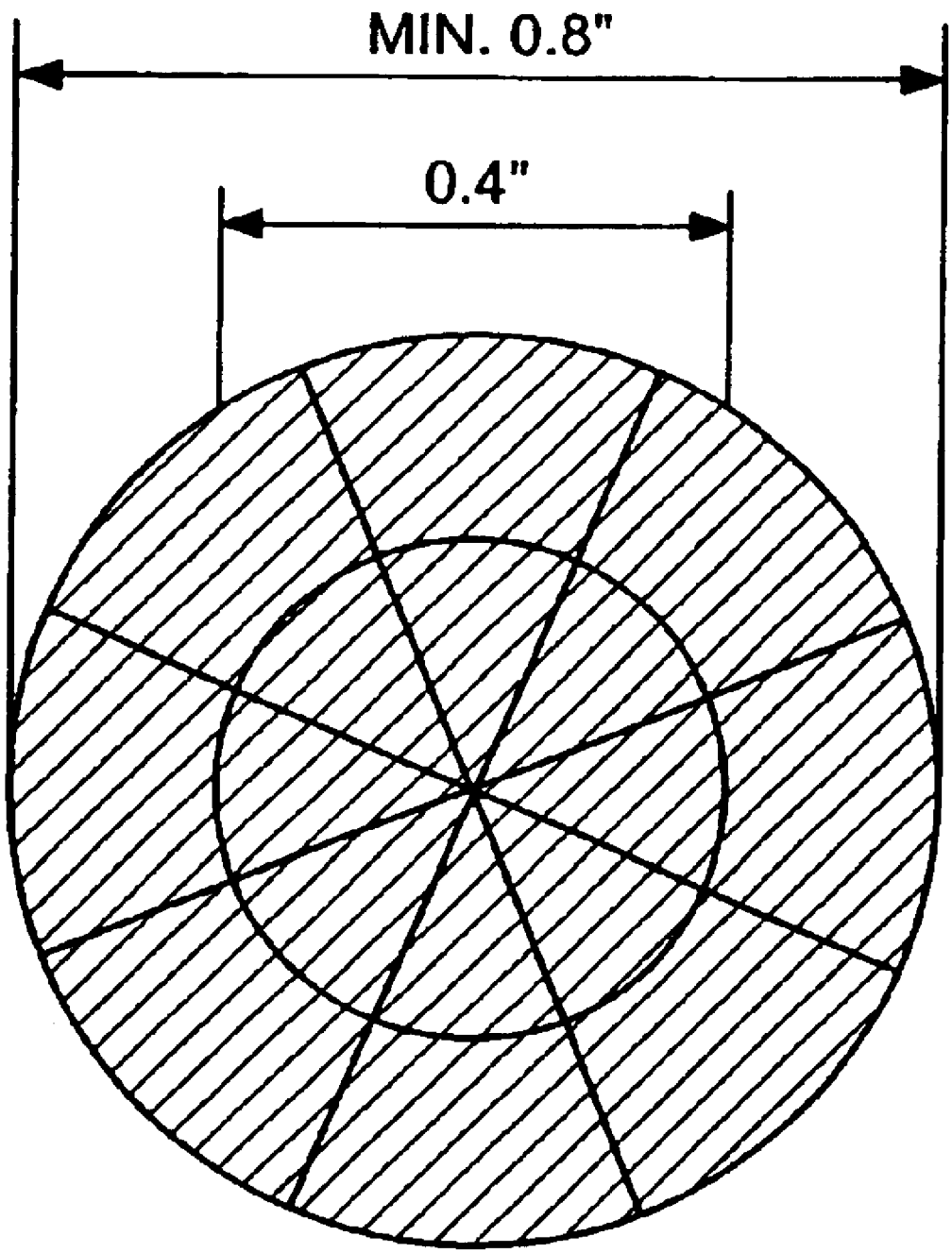

Referring also to FIGS. 2A and 2B, an exploded perspective view and a superimposed view, respectively, of sectored universal compensator 60, and spatial light modulator 61 are shown. In the example embodiment, as described in more detail below, each sector of sectored variable retarder plate such as sector 24 or 26 may retard and thus affect the polarization state of light passing through it. The extent to which the polarization state of the light passing through a particular retarder sector is changed, in both ellipticity and azimuth, can be controlled by varying the voltage applied to the retarder sector by liquid crystal control 25 as described below. In the example embodiment, corresponding sectored variable retarder plates are set with their slow axes at 45 degrees to each other. The corresponding pair of retarder sectors together is able to change the linear polarization of light that has passed through polarizer 23 into any elliptical polarization (including linear and circular) by changing the retardance levels of individual retarder sectors to appropriate values.

Liquid crystal and Pockel cell retarders can be built with precision quality suitable for imaging purposes. Liquid crystal retarders are made from nematic liquid crystals between optically flat, fused silica substrates with transparent front electrodes suitable for applying a voltage across the liquid crystal material. With a moderate voltage between 0 and 40 V, the liquid crystal reorients and the retardance of the assembly changes, e.g., in the range from 1100 nm to 100 nm. With a fixed retarder added in the subtractive position the useful retardance range can be changed to, e.g., from −500 to +500 nm. The typical response time is 40 ms, which is comparable to the time period of one video frame. Pockel cells, which are made from thin, Z-cut KD*P crystals, have a faster response time of 1 microsecond, and their retardance is controlled in the desired range by a high voltage between −1000 V and +1000 V. In Pockel cells, the retardance changes linearly with voltage. A similar birefringence retardation effect can be obtained from other devices such as stress optical and magneto-optical components.

In the example embodiment of FIG. 1, light produced by the mercury arc lamp 10 is first heat filtered, and a narrow wavelength band (e.g., 546 mm) is selected and passed, by filter 20. Liquid crystal variable retarder sector pairs (e.g., pair 24, 26) are initially set (i.e., by selection of the voltage applied to each by control 25) so that, for example, retarder sector 24 acts as a quarter wave (λ/4) plate and retarder sector 26 as a half wave (λ/2) plate. A mercury arc lamp 10 with stabilized power supply may be used as light source. A fiber optic light scrambler 40 with collector lenses 42, 44 may be used for even illumination of the condenser back aperture.

The monochromatic light from filter 20 is linearly polarized by linear polarizer 22. When set, for example, as a quarter wave plate, variable retarder plate 64 causes the linearly polarized light passed through it to become left circularly polarized. When set as a half wave plate, variable retarder plate 62 causes the left circularly polarized light passed through it to become right circularly polarized. The right circularly polarized light from retarder plate 62 illuminates a specimen 38 on slide 15, and the light traversing any region of a specimen is rendered elliptically polarized by any linear birefringence or dichroism of the specimen region traversed. Thus, the image formed by objective lens 14 (assuming specimen birefringence or similar anisotropy) contains elliptically polarized light. The amount of light from each specimen region that passes through left circular analyzer 28, and the intensity of the light that falls on each detector of the CCD detector array of video camera 16, depends on the extent of ellipticity of the light.

The images produced by the light incident on the detectors of the CCD detector array of video camera 16 may be recorded at a regular rate, e.g., 30 frames a second. Between frames, the voltages applied to retarder sector pairs (e.g., sectors 24, 26) may be changed, thus causing changes in the ellipticity of the light incident on the specimen and in the intensity of the light incident on the detector array of camera 16.

If, as in this embodiment, liquid crystal devices are employed as retarders, at least two frame periods may be required per measurement: one frame period for the retarders to settle to the new retardance values and another frame period to record the intensities. In at least some cases, for useful time resolution, the camera 16 has a high sensitivity and low read-out noise, to reduce the noise of a single frame, and little lag, to minimize the influence of the reading of one frame on the next. Also, high linearity is desirable between output voltage and light intensity falling on the face plate of the camera. These features can be provided by a CCD camera such as that described earlier.

The detector array of camera 16 is connected to camera control 18 for read out, and for setting camera parameters such as gain and black level. In the example embodiment, the images from the camera's detector array are transferred to a frame grabber device ("video board") 30 (e.g., a Scion AG-5 video board with 8 bit resolution) using the conventional RS-170 video standard. In video board 30, the signal is digitized and converted to a two-dimensional array of integer values representing the intensities in one frame. In the example embodiment, values in array elements (or pixels) are each 8 bit (equal to 1 byte) long to encode intensity values between 0 and 255. Each frame may include as many pixels as there are detector elements in the camera detector array, e.g., 680×480 pixels. Data from fewer detector elements may be processed in at least some cases, e.g., to increase the speed of operation. If, for example, the number of detector elements from which data is taken is such that one frame includes about 520×480 pixels, about 0.25 megabytes of memory space is required per frame.

From the video board, the data is passed to a desktop computer 32 (e.g., a Macintosh computer with PowerPC processor). The data can then be displayed on monitor 34, stored in computer memory and/or on removable media such as a hard or floppy disk, or transmitted across a network such as a local area network or the Internet. Computer 32 includes a serial (e.g., RS232) interface for communication with the liquid crystal controller 25. Controller 25 produces the necessary voltages required to set the retarder sectors to desired retardance values. In addition, the controller 25 includes a microprocessor for storing liquid crystal parameters and calibration curves and for facilitating liquid crystal control.

The optical arrangement shown in FIG. 1 is sensitive to the birefringence of specimen 38, and to the orientation of the fast and slow axes (principal axes) of the specimen. Hence, the intensity values of images recorded by camera 16 reflect both, the distributions of specimen retardance/birefringence (i.e., the birefringence in the portion of the specimen corresponding to each detector of the camera CCD array) and of the orientation of the principal axes. Birefringence and retardance are related. Birefringence $n_1 - n_2$ is an optical property of a specimen, where $n_1$ and $n_2$ are principal refractive indices of a birefringent medium (W. A. Shurcliff, Polarized Light, Production and Use. Cambridge, Mass.: Harvard University Press. 1962. p. 69).In case of a uniaxial specimen, $n_1$ and $n_2$ are the extraordinary and ordinary refractive indices, $n_e$ and $n_o$, respectively. Birefringence characterizes the amount of polarization anisotropy of the specimen structure (matter). Retardance $\Delta$ characterizes the phase change in radian that a birefringent specimen introduces between its eigenpolarization states of light passing through the specimen (R. Chipman, Polarimetry, in *Handbook of Optics*, Vol. II, 2nd edition, M. Bass. ed., McGraw-Hill, New York, 1995, p. 22.23). Retardance depends on the thickness d of the specimen in the direction of the passing ray, the wavelength $\lambda_0$ of the light ray in vacuum and the difference between the refractive indices n' and n":

$$\Delta = (n' - n'') d\, 2\pi/\lambda_0$$

In a uniaxial specimen, n' and n" are determined by the angle σ between the ray direction and the optical axis of the birefringent medium:

$$n' = \frac{n_o \cdot n_e}{\sqrt{(n_o \sin\sigma)^2 + (n_e \cos\sigma)^2}}$$

$$n'' = n_o$$

Also, a relative optical path-length difference $\Lambda$, which has a less strong dependence on wavelength, can be used for characterizing the polarizing properties of a specimen:

$$\Lambda = (n' - n'') d,$$

$\Lambda$ has the dimension of a distance, usually given in nm, and is related to $\Delta$ by:

$$\Lambda = \Delta\, \lambda_0/2\pi$$

Herein, the word retardance is used for both quantities, $\Lambda$ and $\Delta$, and where necessary the appropriate dimension, nm or radian, is given to clearly indicate which of the two quantities is referred to by the word retardance.

More specifically, quantities measured by at least one embodiment of the present invention are (1) the phase changes between eigenpolarization states of light passing through regions of a birefringent specimen and (2) the spatial orientation of the principal axes of the birefringent regions. For the sake of brevity and to avoid needless repetitions in this document, the phase changes are called retardance magnitude and the spatial orientation of principal axes is called retardance orientation.

The orientation of the principal axes are related to the optic axis of a birefringent region in the specimen as follows. The vibration direction of a wave that is refracted due to the ordinary refractive index $n_o = n'$ is normal to the optic axis. This direction is perpendicular to the vibration direction of a wave that is refracted due to the refractive index n'. This second vibration direction is parallel to the projection of the optic axis onto the plane perpendicular to the ray. The vibration directions are called the principal axes. For positive uniaxial birefringence, i.e. $n_e > n_o$, the extraordinary ray is retarded by a higher refractive index and therefore has a slower velocity. So in this case the "slow axis" is parallel to the projection of the optic axis. Likewise, for negative uniaxial birefringence the slow axis is perpendicular to the optical axis projection.

Figure 20A:
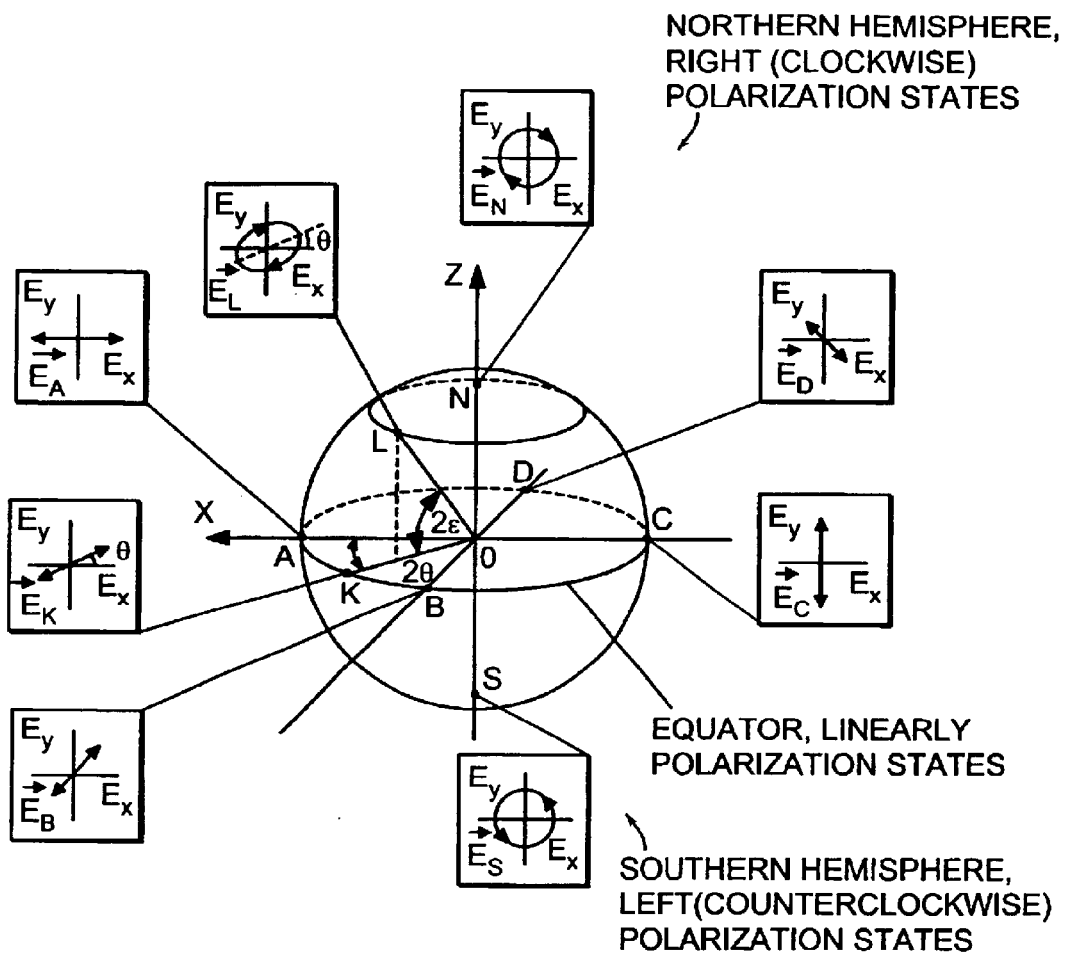
FIGS. 20A, 20B illustrate a Poincaré sphere as a graphical representation of all possible polarization states and 4 states used for measurement.

The light incident on and illuminating the specimen 38 is circularly polarized when the variable retarder sectors are at their initial settings, and is elliptically polarized if a different voltage is applied to the retarder sectors so that they provide a retardance different (e.g., more or less) than that produced at the initial settings. For example, by choosing settings between 0.1 λ and 1.1 λ for sectors in 64 and between 0.25 λ and 1.25 λ for sectors in 62, light that has passed through both pairs of sectors can have any desired polarization state. FIG. 20A illustrates all possible polarization states on a so-called Poincaré sphere.

The retardance (magnitude and azimuth) introduced by the specimen, regardless of orientation, can be compensated for by varying a specific voltage applied to one or both of the variable retarder sectors in a pair. For any given linear specimen retardance or birefringence, there is a setting (and retardance value) of each of the variable retarders or sectors that will cause the intensity of the beam passed through the output analyzer 28 to be at a minimum, or at extinction. These two retardance values (one for each of the variable retarder sectors) can be obtained without rotating either retarder sector, any polarizer, or the specimen. Instead, only the voltages applied to the variable retarder sectors are adjusted until minimum intensity or extinction is reached.

With the enhanced pol-scope, it is also possible to determine the orientation and magnitude of specimen retardance without having to determine variable retardance settings that result in minimum intensity (or extinction) of the light passing through analyzer 28. This possibility is particularly useful when the retardance of a specimen is not uniform over the entire viewing field. For example, in the example embodiment of FIG. 1 the following four retardance settings of sectors in 62 and 64 can be used for analyzing the retardance in each resolved specimen point. Initially, the light incident on and illuminating the specimen 38 can be circularly polarized essentially causing extinction of the light by the analyzer 28 if the specimen has zero retardance. The so-called extinction setting is characterized by $\lambda/4$ retardance of sectors in 64 and $\lambda/2$ retardance of sectors in 62. Other sector retardances can be referenced to the extinction setting and can be characterized by a differential retardance or swing value. The swing value is subtracted or added to the extinction setting to produce illuminating light with elliptical polarizations of the kind illustrated in FIG. 20B. For circular polarization ($\Sigma_0$ in FIG. 20B) sectors in 64 have $\lambda/4$ retardance and sectors in 62 have $\lambda/2$ retardance ($\Sigma_0$: 64, $\lambda 4$; 62, $\lambda/2$). For the elliptically polarized states in FIG. 20B the following sector retardances apply: ($\Sigma_1$: 64, $\lambda/4$-swing; 62, $\lambda/2$), ($\Sigma_2$: 64, $\lambda/4$+swing; 62, $\lambda/2$), ($\Sigma_3$: 64, $\lambda/4$; 62, $\lambda/2$-swing). The preferred swing value depends on the range of the specimen retardances to be measured. Typical swing values are chosen in the range from 0.02 to 0.2 wavelength. For each of the four settings an image of the specimen can be recorded with the electronic camera 16 and intensity values can be used to analyze the magnitude and orientation of the birefringence retardation in each resolved specimen point.

Figure 4:
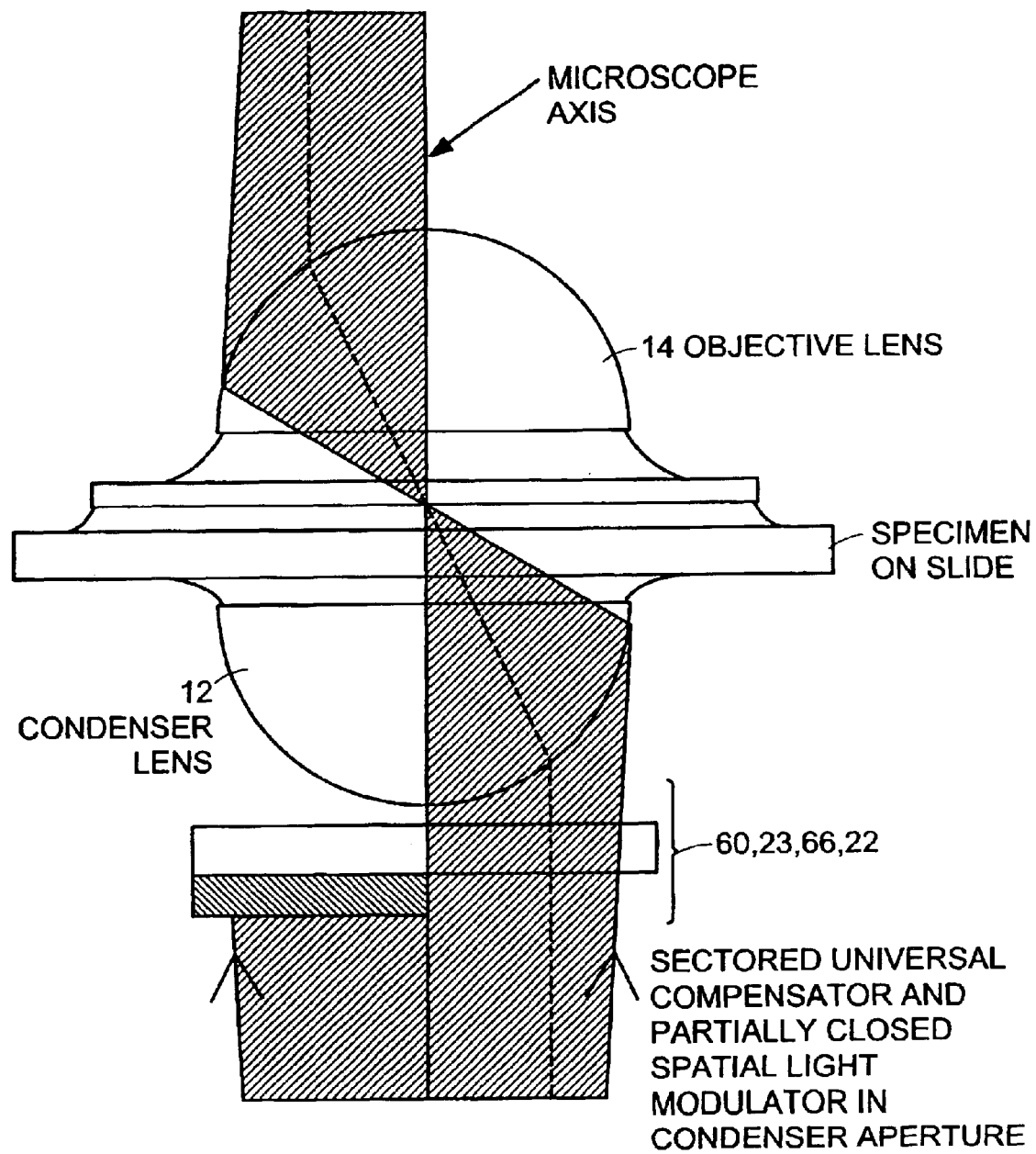

In the example embodiment, the enhanced pol-scope also includes sectored variable retarder plate 66 and polarizers 22 and 23. This assembly represents an example of a spatial light modulator which can be used to block light from regions of an aperture. For instance, by placing the modulator in the front focal plane of the condenser lens of a microscope system, the light path through the specimen can be tilted, as shown in FIG. 4. Tilting the light path has a similar effect as tilting the specimen. By tilting the light path the specimen retardance is measured with respect to a tilted reference system. By combining measurements that were recorded using at least two different tilt angles (possibly including zero tilt angle or fully open aperture), birefringence parameters can be determined that are related to the three dimensional optical indicatrix of the specimen.

Thus, according to at least one embodiment of the present invention, the intensity of the light passing analyzer 28 is measured at multiple predetermined settings of the variable retarder sectors, such as 24 and 26, and sectors 68A through 68H. While the spatial light modulator configuration is held constant, the settings of variable retarder sectors, such as 24 and 26, are changed and intensities are recorded as described before. Subsequently, a different spatial light modulator configuration is chosen and held constant while the settings of variable retarder sectors, such as 24 and 26, are changed again through a sequence of states. Typically, four intensity measurements are made for each spatial light modulator configuration. Based on the four intensity measurements, the specimen retardance (magnitude and/or orientation) is determined for each spatial light modulator configuration. As described later, the retardance measurements are combined to determine the three-dimensional birefringence parameters in each resolved specimen area.

In at least one implementation, the enhanced pol-scope may use a single acquisition and analysis process that applies a combination of conoscopic and orthoscopic observation methods for measuring three-dimensional polarization parameters of specimens. The enhanced pol-scope is used to measure three-dimensional birefringence parameters in a multitude of specimen points simultaneously. (As described below, the sectored variable retarders also improve the uniformity of the polarization states that are used to measure the specimen parameters.)

In the example embodiment, the sectored universal compensator 60 and the spatial light modulator 61 used by the enhanced pol-scope are built from retarders 62, 64, and 66 which may be liquid crystal (LC) variable retarder plates. In visual appearance, each LC retarder plate resembles a thin optical flat (e.g., having a thickness of ⅛ inches and a width of 2 inches) in which the liquid crystal material is sandwiched between two glass windows. The LC material is highly birefringent and has its slow axis oriented uniformly in one direction across the aperture.

The windows are coated with transparent electrodes that are used to apply an electric field across the thin layer of LC material. The electric field reorients the liquid crystal molecules from in the plane to perpendicular to the plane and reduces the retardance of the retarder plate. The higher the applied voltage, the less is the retardance of the plate. The retardance of a single device can typically be varied between ⅛ and 1.5 wavelength using voltages between 10 (1.5 $\lambda$) and 40 (⅛ $\lambda$) volts.

The sectored universal compensator and spatial light modulator use large diameter LC devices having uniform retardance and small wave front distortions across each sector suitable for imaging applications. The uniform retardance makes it possible to maintain a uniform and pure polarization state in a beam that traverses a single LC sector. As described in more detail below, the purity of the polarization is reliant on extinction characteristics and a more complete extinction leads to improved purity and uniformity.

In the example embodiment, each plate includes nine sectors, with each sector pair (e.g., pair 26, 24) being an individually addressable universal compensator (U.S. Pat. No. 5,521,705 to Oldenbourg, et al., entitled "Polarized light microscopy"). The sectors in each retarder plate 62 and 64 are defined by sections of the transparent electrodes. In each sector the electric field applied across the thin layer of LC material can be adjusted individually. Thus, the retardance magnitude of each sector can be adjusted individually. In a given retarder plate, the slow axis is oriented in the same direction in all sectors.

Figure 5B:
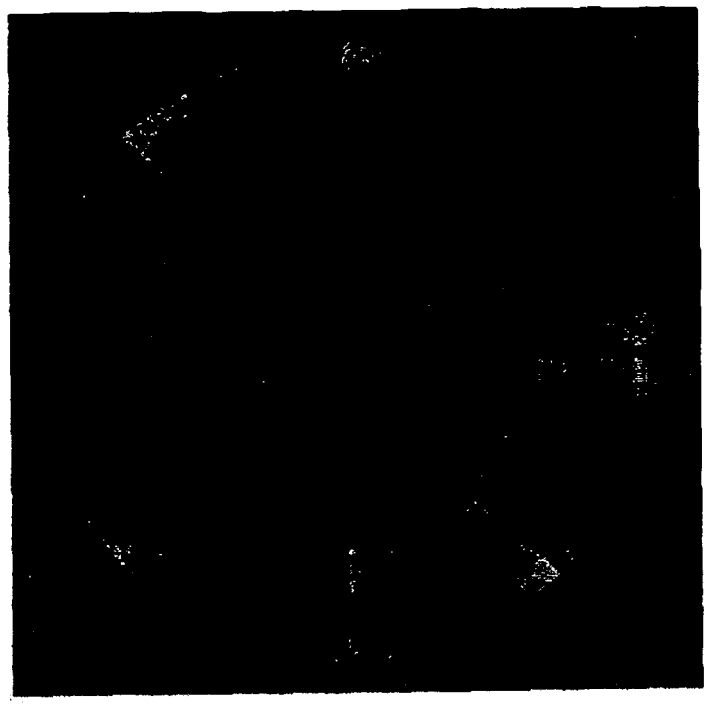
Figure 5A:
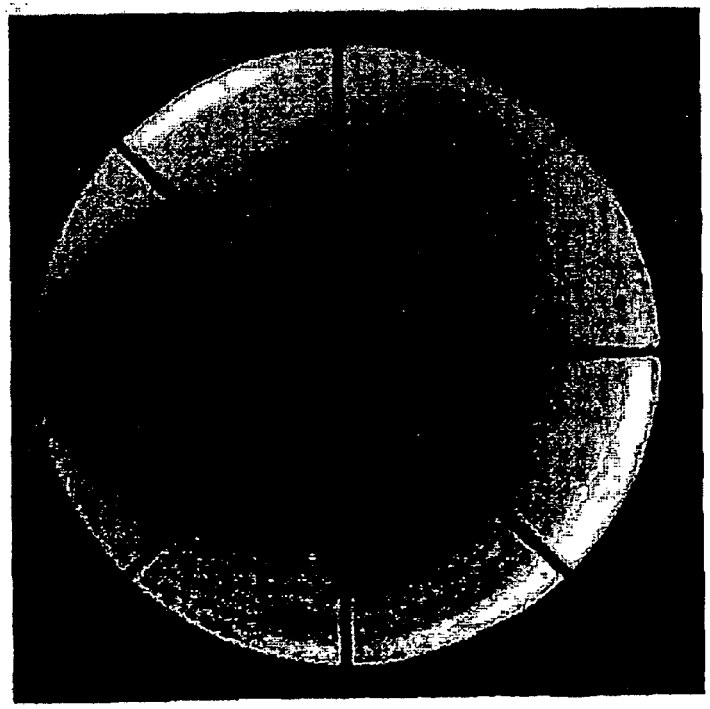

The sectored universal compensator can be used to counteract polarization distortions that adversely affect extinction. In particular, the retardance of each sector can be adjusted independently to counteract the distortions. FIGS. 5A, 5B show images of the aperture plane with the sectored universal compensator which can be used to rectify the polarization distortions that occur in peripheral rays. In the case of FIG. 5A, all nine sectors have the same retardance settings. In the case of FIG. 5B, the settings of the eight peripheral sectors are set (e.g., optimized) for high extinction.

In the example embodiment, the spatial light modulator 61 is built from the same type of LC device as the two variable retarder plates 62 and 64. When combined with the linear polarizers 22 and 23 as shown in FIG. 2A, the spatial light modulator 61 serves as a continuously adjustable light valve. For example, when sector 68A is set to half wavelength retardance, the polarization orientation of the linearly polarized light coming from polarizer 22 is flipped by 90° when leaving sector 68A. Light with this polarization orientation is blocked by polarizer 23. Therefore, sector 68A, when viewed between polarizers 22 and 23, appears dark. If, however, the retardance of sector 68A is set to zero or, e.g., a full wavelength, the polarization of light leaving the sector is parallel to polarizer 23, and the light passes through the polarizer and the sector appears bright. In general, settings other than half and full wavelength retardance induce elliptical polarization in light that passes the sector. Accordingly, the linear polarizer 23 only partially blocks the light. Hence, by continuously adjusting the retardance of sector 68A between a half wavelength and a full wavelength, for example, the sector together with polarizers 22 and 23 is a continuously adjustable light valve. This concept applies to all sectors 68A–68H which can all be used as individually adjustable light valves.

Sectors 68A–68H of sectored variable retarder plate 66 can also be used in imaging applications, e.g., to simulate rotation. FIG. 6 shows images based on mask 66, with the leftmost image depicting a fully open spatial light modulator 61, and the other images in rightward sequence depicting effectively a counterclockwise rotating quarter mask, with no mechanical rotation involved.

Figure 3C:
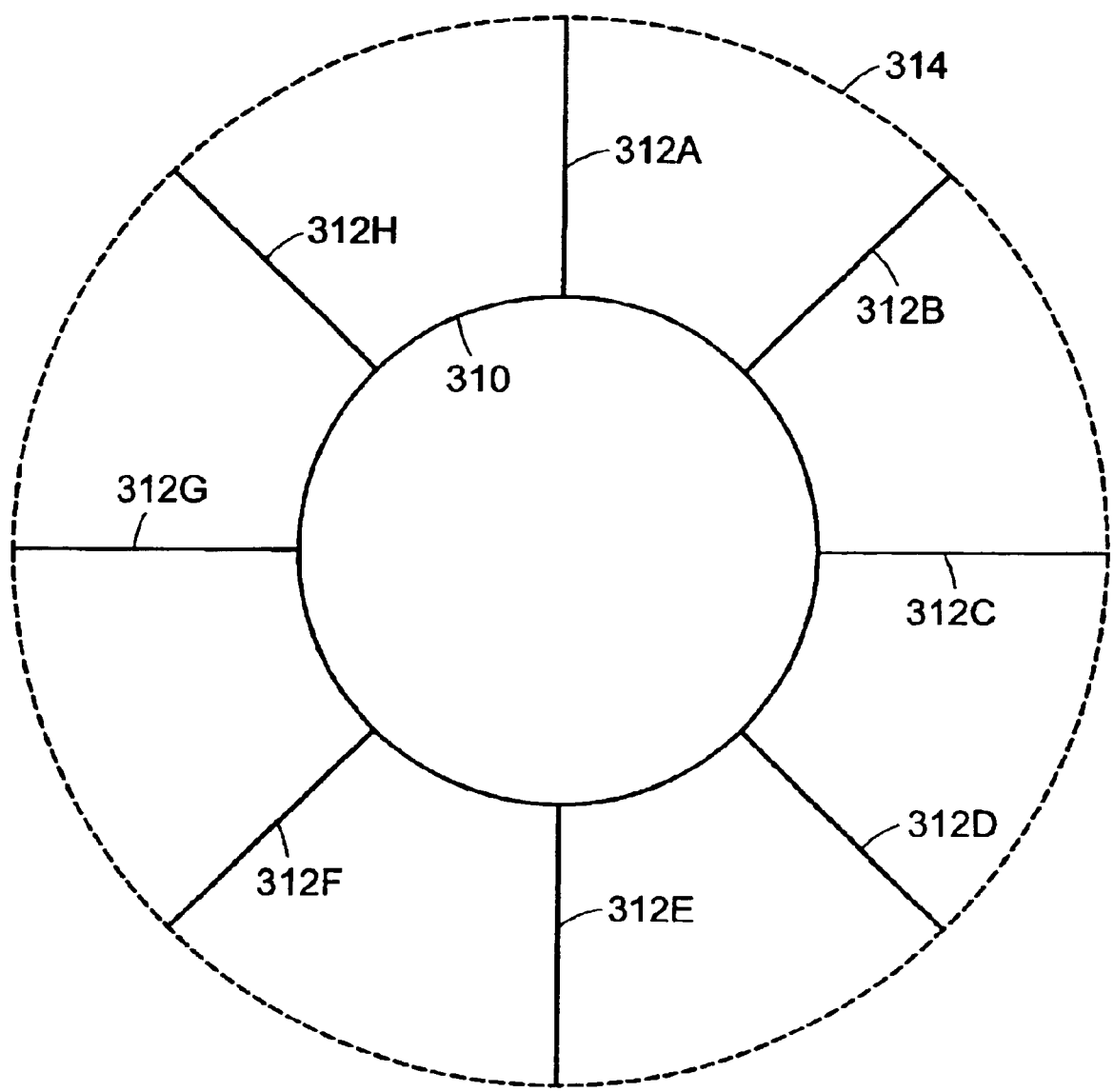

The stack of sectored liquid crystal retarder devices 62, 64, 66 (LC-B. LC-A. LC-M, respectively) and polarizers 22, 23 shown in FIG. 2A also includes blocking masks to block out seams between sectors, and antireflection coatings on both end surfaces. FIGS. 3A, 3B illustrate a chrome layer and indium tin oxide layer, respectively, and FIG. 3C illustrates an outline of a blocking mask. In the example embodiment, a central ring 310 has an inner diameter of 9.92 mm and an outer diameter of 10.42 mm, the width of radial lines 312A–312H is 0.5 mm, the diameter of a working area within dashed ring 314 is 24 mm, the transmittance of the chrome layer is less than 0.1%, the reflectance of the antireflection coating is less than 0.5% at 550 nm, the thickness of the glass substrate is 0.5 mm, and the diameter of the glass substrate is 32 mm.

Figure 27:
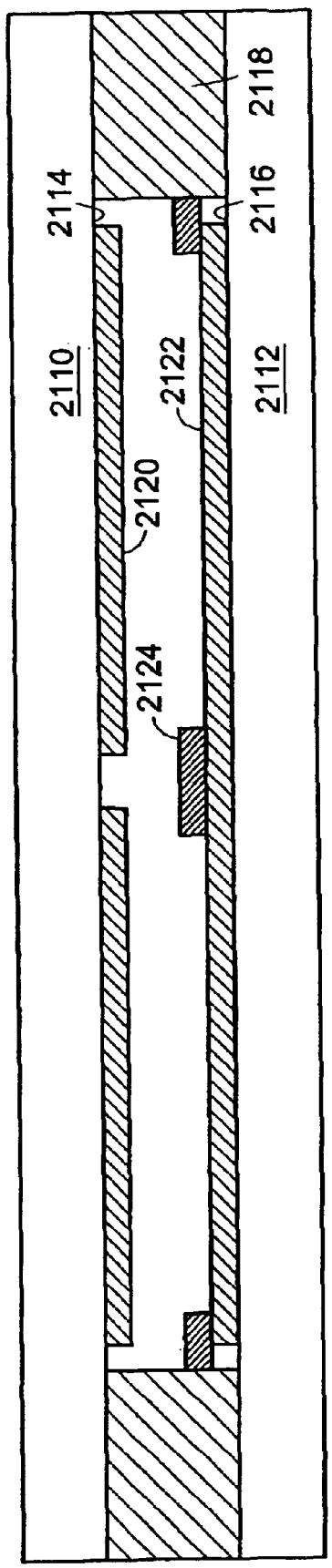
FIG. 27 illustrates example implementation details of a liquid crystal retarder.

FIG. 27 illustrates example implementation details of a liquid crystal retarder, e.g., retarder 62. Liquid crystal cell substrates 2110, 2112 are spaced apart by liquid crystal cell spacer/seal layer 2118. Substrates 2110, 2112 have respective inner surfaces 2114, 2116. A substantially uniform transparent electrode layer 2122 is disposed on inner surface 2116 and serves as a common ground plane for driving individual sectors of the liquid crystal device. Another transparent electrode layer 2120 is disposed on inner surface 2114 and is patterned to provide independent control of each sector. To help prevent light leakage through seams between sectors, a chrome pattern layer 2124 is deposited onto the common ground plane to coincide with the seams. Highly effective blocking of light passing through seams is achieved at least partly as a result of the proximity of the chrome mask to the seam (e.g., within tens of microns or less). Other results, including less advantageous results, may be produced if the chrome mask is placed on the outer surface of the liquid crystal cell. In general, it is advantageous for the mask has to be near the LC layer to avoid parallax errors. For example, in at least some ways, it is beneficial if the mask is disposed on the inner surface, adjacent the liquid crystal material. However, in at least some cases, the use of chrome for this purpose can cause unintended electrical shorts between the sectors (pixels), which can have an adverse affect on system performance by interfering with independent control of the sectors (pixels). Putting the chrome mask on a non-sectored electrode of the liquid crystal device causes the mask to be nearly co-planar with the device without interfering with the independent control.

The stack of sectored liquid crystal retarder plates 62, 64, 66 and polarizers 22, 23 shown in FIG. 2A may be about 7 mm thick and may be placed at various locations in the optical train. In the example embodiment, the stack is placed near the front focal plane of the condenser lens. At least in a case involving the placement in the front focal plane, also called the aperture plane, and the ability of individual sectors to be configured individually and used to "scan" the aperture, the LC stack with polarizers may be called an "aperture scanning device" or "scanner" (e.g., as referenced in U.S. Provisional Application Ser. No. 60/379,967 entitled "APERTURE SCANNING DEVICE" filed on May 13, 2002). In microscope optics, in at least some cases, the front focal plane of the condenser lens is available for the placement of different optical components for specialized contrast techniques such as phase contrast, differential interference contrast, or dark field illumination. The specialized components can be mounted on a slider or in a rotating turret for easy exchange. Therefore, the example aperture scanning device described here, with a typical diameter of 20 mm or less and a thickness of about 7 mm, can be placed in the front aperture of a modern microscope condenser lens.

Placing the scanning device in the front focal plane of the condenser lens exploits at least the following two properties: (a) rays that pass through a small region of the aperture plane experience similar polarization distortions when passing through the rest of the imaging optics, and (b) rays that pass through a point in the aperture plane have a specific tilt angle in the specimen plane. The property under (a) allows to efficiently rectify polarization distortions using the sectored universal compensator 60. Furthermore, both properties (a) and (b) together make it possible to use the sectors for modulating the amplitudes and phases of rays that have a specific range of tilt angles in the specimen.

Other placements of the scanning device are possible and may facilitate other functions of the device. In particular, placing the scanning device in the back aperture of the objective lens can provide for similar functions as when it is placed in the front focal plane of the condenser lens. If additional imaging optics is present, the scanning device may be placed in additional locations that are conjugate to the aforementioned aperture planes and that have the same properties as described earlier under (a) and (b).

In the example embodiment, the sectors of the device independently modulate the intensity and polarization state of the illuminating light. The transparency of the aperture is controlled by the 8 pie-shaped sectors 68A–68H that can be configured, for example as described above, to simulate a rotatable asymmetric mask. As shown, in the example embodiment, the spatial light modulator is followed in the light path by the sectored universal compensator 60 which has one central sector and 8 sectors around the perimeter. As discussed below, the birefringence retardation of each sector can be configured independently for the purpose of polarization rectification and for measuring polarization properties of the specimen.

The size, shape and number of sectors can be optimized for the specific functions of the scanning device. In the example embodiment, the size, shape, and number of sectors, as illustrated in FIG. 2A, represent a specific example compromise regarding optimizing different functions, providing versatility, and ease of manufacturing.

The enhanced pol-scope's optical train can be followed in FIGS. 1–2A. The pie sectors of variable retarder plate 66 are in register with the sectors around the perimeters of retarders 62, 64. The slow axis orientation of variable retarder plate 66 is at 45° to first and second polarizers 22, 23. Hence, switching the retardance of a pie sector between $\lambda/2$ and $\lambda$ can cause light to be blocked or made to pass second polarizer 23 and, as described above, addressing pie sectors in sequence can implement a rotating mask without mechanically moving any part of the microscope. In the optical train, polarizer 23 is followed by plates 64, 62 of sectored universal compensator 60. All 5 polarization optical components 62, 64, 23, 66, 22 can be bonded together with optical cement to form a physical stack (e.g., having a thickness of 0.4 inches or less) and in at least the example embodiment, the stack is placed in the front focal plane of condenser lens 12.

In an alternative embodiment of the invention, one or more of components 62, 64, 23, 66, 22 may be unbonded and/or spaced apart from one or more of the others of components 62, 64, 23, 66, 22, and/or one or more sectors of one or more of components 62, 64, 66 may be unbonded and/or spaced apart from one or more others of the sectors of one or more of components 62, 64, 66. If light arriving at polarizer 22 is already suitably polarized, polarizer 22 can be omitted. If light arriving at polarizer 22 is polarized but has not the required state of polarization, polarizer 22 can be replaced by a variable or fixed retarder plate with suitable performance characteristics for converting the incoming polarization to the kind required for the sectored universal compensator 60. These alternative embodiments make the invention more adaptable to specific applications and manufacturing conditions.

In another embodiment, the sectored variable retarder plate 66 and linear polarizer 22 are omitted and only components 62, 64, 23 are used (alternatively, sectors 68A through 68H are set to maintain constant light throughput for all settings of 62 and 64). In this embodiment only the variable retarder sectors, such as 24 and 26, are changed and no spatial light modulator of any kind is required for measuring three dimensional birefringence parameters in each resolved specimen area. In this embodiment of the invention the light throughput and speed of the measurement system is maximized, but the fidelity and sensitivity of the measurement might be reduced when compared to an instrument with an additional spatial light modulator.

Figure 20B:
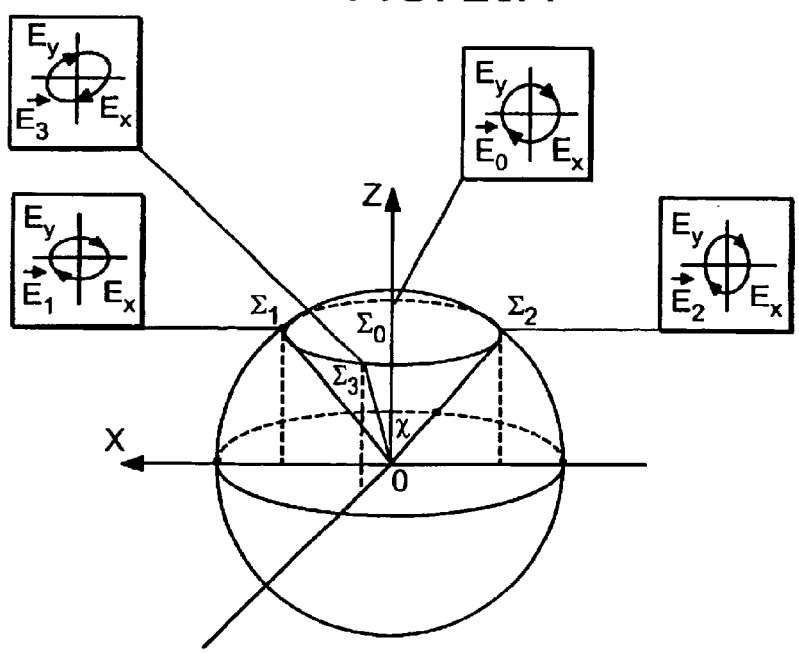

In another embodiment of the invention, the sectored variable retarder plate 62 is arranged to orient its slow axis at 22.5° instead of 0° as indicated in FIG. 2A. Other components may remain unchanged, including retarder plate 64 and polarizer 23. Light passing through this new arrangement can take on a range of polarization states including the states $\Sigma_0$, $\Sigma_1$, $\Sigma_2$, and $\Sigma_3$ that are illustrated in FIG. 20B. For example, the polarization states $\Sigma_0$, $\Sigma_1$, $\Sigma_2$, and $\Sigma_3$ are achieved with the following retardance settings of sectors such as 24 in retarder plates 64 with slow axis at 45° and sectors such as 26 in retarder plate 62 with slow axis at 22.5°:($\Sigma_0$: 64, $3\lambda/4$; 62, 0), ($\Sigma_1$: 64, $3\lambda/4$–swing; 62, 0), ($\Sigma_2$: 64, $3\lambda/4$+swing; 62, 0), ($\Sigma_3$: 64, $\lambda/4$+swing; 62, $\lambda/2$). Also, angles other than 0° and 22.5° for the slow axis orientation of sectored variable retarder plate 62 can be used to produce the polarization states $\Sigma_0$, $\Sigma_1$, $\Sigma_2$, and $\Sigma_3$. These alternative embodiments provide flexibility in the arrangement of variable retarder components to achieve the needed functionality of the sectored universal compensator 60.

In another embodiment of the invention, variable retarder plates 62 and 64 each have only one single sector that fully extends over the required aperture. The single sector retarder plates 62 and 64 are used with the spatial light modulator which together can be used to attenuate light in regions of the aperture and control the polarization. When using single sector retarder plates 62 and 64 instead of multi-sector ones the required hardware is simplified, but the performance of the measurement set-up might be less than optimal.

In another embodiment of the invention the spatial light modulator is made of a device other than a sectored variable retarder plate 66 and polarizers 22 and 23. For example, a metal mask with cut-out shapes can be placed in the aperture to block light from some regions of the aperture, while letting light pass in other regions. Changing the configuration of the spatial light modulator can be done either by rotating a single mask or by exchanging differently configured masks. For example, modern condenser lens assemblies used for illuminating a specimen in a microscope can include turrets with several positions that can be rotated in to the aperture plane of the condenser lens. One or more positions can hold appropriately configured aperture masks and the masks can be exchanged by mechanically rotating the turret.

Using a mechanical mask instead of a sectored variable retarder plate 66 and one of polarizers 22 and 23 as spatial light modulator provides the possibility of placing the modulator on either side of the sectored universal compensator 60. Light from the light source to the specimen can either pass first the mechanical mask and then the sectored universal compensator 60 or first the universal compensator and then the mask. Hence, this alternative embodiment allows for more flexibility in constructing the set-up.

Figure 21:
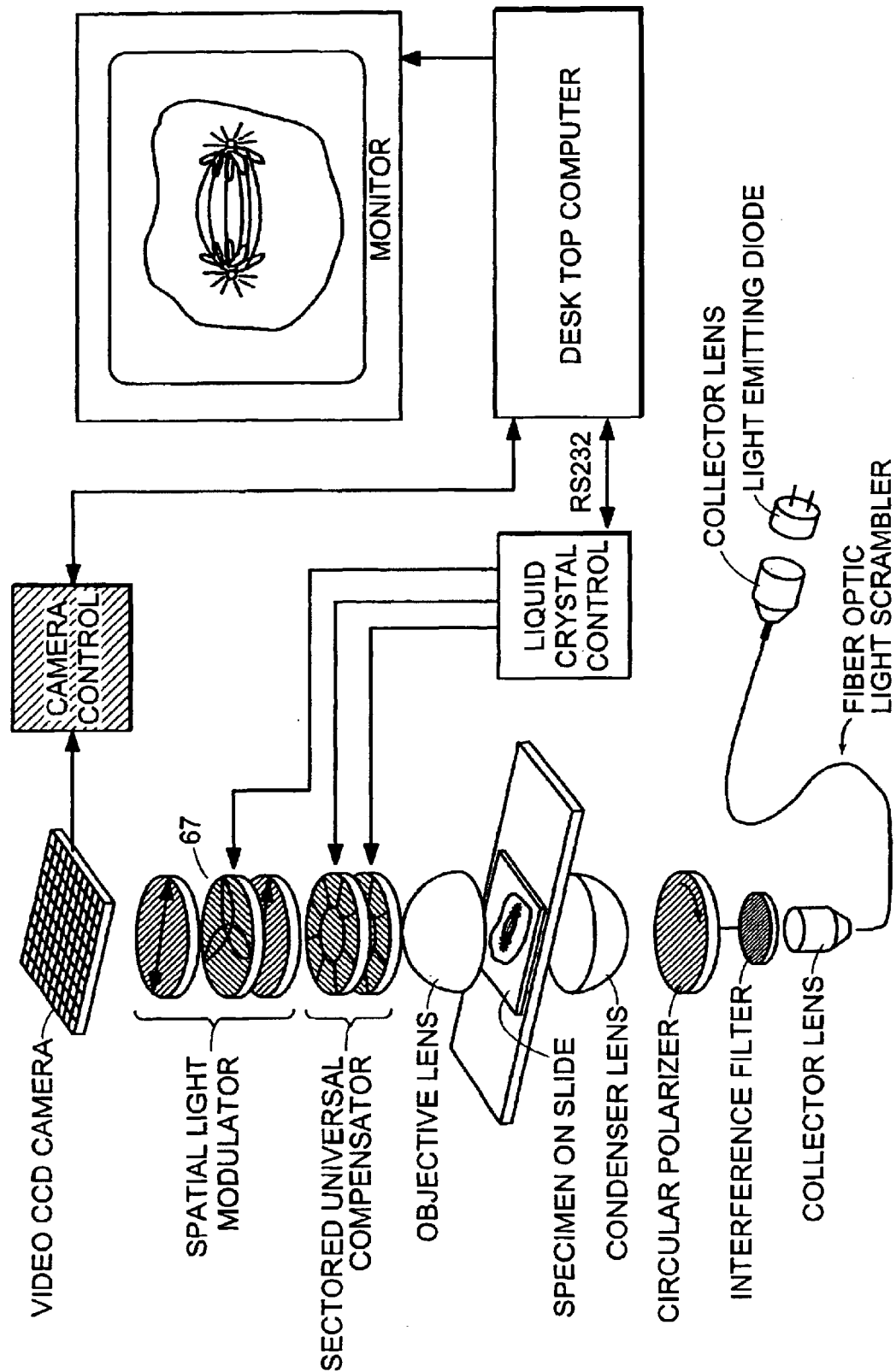
FIG. 21 illustrates an optical system with an aperture scanning device located between specimen and camera.

Another embodiment of the invention is illustrated in FIG. 21 which shows the schematic of a microscope with the aperture scanning device located between specimen and camera. The aperture scanning device is similarly constructed to the one shown in FIGS. 1 and 2A but light passes through the components in reverse order. FIG. 21 shows a sample variable retarder plate 67 with sectors that are shaped differently when compared to the pie shaped sectors of variable retarder plate 66 in FIG. 2A. Sector shapes can be modified to optimize the performance of the particular embodiment for achieving certain performance parameters. Typically, the scanning device is located near the back focal plane of the objective lens, or near a suitable plane that is optically conjugate to the back focal plane. The example embodiment of FIG. 21 can be used to measure the 3-dimensional polarization properties of a specimen, using measurement procedures similar to those described for sample embodiment of FIG. 1. The sample embodiment of FIG. 21 can also be used to analyze the 3-dimensional polarization properties of light emanating from the specimen.

Figure 22:
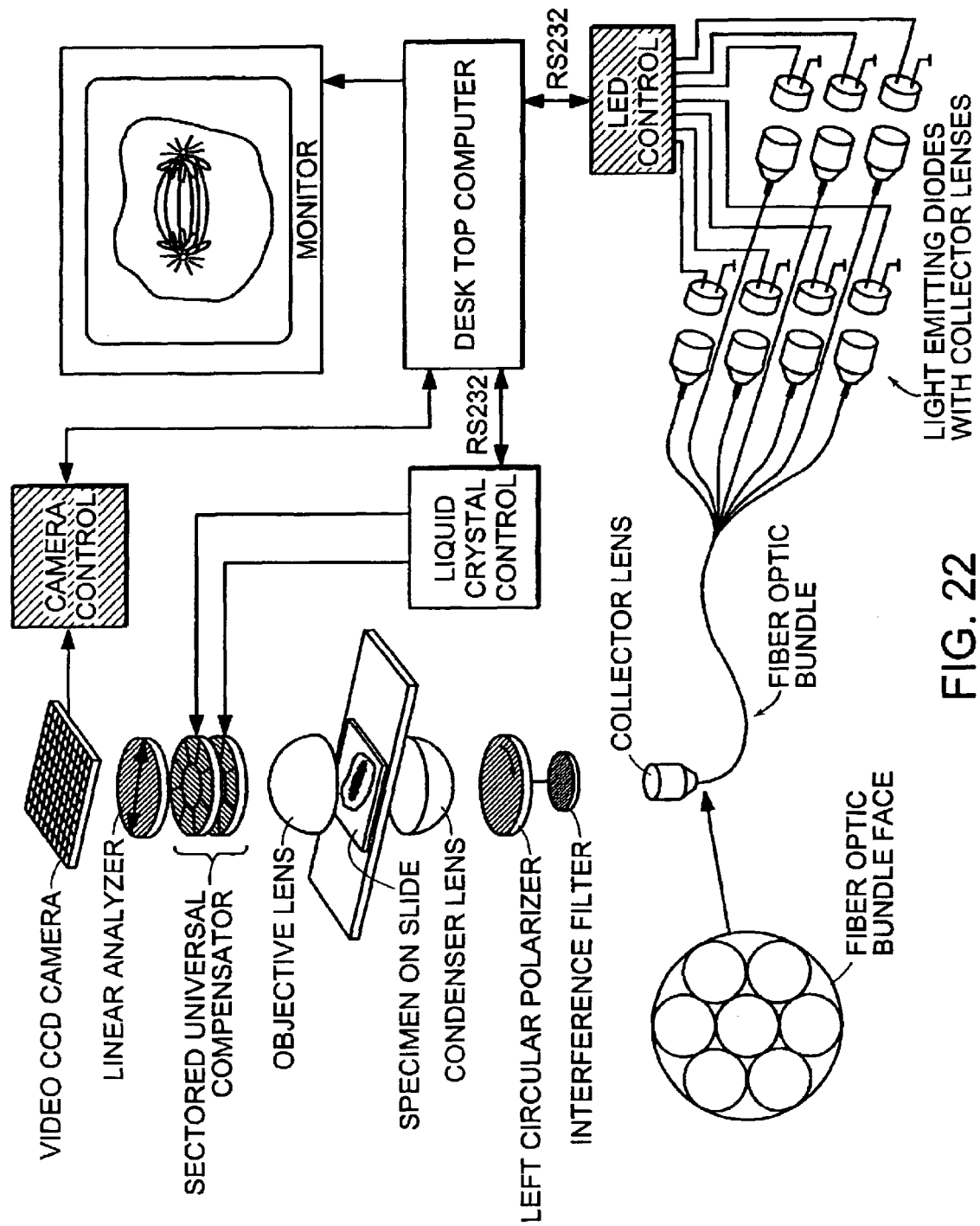
FIG. 22 illustrates an optical system with a sectored universal compensator located between specimen and camera and an array of light emitting diodes that serve as spatial light modulator.

Another embodiment of the invention implements the spatial light modulator as an array of individually controlled light sources. The array can be put in the front focal plane of the condenser lens or it can be imaged into this plane by a collector lens. During measurements a subset of light sources of the array are switched on, while the other light sources are switched off or dimmed. Thus, we can create an illumination beam that is similar to one when using the spatial light modulator and a single light source. For example, an array of light emitting diodes (LEDs) is suitable for this purpose At least one embodiment can use a set of separate individually addressed light sources and combine their beams in the front focal plane of the condenser with a wavefront beamsplitter (multiplexer) or a fiber optic bundle. The same elements as are shown in FIGS. 24A and 24B can be employed for combining beams from different light sources. FIG. 22 shows a microscope set-up with a set of seven LEDs feeding a fiber optic bundle. The fiber optic bundle with hexagonal configuration in the output tip combines light from different light emitting diodes. The collector lens creates an image of the bundle tip into the front focal plane of the condenser lens. Light from only the central fiber produces an axial beam. Light from one of the side fibers produces an oblique beam. Measurements with different azimuths of the inclined beam allows determination of the z-component of birefringence. In addition, the microscope resolution can be increased by illuminating the front focal plane with light from all fibers or with light from the ring of peripheral fibers only.

Figure 23:
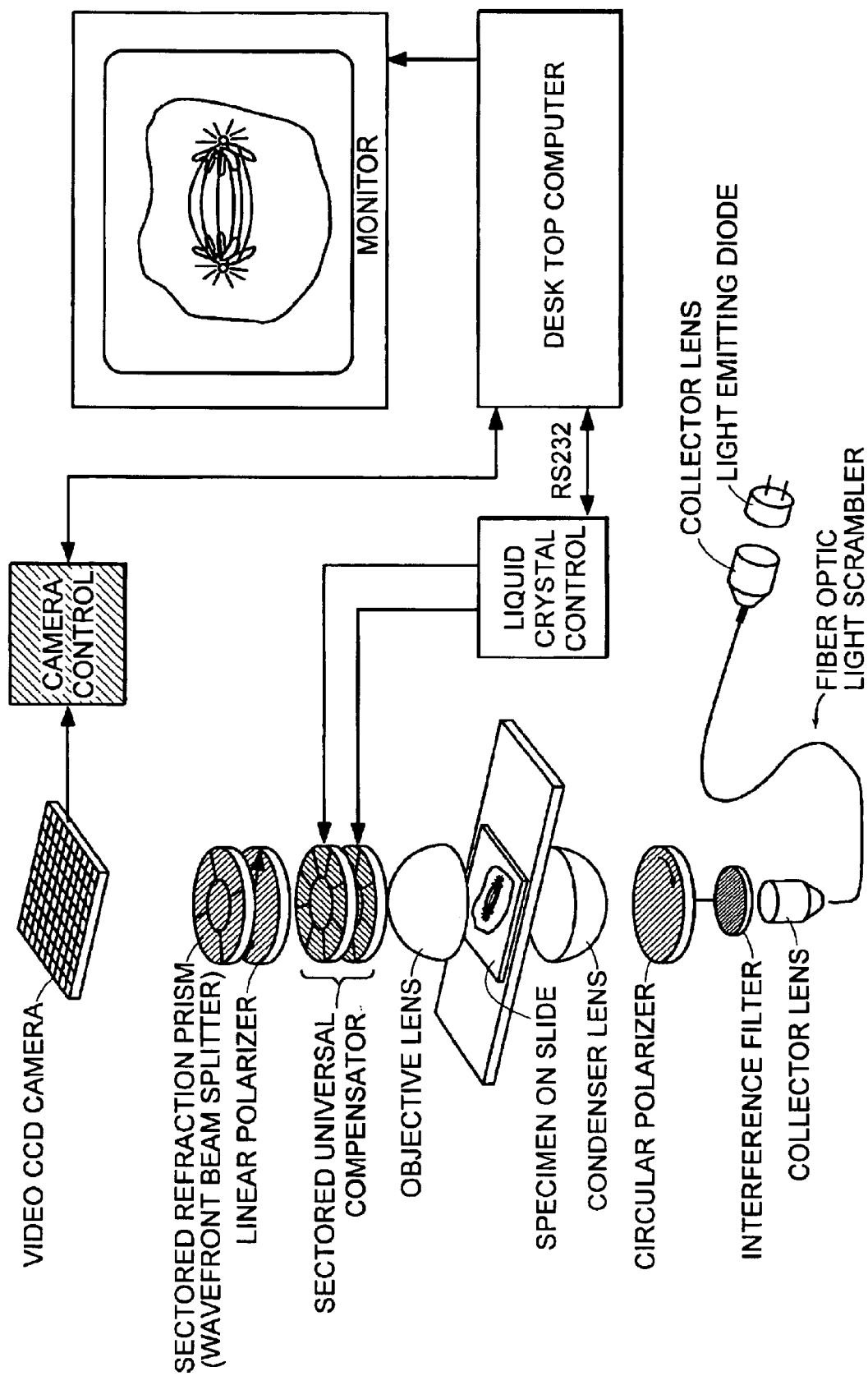

In another embodiment of the invention the spatial light modulator is constructed of an assembly of mirrors, prisms, and/or lenses to redirect different portions of the aperture light field into separate directions, as illustrated in FIGS. 23 and 24A, 24B. Redirected light beams can be projected onto different electronic cameras or onto different sections of the same camera face plate. Each image ($I_2$, $I_0$, $I_1$) can represent the same region of the specimen, but each image ($I_2$, $I_0$, $I_1$) can be projected using a different portion of the aperture light field. This embodiment of the invention allows for simultaneous recording of images that are projected using different portions of the aperture light field.

Figure 25:
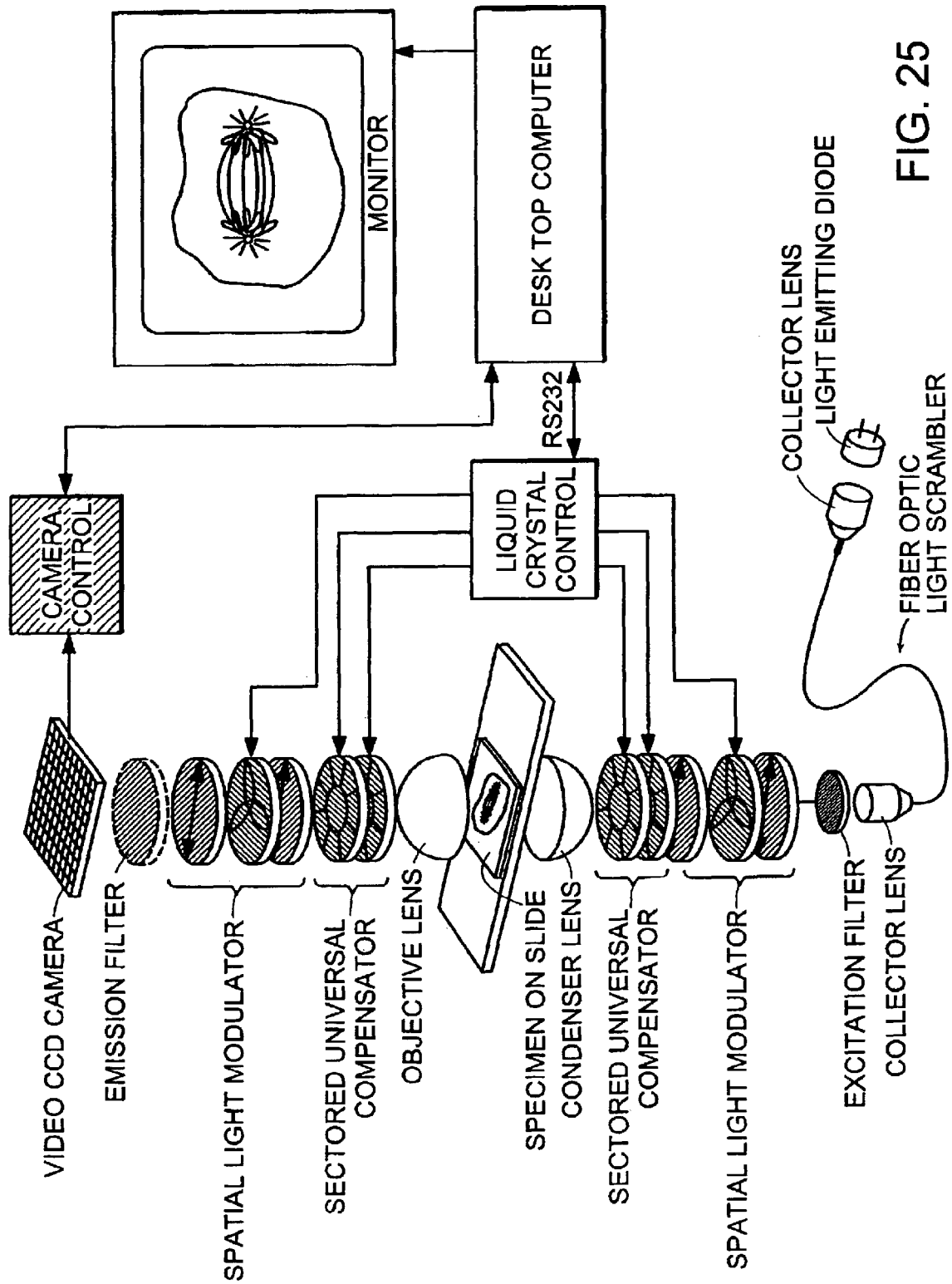
FIG. 25 illustrates an optical system in which one aperture scanning device is disposed before a condenser lens and another aperture scanning device is disposed after an objective lens.

Another embodiment of the invention uses two aperture scanning devices one placed before the condenser lens and one after the objective lens, with retarder and polarizer components of the scanners arranged as shown in FIG. 25. This configuration provides extensive control not only over the direction and polarization state of the light that is illuminating the specimen but also over the analysis of the direction and polarization of light emanating from the specimen. The sample embodiment of FIG. 25 can be used to measure the differential phase shift (retardance) and absorption (dichroism) of circularly and linearly polarized light interacting with the specimen. A device with such a capability is sometimes called a Müller matrix polarimeter. Thus, the embodiment of FIG. 25 can be called a 3-dimensional imaging Müller matrix polarimeter. The embodiment can measure a multitude of polarization optical properties of the specimen, including polarization properties associated with inelastic scattering and re-emission of light by the specimen. Measurements can provide the 3-dimensional polarization parameters in every resolved specimen point.

In another embodiment of the present invention, a provision is made to be able to change the wavelength of light illuminating the specimen. For example, the sample embodiment shown in FIG. 1 is enhanced by a provision for changing the interference filter 20. The enhanced sample embodiment is capable of measuring the polarization properties of the specimen at different wavelengths of light. In addition, this provision enables the unambiguous measurement of specimen retardances that are larger than half a wavelength. For example, using the sample configuration of FIG. 1 and illuminating light of wavelength $\lambda$, a specimen retardance that is larger than half a wavelength by the amount of $\Delta(0 \leq \Delta < \lambda/2)$ is measured as $(\lambda/2-\Delta)$, instead of $(\lambda/2+\Delta)$. Also, the measured slow axis orientation of that same specimen with retardance magnitude $(\lambda/2+\Delta)$ is turned by 90° from its true slow axis orientation. However, measuring the same retardance first using light of wavelength $\lambda_1$ and then of wavelength $\lambda_2$, the magnitude can be measured unambiguously as $(\lambda/2+\Delta)$ and the correct slow axis orientation can be determined. The multitude of specimen retardances that can be measured unambiguously using two wavelength $\lambda_1$ and $\lambda_2$ ranges from zero to $$\frac{\lambda_1 \lambda_2}{(\lambda_1 - \lambda_2)}.$$

In another embodiment of the present invention, a provision is made to illuminate the specimen with light of one wavelength and to analyze the light emanating from the specimen at a different wavelength. For example, the sample embodiment shown in FIG. 25 is enhanced by a provision for adding an interference in front of the camera. The transmission characteristics of the additional interference filter is made to block light of the same wavelength as the illuminating light but transmit light of wavelengths longer than the illuminating light. Such provisions that allow to illuminate the specimen with light of one wavelength and to analyze the light emanating from the specimen at different wavelengths, can be use to analyze, for example, the polarization properties of light absorption and re-emission by fluorescent molecular moieties. Another application of such provisions is for the polarization analysis of inelastic scattering of light, such as Raman scattering or second harmonic generation.

Methods

Birefringence Measurement

The enhanced pol-scope can be used for enhanced imaging, e.g., to observe subjects such as small calcite crystals using oblique illumination. By occluding different portions of the aperture, an oblique beam of variable tilt angle and azimuth is created for illuminating the specimen. Birefringence measurements (e.g., of the calcite crystals) are recorded for different settings of sectored variable retarder plate 66 and results are evaluated to determine the retardance magnitude, azimuth, and inclination of optic axis of the specimen.

In a particular example, crystals to be observed are prepared as described in Oldenbourg, R. and P. Török, *Point spread functions of a polarizing microscope equipped with high numerical aperture lenses*. Applied Optics, 2000. 39: p. 6325–6331. The crystals may be several micrometers in diameter and may have a well known cleavage form. The crystals are sandwiched between slide and cover glass and are embedded in Permount® (Fisher Scientific), which is a resin that matches or nearly matches the crystals' refractive indices. The crystals are generally oriented so that one of the crystal faces is normal to the microscope axis. As explained in Hecht, E., *Optics*. 3rd ed. 1998, Reading Mass.: Addison-Wesley, for the cleavage form of calcite, the crystal optic axis forms an equal angle to the three faces that meet at a blunt crystal corner. Accordingly, for the observations, the crystal optic axis may be oriented at approximately 45 degrees to the microscope axis.

The retardance of calcite crystals is measured using several configurations of spatial light modulator 61. FIG. 7 shows retardance magnitude images 70A–70E of a calcite crystal measured with an open aperture and four different orientations of a quarter aperture. In FIG. 7, the top row (images 70A–70E) shows retardance magnitude images of a calcite crystal that is observed with corresponding spatial light modulator configurations that are shown in the bottom row (images 72A–72E). Each magnitude image is computed based on raw images that are recorded using four settings of the universal compensator as described, for example, in Oldenbourg, R. and G. Mei, *New polarized light microscope with precision universal compensator*. Journal of Microscopy, 1995. 180: p. 140–147.

Figure 8:
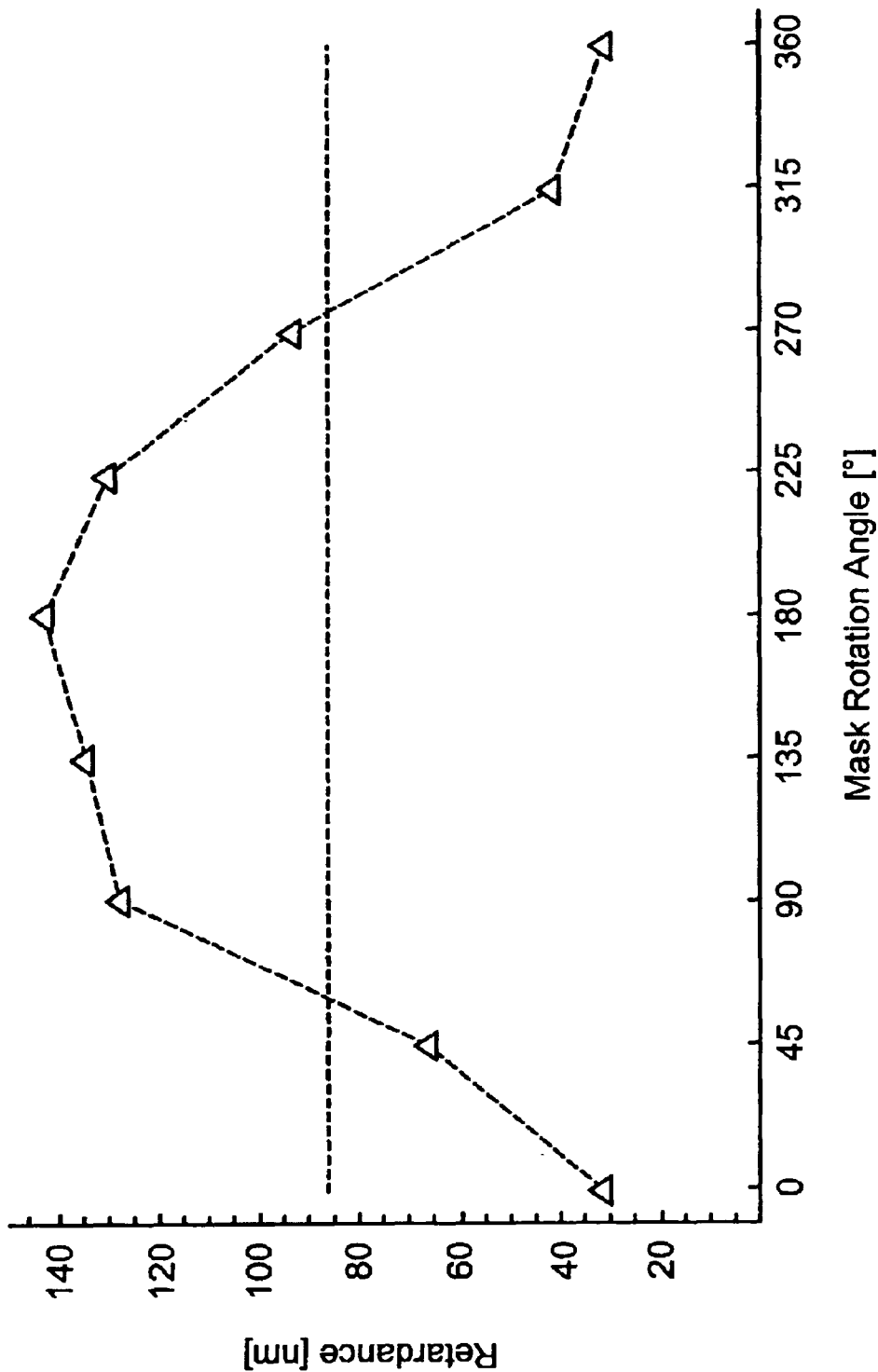
FIGS. 8, 11 illustrate charts of measured retardance magnitude obtained using the present invention.

FIG. 8 shows a graph of the retardance magnitude measured in the central region of the crystal versus the rotation angle of the mask. For viewing convenience, a dashed line connects the data points, and a horizontal dotted line represents a retardance magnitude value measured with a fully open aperture. As shown in FIG. 8, the measured crystal retardance strongly depends on the orientation of the quarter aperture, which, as illustrated in FIGS. 9A–9B, can be attributed to the tilt angle of a pencil of rays that pass through a partially occluded spatial light modulator and converge on the crystal. FIGS. 9A–9B illustrate the propagation of an oblique beam created by an asymmetric spatial light modulator configuration. In FIG. 9A the left portion (e.g., sectors 68E–68H) of the spatial light modulator 61 is occluded leading to a center ray that has a centerline 94 that is nearly parallel to the crystal optic axis 92 as shown in the inset. In FIG. 9B, the spatial light modulator is configured to cover the opposite part of the aperture and the center ray 96 propagates nearly perpendicularly to the optic axis. In FIG. 9A, since the spatial light modulator configuration is such that centerline 94 and the crystal optic axis 92 are nearly parallel, the result is that at least most of the rays experience little birefringence retardation so that the measured crystal retardance is small. In FIG. 9B, however, with centerline 96 being nearly perpendicular to the optic axis 92, the result is that at least most of the rays experience strong birefringence retardation so that the measured crystal retardance is large.

Figure 10:
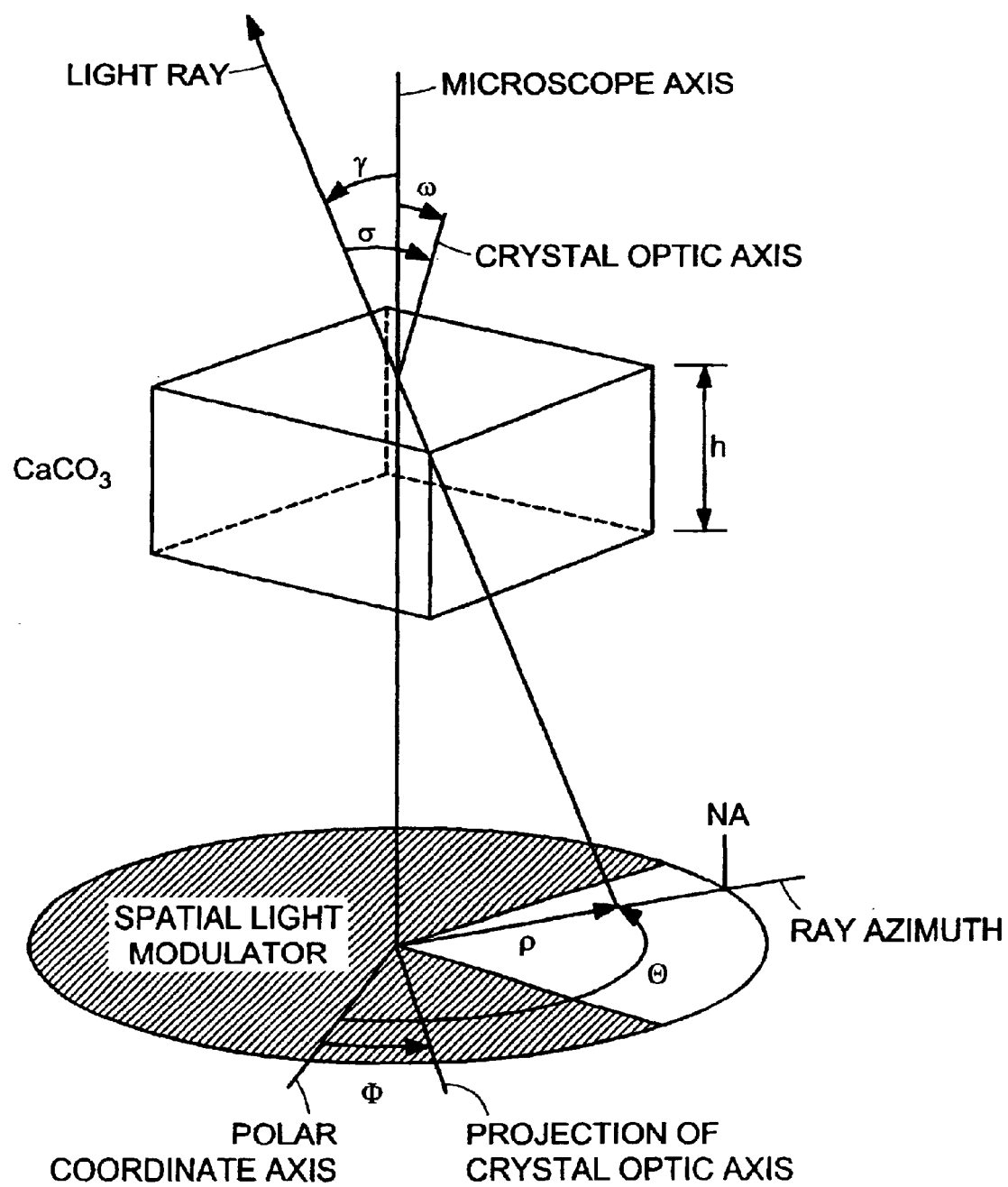
FIG. 10 schematically illustrates a retardance geometric relationship obtained using a polarizing microscope embodying the present invention.

A quantitative analysis of the crystal retardance as a function of different spatial light modulator configurations can be performed with respect to the pencil of rays that pass through the center of the crystal. Each ray originates from a point in the aperture and, while passing through the crystal, accumulates a birefringence retardation $\Delta$ that depends on the angle $\sigma$ between the ray and the optic axis of the crystal (see page 699 in Born, M. and E. Wolf, *Principles of Optics*. 6 ed. 1980, Elmsford, N.Y.: Pergamon Press.). FIG. 10 illustrates the geometric relationship between the light ray, the calcite crystal ($CaCO_3$), and spatial light modulator, particularly the geometric relationship between the crystal optic axis and the parameters of a light ray passing through the aperture at the point ($\rho$, $\theta$). FIG. 10 shows a calcite crystal with optic axis at an angle $\omega$ to the microscope axis and azimuth $\Phi$ (angle between projection of crystal optic axis on specimen plane and polar coordinate axis). One set of crystal faces is perpendicular to the microscope axis and the thickness of the crystal along this axis is h.

The ray is tilted to (i.e., offset from) the microscope axis by an angle $\gamma$. The ray tilt angle $\gamma$ is related to the radius $\rho$ in the aperture plane by $\rho = \bar{n} \sin \gamma / NA$, with $\bar{n}$ being the average refractive index of the crystal in the direction of the ray. The radius changes from 0 for the axial ray to −1 for a peripheral ray of the condenser with the numerical aperture NA.

The path length of the ray through the crystal is $h/\cos \gamma$. Refraction at the crystal faces may be neglected because the crystal is embedded in a resin, as described above, that closely matches the crystal refractive index. Based on these geometric relationships the retardance $\Delta$ can be written as expression (1) as follows:

$$\Delta = (n_o - n_e) \frac{h}{\cos \gamma} \sin^2 \sigma \quad (1)$$

In expression (1), $n_o$, $n_e$ represent the ordinary and extra-ordinary refractive indices of the crystal.

As illustrated in FIG. 10, the angle $\sigma$ is a function of the angle $\omega$ of the optic axis, the tilt angle $\gamma$ of the ray, and the azimuth angles $\theta$ and $\Phi$ in the aperture plane, as written in expression (2) as follows:

$$\cos \sigma = \sin \gamma \sin \omega \cos(\Phi - \theta) + \cos \gamma \cos \omega \quad (2)$$

For the axial ray, for example, expression (1) reduces to expression (3) as follows:

$$\Delta_0 = (n_o - n_e) h \sin^2 \omega \quad (3)$$

Expressions (1) (2) and (3) can be combined to obtain the retardance $\Delta$ as a function of parameters $\gamma$, $\omega$, $\theta$, $\Phi$ in expression (4) as follows:

$$\Delta(\gamma, \omega, \theta, \Phi) = \frac{1 - (\sin\gamma\sin\omega\cos(\Phi - \theta) + \cos\gamma\cos\omega)^2}{\sin^2 \omega \cos \gamma} \Delta_0 \quad (4)$$

A minimum retardance $\Delta_{min}$ is observed when the ray azimuth is equal to the azimuth of the crystal optic axis as written in expression (5) as follows:

$$\Delta_{min} = \frac{\sin^2(\gamma - \omega)}{\sin^2 \omega \cos \gamma} \Delta_0 \quad (5)$$

A maximum retardance $\Delta_{max}$ occurs for the opposite azimuth ($\Phi = \theta + 180°$) as written in expression (6) as follows:

$$\Delta_{max} = \frac{\sin^2(\gamma + \omega)}{\sin^2 \omega \cos \gamma} \Delta_0 \quad (6)$$

$\Delta_{min}$ and $\Delta_{max}$ can be used to calculate the angle $\omega$ of the crystal optic axis, as written in expression (7) as follows:

$$\omega = \tan^{-1}\left( \frac{\sqrt{\Delta_{max}} - \sqrt{\Delta_{min}}}{\sqrt{\Delta_{max}} + \sqrt{\Delta_{min}}} \tan \gamma \right) \quad (7)$$

Replacing $\sin \gamma$ with $\rho NA/\bar{n}$ in expression (4) yields expression (8) as follows:

$$\Delta(r, \omega, \theta, \Phi) = \frac{1 - \left( \frac{\rho NA}{\bar{n}} \sin\omega \cos(\Phi - \theta) + \sqrt{1 - \left(\frac{\rho NA}{\bar{n}}\right)^2} \cos\omega \right)^2}{\sin^2 \omega \sqrt{1 - \left(\frac{\rho NA}{\bar{n}}\right)^2}} \Delta_0 \quad (8)$$

The expected crystal retardance for a specific configuration of the spatial light modulator can be estimated by averaging the ray retardance $\Delta(r, \omega, \Theta, \Phi)$ over the open sectors of the modulator as written in expression (9) as follows:

$$\Delta_{average} = \frac{\int_0^1 \int_{\theta_{min}}^{\theta_{max}} \Delta(\rho, \omega, \theta, \Phi) \cdot \rho \cdot d\theta \cdot d\rho}{\int_0^1 \int_{\theta_{min}}^{\theta_{max}} \rho \cdot d\theta \cdot d\rho} \quad (9)$$

The averaging procedure of expression (9) assumes that the retardances $\Delta(\rho, \omega, \theta, \Phi)$ of the rays all have the same orientation of their principal axes. Only if the principal axes are parallel to each other can the magnitude values simply be summed to find the average retardance. In at least some cases, the result is an appropriate approximation for small apertures, and may be less appropriate for larger openings in which the slow axis direction is found to rotate by more than 90 degrees, as discussed in Oldenbourg, R. and P. Török, *Point spread functions of a polarizing microscope equipped with high numerical aperture lenses*. Applied Optics, 2000. 39: p. 6325–6331. In other embodiments, additional accuracy may be gained by averaging over the complete retardance tensor that is associated with each ray.

Figure 11:
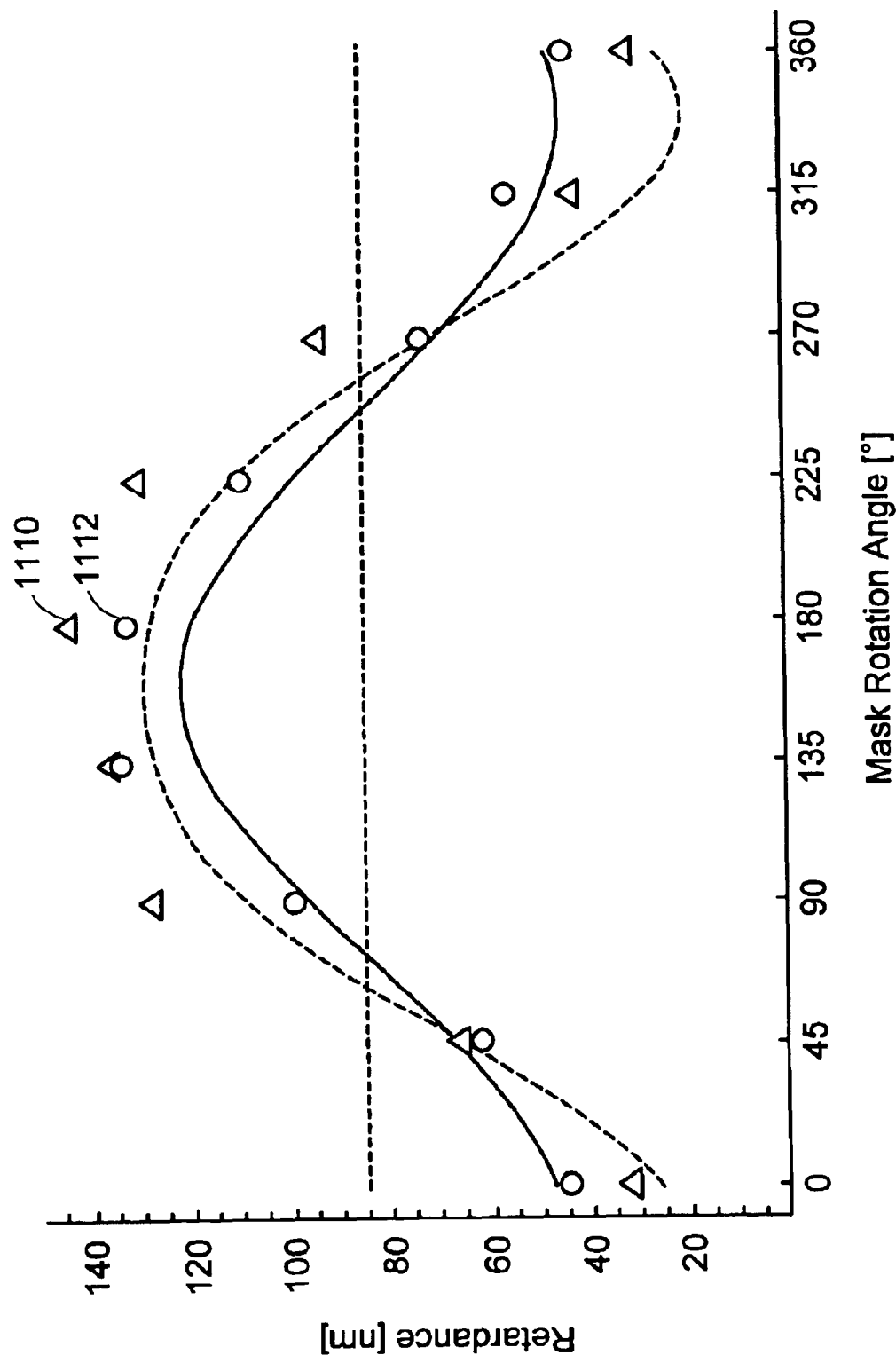

FIG. 11 illustrates an example of close agreement between measured data and computed values where no adjustable parameters were used. FIG. 11 includes a chart of retardance magnitude of a small calcite crystal versus the orientation of a quarter and half apertures. Triangles such as triangle 1110 represent measured magnitude values for the quarter aperture (which correspond to the same data points of FIG. 8). The dashed curve is computed for a quarter aperture using expression (4) and varying $\theta_{min}$ between 0 and 360 degrees, with $\theta_{max}=\theta_{min}+90°$. The circular data points such as point 1112 were measured with a half aperture and the continuous line was computed as previously described. The horizontal dotted line represents the retardance value as measured with a fully open aperture-.

As noted above with respect to an alternative embodiment, the sectored universal compensator, unaided by the spatial light modulator, may be used to measure birefringence parameters of the specimen in three dimensions. Accordingly, in the alternative embodiment, the spatial light modulator is superfluous and is not needed, e.g., for partially occluding the aperture plane. In at least some cases, it may be sufficient to create an asymmetric polarization distribution in the condenser aperture plane, with a near uniform light intensity across the aperture. The sectored universal compensator was used for creating an asymmetric polarization distribution, leaving the aperture "fully open". In particular, the sectors of the variable retarder plate 66 are not changed in their settings; only the sectored universal compensator is changed through a number of settings for measuring three-dimensional birefringence parameters of the crystal or other objects. In this method, the sectored variable retarder plate 66 is typically set to produce a light intensity that is uniform across the aperture. A fixed illumination pattern onto polarizer 23 can be achieved by appropriate illumination optics, in which case polarizer 22 and sectored retarder plate 66 may be omitted from the aperture scanning device in the alternative embodiment. Regardless of omission, in the alternative embodiment, the sectors of the universal compensator are used to modulate the polarization distributions in the front focal plane of the condenser lens, and specimen images are recorded while sectors of the universal compensator are set to predetermined retardance values. One such setting produces circular polarization as the output of all sectors of the universal compensator. In a such second setting, the polarization of the central sector and of at least one of the peripheral sectors remains circular, while the other peripheral sectors are set to produce elliptically polarized light. In the third and subsequent such settings, each time the polarization is changed in a manner that produces an asymmetric polarization pattern in the front aperture of the condenser lens. The analysis of intensity measurements, recorded in the images, can then reveal three-dimensional birefringence parameters at many specimen points simultaneously.

FIGS. 26A–26G show the measured magnitude and orientation of retardance of an object called an aster prepared from clam oocytes. The aster is formed by rodlike biopolymers (microtubules) that radiate from a common organizing center. Retardance measurements were performed using the enhanced pol-scope of the present invention equipped with the aperture scanning device. The image in FIG. 26A shows the retardance magnitude of the aster measured with a fully open condenser aperture that is shown in the top left inset. The overlay circle outlines a region with near zero retardance magnitude in the center of the aster image. FIGS. 26B and 26C show retardance magnitude images of the same aster measured with only one quarter of the aperture open. In those latter images, the circled region exhibits non-zero retardance. The pattern of retardance in FIGS. 26A, 26B, and 26C can be understood based on the geometric arrangement of birefringent material in the aster and on the optical sectioning properties of the microscope optics, as illustrated in the schematic of FIG. 26D. Specifically, inside the circled region of FIGS. 26A, 26B, 26C the alignment of the optic axis of the polymer array in the aster is near parallel to the microscope axis. Therefore, using a fully open aperture the measured retardance in that region is near zero. However, when using a quarter aperture, the light path through the specimen is tilted and the microtubule array oriented parallel to the microscope axis induces a measurable birefringence retardation.

Based on measurements shown in FIGS. 26A, 26B, and 26C, a complete analysis of the magnitude and orientation of the birefringence retardation in the focus section of the aster can be performed. FIG. 26E shows the contour plot of the measured angle of inclination of the optic axis of the polymer array (angle of inclination corresponds to $-90°-\omega$ in FIG. 11). The inclination is the angle by which the optic axis is tilted out of the plane of focus. FIG. 26F shows short lines indicating the measured azimuth orientation of the optic axis. The azimuth shows the orientation of the optic axis in the plane of focus. The lines indicate the orientation on a coarse grid leaving out many more points for which the azimuth orientation was simultaneously measured. FIG. 26G shows the principal retardance of the microtubule array. The principal retardance of a birefringent object may be defined as the retardance that is measured with light propagating perpendicular to the optic axis of the uniaxial object. These measurements allow the complete characterization of the orientation of aligned biopolymers and their density independent of their alignment direction.

Polarization Rectification

As discussed briefly above, in at least one embodiment, the enhanced pol-scope can be used to provide rectification for suppressing depolarization caused by differential transmission and phase shift in high NA lenses. In particular, the enhanced pol-scope benefits from analysis, measurement, and active rectification of depolarization caused by the differential transmission and phase shift of p- and s-polarized components of an axial beam passing through lens surfaces. The analysis allows the polarization of output rays to be found as a function of the input ray parameters, the shape factor, and refractive index of the lenses used. For rays that are inclined to the optical axis, optimal lens shape factors exist that minimize the rays' polarization aberrations. The enhanced pol-scope benefits from measurements of polarization aberrations detected in the back-focal plane of a modern microscope equipped with high numerical aperture lenses, and from strategies for polarization rectification including, for example, reliance on one or more components described above to achieve a liquid crystal rectifier that can actively compensate a wide variety of polarization aberrations.

Figure 12:
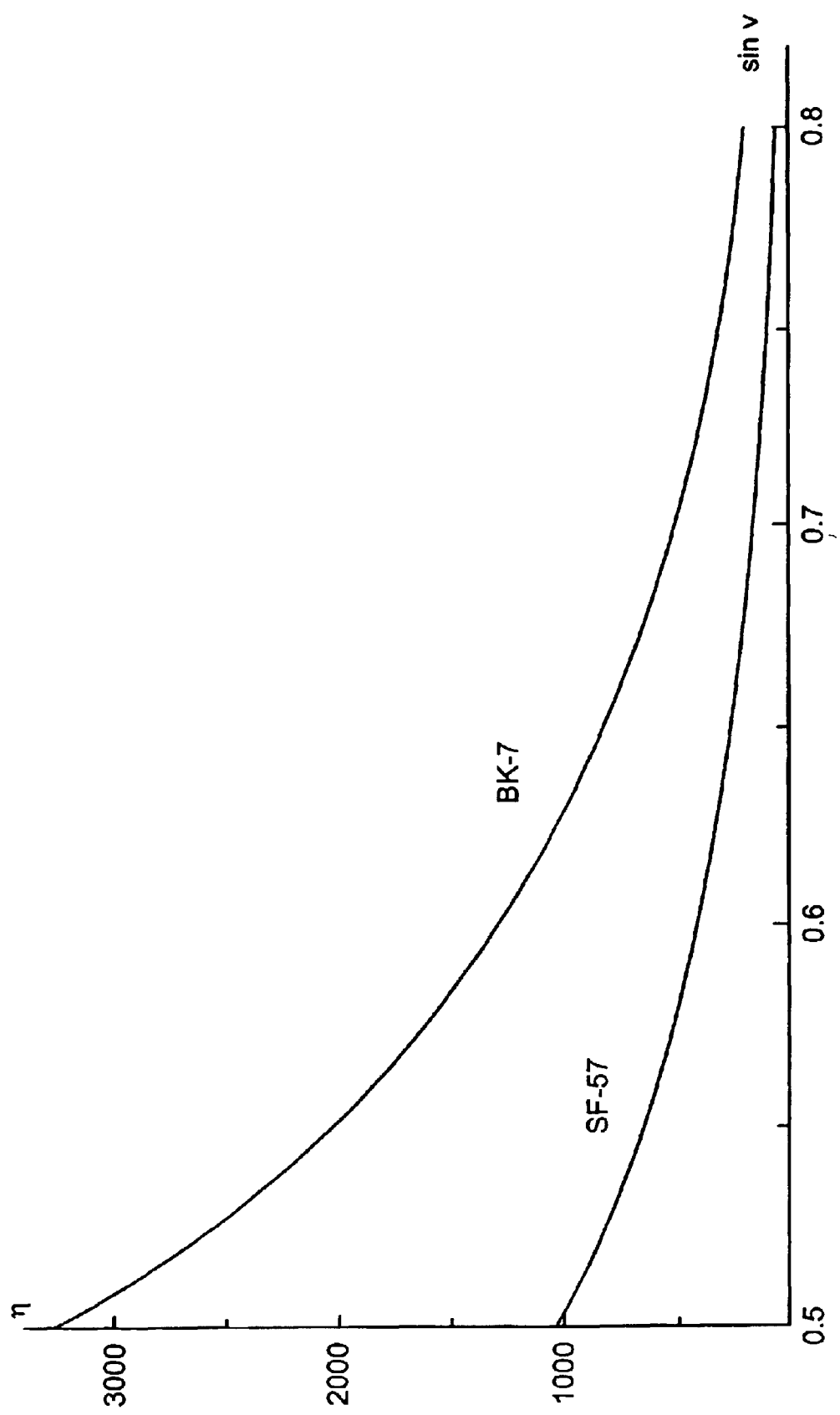
FIG. 12 illustrates chart of ray extinction versus sine of incidence angle for a plane parallel plate made of glass SF-57 or BK-7.

As described in more detail below, the radially symmetric polarization aberrations introduced by lenses and plane parallel plates reduces the extinction and can lead to anomalous diffraction (Inoué, S. and Kubota, H., 1958. Diffraction anomaly in polarizing microscopes. *Nature* 182, 1725–1726). The extinction caused by the radial polarization aberrations is two times less for a beam with circular polarization than for a linearly polarized beam. The diffraction anomaly reported for systems using linearly polarized light is substantially reduced in microscopes that use nearly circularly polarized light. Extinction is dependent on the numerical aperture for uncoated lenses and for plane parallel plates, and is linked to the shape factor of a lens. A microscope slide made from higher refractive glass introduces more depolarization than if it is made from lower refractive glass. The maximal extinction value of an uncoated lens with optimal shape does not depend on the refractive index. Lenses that possess shape factors between 0.4 and 1.0 give maximal extinction. Menisci produce strong depolarization. Radial differential transmission and phase shift may be measured using a rotatable analyzer or compensator (FIG. 12). Results of the measurement can be used to choose the optimal or nearly optimal design of polarization rectifiers. Analysis can be provided of a function of polarization rectifiers with a meniscus and a sectored liquid crystal compensator. The rectifier includes a glass or air meniscus with zero order optical power and a half wave plate and is used for decreasing the depolarization of a linearly polarized beam as well as attendant anomalous diffraction. The introduction of a 90-degree rotator instead of the half wave plate gives the possibility to remove the depolarization for any initial polarization state and a sectored liquid crystal compensator can create a corrected beam with arbitrary polarization aberration.

The extinction factor of a conventional wide field polarizing microscope rapidly drops as the numerical aperture of the objective and condenser lens is raised, even with a high quality polarizing system and the use of carefully selected lenses that are free or nearly free of strain birefringence and birefringent inclusions as discussed in S. Inoué and R. Oldenbourg, "Microscopes", *Handbook of Optics*, Vol. II, 2nd edition, M. Bass. ed., pp. 17.1–17.52, McGraw-Hill, New York, 1995; S. Inoué and K. Spring, Video Microscopy, The Fundamentals, 2nd edition, pp. 76–86, Plenum Press, New York, 1997. The loss of extinction originates from the differential amplitude transmission and the phase shift between the p- and s-polarization components of rays that pass through steep optical interfaces. The depolarization results in four bright quadrants separated by a dark cross that is seen conoscopically between crossed linear polarizers in the absence of a specimen. If crossed circular polarizers are used instead, the result is a dark central disk that is surrounded by a bright ring in the back aperture. The depolarization can also result in anomalous diffraction caused by a four-leaf clover pattern that replaces the Airy disk when imaging weakly birefringent objects between crossed linear polarizers. The depolarization caused by such factors affects other conventional polarization optical devices, in which lenses are used between polarizers, such as ellipsometers, polarimetric sensors, and optical disc systems with polarization reading of information. On the other hand, in an epi-illumination confocal imaging system, the depolarization that occurs in different quadrants of the exit pupil cancel each other and the extinction remains high even when high NA lenses are used.

In general, polarization aberrations arise when an axial beam passes through lens surfaces. An axial beam can be considered as being composed of individual rays that travel through lens surfaces, each ray being under a different plane and angle of incidence. Because of the rotational symmetry of a lens, the differential amplitude transmission and phase shift between the p- and s-polarization components of rays are radially symmetric.

A sample case may involve an axial beam in a lens optical system. Polar coordinates may be chosen at the center of the entrance pupil that has unit radius. The polarization change of a ray with the radial coordinate $\rho(0 \leq \rho \leq 1)$ and azimuth $\theta$ $(0 \leq \theta \leq 2\pi)$ is determined by the Jones matrix $M(\rho,\theta)$ as written in expression (11) as follows:

$$M(\rho, \theta) = \begin{pmatrix} \cos\theta & -\sin\theta \\ \sin\theta & \cos\theta \end{pmatrix} \cdot \begin{pmatrix} T_p e^{i\Delta_p} & 0 \\ 0 & T_s e^{i\Delta_s} \end{pmatrix} \cdot \begin{pmatrix} \cos\theta & \sin\theta \\ -\sin\theta & \cos\theta \end{pmatrix}$$
$$= \frac{1}{2} T_s e^{i\Delta_s} \begin{pmatrix} \mu e^{i\Delta} + 1 + (\mu e^{i\Delta} - 1)\cos 2\theta & (\mu e^{i\Delta} - 1)\sin 2\theta \\ (\mu e^{i\Delta} - 1)\sin 2\theta & \mu e^{i\Delta} + 1 - (\mu e^{i\Delta} - 1)\cos 2\theta \end{pmatrix}$$
(11)

Here $T_p$ and $T_s$ are amplitude transmission coefficients of the p- and s-polarization components and $\Delta_s$ and $\Delta_p$ are phases of the components after traversing the optical system. Parameters $\mu$ and $\Delta$ describe the differential transmittance and radial retardance respectively, where $$\mu = \frac{T_p}{T_s}$$

and $\Delta = \Delta_p - \Delta_s$. A small angle $\xi$ is also used for the description of the differential transmission $$\xi = \tan^{-1}\left(\frac{\mu-1}{\mu+1}\right) \approx \frac{1}{2}(\mu-1).$$

In the absence of differential transmission, $\mu=1$, $\xi=0$, and of retardance, $\Delta=0$.

Differential transmission has been observed to be stronger in a microscope with dry, high numerical aperture condenser and objective lenses. Radial retardance originates from the oblique passage of a ray through optical multi-layer coatings and from radially symmetric stress in lenses.

If the optical system, including the slide and cover slip that lie between the condenser and objective lenses, has N surfaces, then the relationships of the following expression (12) are found:

$$T_p = \prod_{j=1}^{N} \tau_{pj} \quad T_s = \prod_{j=1}^{N} \tau_{sj}, \quad \mu = \prod_{j=1}^{N} \hat{\mu}_j \quad \xi \approx \sum_{j=1}^{N} \hat{\xi}_j \quad \Delta = \sum_{j=1}^{N} \delta_j \tag{12}$$

In expression (12), $t_{pj}$ and $t_{sj}$ represent the amplitude transmission coefficients and $\delta_j$ represents the phase shift for the optical surface with number j.

Hence, $$\hat{\mu} = \frac{\tau_{pj}}{\tau_{sj}}$$

and $$\hat{\xi}_j = \frac{1}{2}(\hat{\mu}_j - 1).$$

Eigenvectors of the matrix of expression (11) are linearly polarized. The polarization direction of the p-component is along the azimuth angle θ of the rays. Values of the radial differential transmittance and retardance depend only on the radius ρ. They lead to orthogonal polarization components in the beam after traversing the optical system.

The orthogonal polarization component reduces the extinction of a non-confocal optical system. The intensity ratio of the initial polarization $I_x'$ over the orthogonal polarization $I_y''$ of the output beam is called the system extinction factor κ of the complete optical system, such as a microscope. The extinction factor of the complete system can be derived from the extinction of each individual ray η(ρ) as written in expression (13) as follows:

$$\kappa = \frac{I_x'}{I_y'} = \frac{\int_0^{2\pi}\int_0^1 I(\rho,\theta)(1-\eta^{-1}(\rho))\rho\, d\rho\, d\theta}{\int_0^{2\pi}\int_0^1 I(\rho,\theta)\eta^{-1}(\rho)\rho\, d\rho\, d\theta} \tag{13}$$

In expression (13), I(ρ,θ) represents the intensity distribution of the initial beam in the front aperture plane of the condenser. There are also other sources of depolarization in optical systems, such as the scattering of light by dust, contaminations, and mountings, and the birefringence of glass, which are carefully removed.

Several particular cases serve as examples. When the initial beam is linearly polarized $$\vec{E} = \begin{pmatrix} 1 \\ 0 \end{pmatrix},$$

the output rays can be written as expression (14) as follows:

$$\vec{E}' = \frac{1}{2}T_s e^{i\Delta_s}\begin{pmatrix} \mu e^{i\Delta} + 1 + (\mu e^{i\Delta} - 1)\cos 2\theta \\ (\mu e^{i\Delta} - 1)\sin 2\theta \end{pmatrix} \tag{14}$$

The extinction η of a ray is determined by a formula written as expression (15) as follows:

$$\eta = \frac{E_x'(E_x')^*}{E_y'(E_y')^*} \tag{15}$$

$$= \frac{(\mu+1)^2 + (\mu-1)^2\cos^2 2\theta - 4\mu\sin^2\frac{\Delta}{2}\sin^2 2\theta}{\left((\mu-1)^2 + 4\mu\sin^2\frac{\Delta}{2}\right)\sin^2 2\theta}$$

$$\approx \frac{1}{\left(\tan^2\xi + \sin^2\frac{\Delta}{2}\right)\sin^2 2\theta}$$

As follows from expression (15), when the optical system is disposed between two crossed linear polarizers, the image of the exit pupil has a cross shape. The cross branches are parallel to the polarizers.

If there is differential transmittance only but no retardance then the relationships of the following expression (16) are found:

$$\vec{E}' = \frac{T_p + T_s}{2}\begin{pmatrix} 1 + \tan\xi\cos 2\theta \\ \tan\xi\sin 2\theta \end{pmatrix} \tag{16}$$

Thus, all output rays are linearly polarized with a small rotation of the polarization plane υ as written in expression (17) as follows:

$$\upsilon(\rho) = \tan^{-1}\left(\frac{\tan\xi(\rho)\sin 2\theta}{1 + \tan\xi(\rho)\cos 2\theta}\right) \approx \xi(\rho)\sin 2\theta \tag{17}$$

The maximal rotation of the polarization plane is near the diagonal directions (θ=+45 degrees or −45 degrees) and amounts to approximately ξ. The direction of rotation is positive in the first and third quadrants and negative in the second and fourth quadrants. The exact value of the maximal rotation, $\upsilon_{max}$, may equal $$\tan^{-1}\left(\frac{\tan\xi}{\sqrt{1-\tan^2\xi}}\right)$$

and may be observed at $$\theta_{max} = \pm\left(45° + \frac{1}{2}\upsilon_{max}\right)$$

Hence, the distribution of the polarization plane rotation and the intensity distribution in Maltese cross are not quite symmetrical to the diagonal axes.

In case of radial retardance only the field vector of an output ray is as written in expression (18) as follows:

$$\vec{E}' = e^{i\Delta_s}\begin{pmatrix} \cos\frac{\Delta}{2} + i\sin\frac{\Delta}{2}\cos 2\theta \\ i\sin\frac{\Delta}{2}\sin 2\theta \end{pmatrix} \tag{18}$$

The output rays are elliptically polarized with azimuth Ψ and ellipticity angle ε as written in expression (19) as follows:

$$\Psi = \frac{1}{2}\tan^{-1}\left(\frac{\tan^2\frac{\Delta}{2}\sin 4\theta}{1+\tan^2\frac{\Delta}{2}\cos 4\theta}\right) \approx 0 \text{ and} \tag{19}$$

$$\varepsilon = \tan^{-1}\left(\frac{\sin\Delta\sin 2\theta}{1+\sqrt{1-\sin^2\Delta\sin^2 2\theta}}\right) \approx \frac{1}{2}\Delta\sin 2\theta.$$

Hence, the long axis of the vibration ellipse is almost parallel to the initial polarization plane. The ellipticity is maximal in the diagonal directions and is zero for θ=0°,90°. The sign of the ellipses are opposite in neighboring quadrants.

In at least some cases, the entrance pupil of a microscope is illuminated with a uniform beam I(ρ, θ)=const, and $\eta^{-1}(\rho)\ll 1$. From expression (14) the following expression (20) may be obtained:

$$\kappa = \frac{\pi}{\int_0^{2\pi}\int_0^1 \rho\left(\tan^2\xi(\rho) + \sin^2\frac{\Delta(\rho)}{2}\right)\sin^2 2\theta\, d\rho\, d\theta} = \frac{1}{\int_0^1 \rho\left(\tan^2\xi(\rho) + \sin^2\frac{\Delta(\rho)}{2}\right)d\rho} \quad (20)$$

When the initial beam has left circular polarization $$\vec{E} = \frac{1}{\sqrt{2}}\begin{pmatrix}1\\i\end{pmatrix},$$

the output polarization $\vec{E}'$ can be described as a superposition of left and right circular polarization states $\vec{E}'_l$ and $\vec{E}'_r$, as written in expression (21) as follows:

$$\vec{E}' = \vec{E}'_l + \vec{E}'_r = \frac{1}{2\sqrt{2}}T_s e^{i\Delta_s}(\mu e^{i\Delta}+1)\begin{pmatrix}1\\i\end{pmatrix} + \frac{1}{2\sqrt{2}}T_s e^{i\Delta_s}(\mu e^{i\Delta}-1)e^{i2\theta}\begin{pmatrix}1\\-i\end{pmatrix} \quad (21)$$

The extinction η of a ray is determined by the following relationships as written in expression (22) as follows:

$$\eta = \frac{E'_l(E'_l)^*}{E'_r(E'_r)^*} = \frac{(\mu+1)^2 - 4\mu\sin^2\frac{\Delta}{2}}{(\mu-1)^2 + 4\mu\sin^2\frac{\Delta}{2}} \approx \frac{1}{\tan^2\xi + \sin^2\frac{\Delta}{2}} \quad (22)$$

Hence, in the case of crossed circular polarizers, the distribution of light in the exit pupil corresponds to a dark central area surrounded by a bright ring. Extinction factor κ of the complete optical system is determined by the ratio as written in expression (23) as follows:

$$\kappa = \frac{\pi}{\int_0^{2\pi}\int_0^1 \rho\left(\tan^2\xi(\rho) + \sin^2\frac{\Delta(\rho)}{2}\right)d\rho\, d\theta} = \frac{1}{2\int_0^1 \rho\left(\tan^2\xi(\rho) + \sin^2\frac{\Delta(\rho)}{2}\right)d\rho} \quad (23)$$

A comparison of expressions (20) and (23) show that the extinction factor for systems with crossed linear polarizers is twice as large as for crossed circular polarizers under otherwise common conditions. Moreover, the extinction of a system with crossed circular polarizers can further deteriorate by the use of imperfect quarterwave plates for the circular polarizers.

Radially symmetric polarization aberrations may be found in plane parallel plates and lenses (M. Shribak, S. Inoué, R. Oldenbourg "Rectifiers for suppressing depolarization caused by differential transmission and phase shift in high NA lenses", in Polarization Analysis, Measurement, and Remote Sensing LV, D. II. Goldstein and D. B. Chenault, Editors, Proc. SPIE 4481, p. 163–174, (2001)). With respect to plane parallel plates, glass plane parallel plates are often used between the condenser and objective lens of a conventional microscope, e.g., as slide and/or cover glass. In at least some cases, the glass plates lack surface coatings. Polarization aberrations are contributed by such a plate. Incidence and refractive angles are noted as ν and ν' respectively. The refractive index of the plate is n. The focused beam has a numerical aperture NA. In the analysis, the multiple beam interference inside the plate is treated as negligible, and it is assumed that no phase shift exists between the p- and s-polarization components (see Sec.1.2 in M. Born and E. Wolf, "Principles of Optics", 6th edition, pp. 38–47, Pergamon Press, Oxford, 1987.). As follows from the Fresnel formulae, as found in M. Born and E. Wolf, "Principles of Optics", 6th edition, pp. 38–47, Pergamon Press, Oxford, 1987, the amplitude transmission ratio after passing the two surfaces of a dry plane parallel plate is as written in expression (24) as follows:

$$\mu = 1 + \tan^2(\nu - \nu') \quad (24)$$

In view of $\sin\nu_{max}$=NA and ρ=1 for the marginal ray, the following expression (25) may be obtained:

$$\sin\nu = \rho\,NA \text{ and } \sin\nu' = \frac{\rho}{n}NA. \quad (25)$$

Accordingly, the angle ξ can be found by an equation as written in expression (26) as follows:

$$\tan\xi = \frac{n^2 - \left(\sin^2\nu + \cos\varepsilon\sqrt{n^2-\sin^2\nu}\right)^2}{n^2 + \left(\sin^2\nu + \cos\varepsilon\sqrt{n^2-\sin^2\nu}\right)^2} \quad (26)$$

FIG. 12 shows the dependence of the ray extinction $$\eta = \frac{1}{\tan^2\xi}$$

on the sine of the incidence angle ν for plates made from Schott glasses BK-7 (n=1.51) and SF-57 (n=1.84). The extinction applies for a circularly polarized ray or a linearly polarized ray with azimuth 45 degrees. As shown in FIG. 12, the plate with the higher refractive glass introduces more depolarization.

Theoretical studies of the rotation of polarized light by plane parallel plates, based on similar principles and with experimental verification, may be found in F. E. Wright, "The formation of interference figures a study of the phenomena exhibited by transparent inactive crystal plates in coherent polarized light", *J. Opt. Soc. Am*, 7: pp. 778–817, 1923.

In an example pertaining to uncoated lenses, a thin positive lens may lack a coating, may have curvature radii of the first and second surface of $R_1$ and $R_2$, and may have a focal length of the lens of f. In such a case, the lens shape factor K is as written in expression (27) as follows:

$$K = (n-1)\frac{f}{R_1} \tag{27}$$

Incidence and refractive angles on the first and the second surfaces are noted as $v_1$, $v_1'$, $v_2$ and $v_2'$, respectively. The amplitude transmission ratio after passing two lens surfaces is as written in expression (28) as follows:

$$\mu = \frac{1}{\cos(v_1 - v_1')\cos(v_2 - v_2')} \tag{28}$$

A lens with equal differences $v_1-v_1'$ and $v_2-v_2'$ induces a minimal angle $\xi$ and correspondingly minimal polarization aberrations. (Yu. M. Klimkov, M. I. Shribak, "Influence of lens shape on polarization modification of axial beam", *Izvestiya vysshikh uchebnykh zavedeniy USSR. Geodezia i aerophotos'omka*, No. 5, pp. 128–139, 1990.). Similar minimizing depolarization in lenses has been also proposed by F. E. Wright.

In a case in which a collimated, axial beam falls on the lens, relationships as written in the following expression (29) are found:

$$(v_1-v_1')-(v_2'-v_2)=\Omega \tag{29}$$

In expression (29), 106 is the angle by which a ray is tilted to the lens axis after passing through the lens.

Thus, for an optimal lens the incidence and refractive angles are:

$$(v_1 - v_1') = (v_2' - v_2) = \frac{\Omega}{2} \text{ and } \eta = \frac{\left(1 + \cos^2\frac{\Omega}{2}\right)^2}{\sin^4\frac{\Omega}{2}}.$$

For example, if $\sin \Omega = 0.3$ then $\eta \approx 7700$.

A plane convex lens with the plane as the first surface has the shape factor K=0 and differences $(v_1-v_1')-(v_2'-v_2)=\Omega$. Therefore its extinction is $$\eta = \frac{1}{\tan^4\frac{\Omega}{2}}.$$

If $\sin \Omega = 0.3$ then $\eta \approx 1900$ which is four times less than for the optimal lens.

Figure 13:
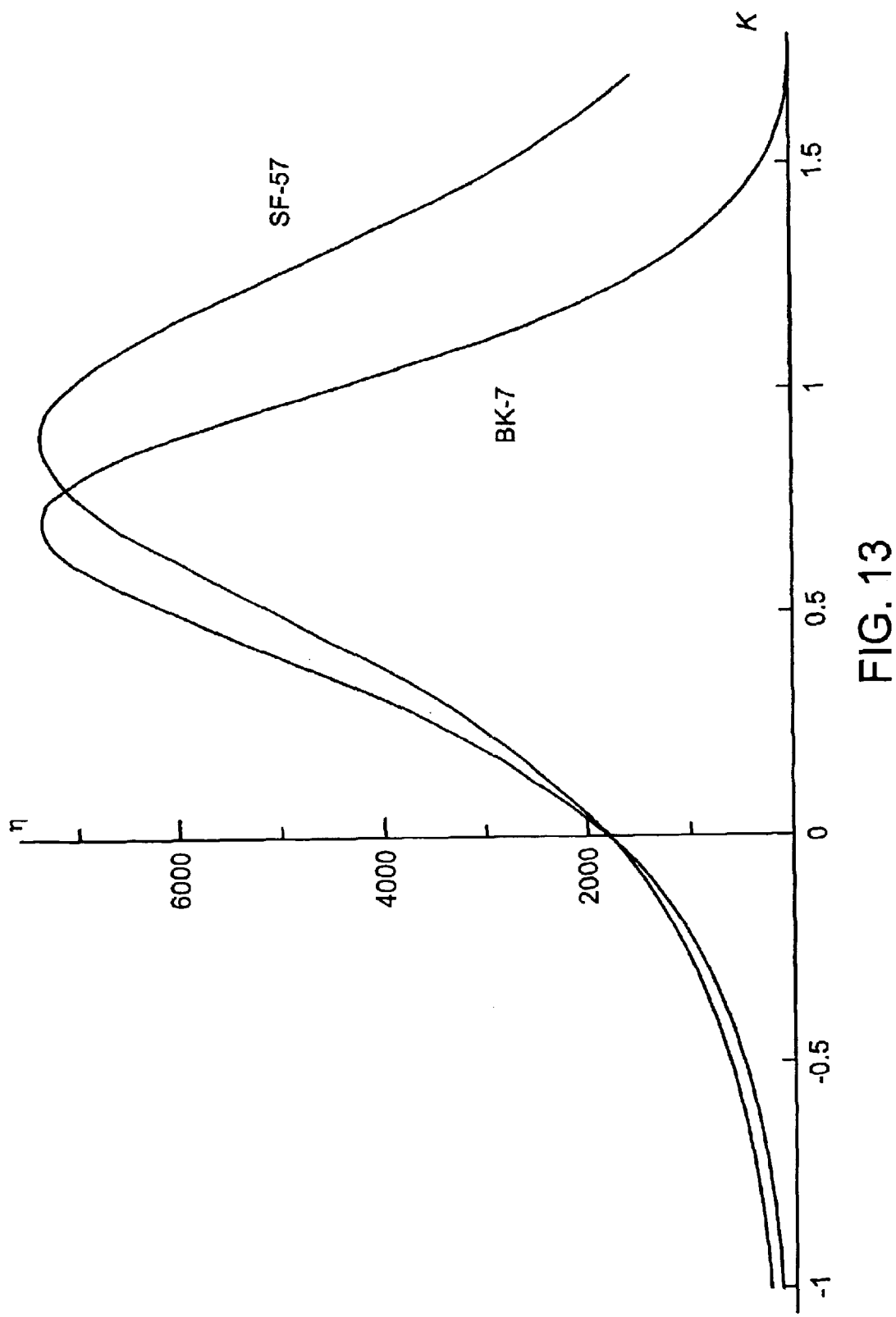
FIG. 13 illustrates a chart of ray extinction versus lens shape factor.

In FIG. 13, the extinction is given as a function of the shape factor for lenses made from Schott glasses BK-7 (n=1.51) and SF-57 (n=1.84). In particular, FIG. 13 shows the ray extinction $\eta$ of a ray with NA=0.3 versus the shape factor K for single lenses made from Schott glasses BK-7 (n=1.51) and SF-57 (n=1.84). This extinction corresponds to a circularly polarized ray or a linearly polarized ray with azimuth 45 degrees. The initial ray is parallel to the lens axis. The ray angle $\Omega$ in the image field corresponds to NA=0.3.

As shown in FIG. 13, the uncoated lenses from different refractive glass have the same maximal extinction of approximately 7700, which drops to about 1900 when the first surface is plane. Hence, the beam depolarization depends on the lens shape factor and lenses possessing a shape factor between 0.5 and 1.0 have maximal extinction. Accordingly, lenses that produce approximately equal bending of the ray at both surfaces have the best or nearly the best extinction, and also produce minimal spherical aberration. In contrast, menisci produce maximal depolarization.

Figure 14:
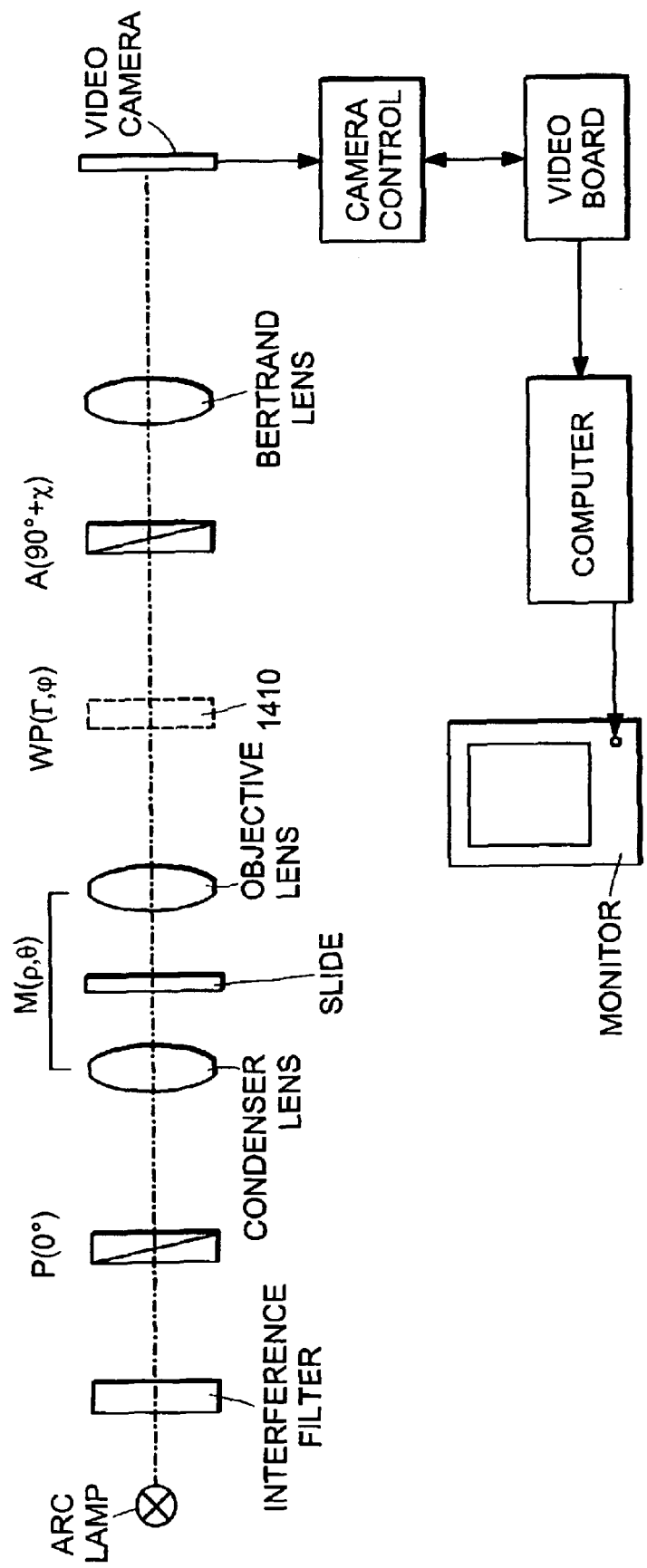
FIG. 14 schematically illustrates a configuration for measuring polarization aberrations in a microscope.

Measurements may be taken of radially symmetric polarization aberrations. FIG. 14 helps to illustrate a rotated polarizer and rotated compensator technique for measuring the radial differential transmission and radial retardance. In particular, FIG. 14 illustrates an optical arrangement for measuring radially symmetric polarization aberrations in which $M(\rho, \theta)$ represents a microscope optical system, $P(0°)$ represents a polarizer with azimuth 0 degrees, $A(90°+\chi)$ represents an analyzer with azimuth $90°+\chi$, $WP(\Gamma, \phi)$ represents a compensation wave plate with small retardance $\Gamma$ and azimuth $\phi$.

Figure 15A:
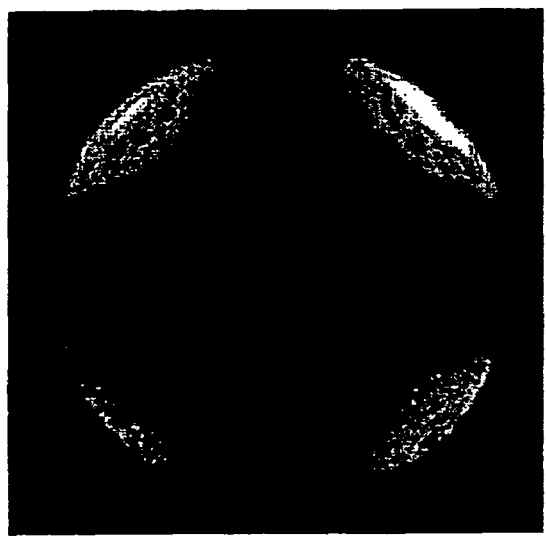
FIGS. 15A–15B illustrate displays of an aperture plane obtained using the measurement system of FIG. 14.
Figure 15B:
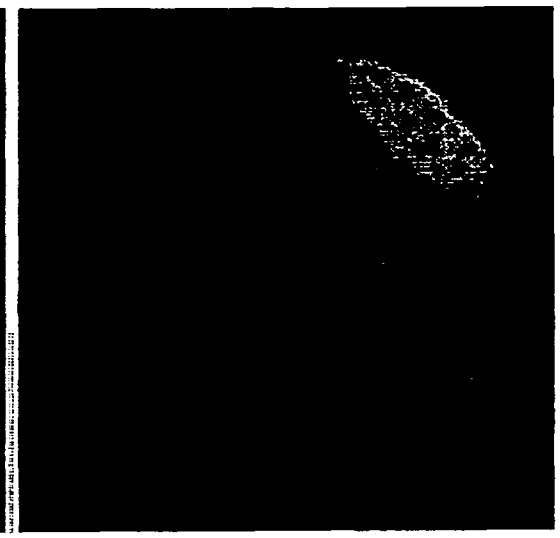

In FIG. 14, the optical system with radial polarization aberrations is disposed between a linear polarizer and analyzer, one of which can be turned. A Bertrand lens creates an image of the exit pupil on a video camera. FIGS. 15A–15B show images of the back aperture of a dry objective Plan-NEOFLUAR 40x/0,85Pol between linear polarizer and analyzer in a Zeiss microscope Axiovert 200M; FIG. 15A shows an image corresponding to a polarizer and analyzer that are crossed, and FIG. 15B shows an image corresponding to an analyzer rotated by 6 degrees.

If the polarizer and analyzer are crossed, a cross shape is produced as shown by example in FIG. 15A. When the analyzer is turned by an angle $\chi$ from the crossed position, the intensity distribution $I'(\rho, \theta)$ in the image is as written in expression (30) as follows:

$$I'(\rho, \theta) = \tag{30}$$
$$\left((\sin(2\theta - \chi) \cdot \tan\xi(\rho) - \sin\chi)^2 + \sin^2(2\theta - \chi) \cdot \sin^2\frac{\Delta(\rho)}{2}\right) \cdot I.$$

In expression (30), it is assumed that values $\xi$ and $\Delta$ are small and I is the initial intensity distribution after the polarizer. The cross transforms into two arcs as shown by example in FIG. 15B. The distance between the arcs depends on the analyzer azimuth and the values of differential transmission. If radial retardance is nonzero and overwhelms the differential transmission, rotating the analyzer does not produce dark arcs but does cause the cross to fade away.

For a point at radius $\rho\rho$ along the diagonal with azimuth coordinate $\theta\theta=45°$ the intensity is as written in expression (31) as follows:

$$I'(\rho, 45°) = \left((\tan\xi(\rho) - \sin\chi)^2 + \sin^2\frac{\Delta(\rho)}{2}\right) \cdot I. \tag{31}$$

In expression (31) it is assumed that $\chi\chi$ is small and terms with $\chi^4$, $\chi^6$ and more are neglected.

The intensity at a point along the diagonal is at a minimum when $\chi=\xi(\rho)$ as written in expression (32) as follows:

$$I'_{min} = I \cdot \sin^2\frac{\Delta(\rho)}{2} \tag{32}$$

The polarization turn $\xi$ and retardance $\Delta$ are equal to zero in the central point ($\rho=0$). The central point intensity $I_{cnt}'$ is as written in expression (33) as follows:

$$I_{cnt}' = I \cdot \sin^2 \chi = I \cdot \tan^2 \xi(\rho) \tag{33}$$

Thus, the angle $\xi(\rho)$ can be found by rotating one of the polarizers to find the minimum intensity at a point with radius $\rho\rho$ and azimuth $\theta=45°$. At minimum intensity the relationship of the following expression (34) is found:

$$\xi(\rho)=\chi \tag{34}$$

If the minimum intensity is not zero, the lens also possesses radial retardance. For a determination of the radial retardance, the minimum intensity $I_{min}'$ is measured at the point and the intensity $I_{cnt}'$ is measured in the center of the pattern, and the radial retardance $\Delta(\rho)$ is as written in expression (35) as follows:

$$|\Delta(\rho)| = 2\sin^{-1}\left(\sqrt{\frac{I'_{min}}{I'_{cnt}}} \cdot \tan\chi\right) \approx 2\chi \cdot \sqrt{\frac{I'_{min}}{I'_{cnt}}} = 2\xi(\rho) \cdot \sqrt{\frac{I'_{min}}{I'_{cnt}}}. \quad (35)$$

The rotated polarizer technique does not include distinguishing the slow and fast axes of the lens birefringence.

A rotated compensator technique is possible that uses a rotating compensator made of a wave plate WP with retardance $\Gamma$ below 20 degrees for finding the radial differential transmittance and retardance of a lens. An example of the compensator is represented in FIG. 14 by dashed lines 1410. In FIG. 14, the polarizer and analyzer are crossed. In the case of small values $\xi$ and $\Delta$, the intensity distribution $I'(\rho, \theta)$ in the image of the exit pupil is as written in expression (36) as follows:

$$I'(\rho, \varphi) = \left(\sin^2 2\theta \cdot \tan^2 \xi(\rho) + \left(\sin\frac{\Gamma}{2} \cdot \sin 2\varphi + \sin\frac{\Delta(\rho)}{2} \cdot \sin 2\theta\right)^2\right) \cdot I \quad (36)$$

In expression (36), $\phi$ is the azimuth of the slow axis of the compensator and $I$ is the initial distribution of intensity after the polarizer.

When $\phi=0°$ (see expression (36)), the intensity is $I'(\rho, \theta)=0$ for points with $\theta=0°$ and $\theta=90°$, which results in a cross at the back aperture similar in appearance to the cross generated by differential transmission alone. However, if the compensator is turned by an angle $\phi \neq 0$, the cross transforms into two arcs. The distance between the arcs depends on the compensator azimuth and the value of radial retardance. In the presence of differential transmission that overwhelms the radial retardance, the cross fades away when the compensator is rotated.

For the diagonal points with azimuth coordinate $\theta=45°$, the intensity is as written in expression (37) as follows:

$$I'(\rho, 45°) = \left(\tan^2 \xi(\rho) + \left(\sin\frac{\Gamma}{2} \cdot \sin 2\varphi + \sin\frac{\Delta(\rho)}{2}\right)^2\right) \cdot I. \quad (37)$$

The intensity has a minimum when $$\sin\frac{\Gamma}{2} \cdot \sin 2\varphi = -\sin\frac{\Delta(\rho)}{2}.$$

Hence, the relationships of the following expression (38) are found:

$$\Delta(\rho) = -\Gamma \cdot \sin 2\phi, \text{ and} \quad (38)$$

$$I_{min}' = I \cdot \tan^2 \xi(\rho).$$

Simultaneously, the central point intensity $I_{cnt}'$ is as written in expression (39) as follows:

$$I_{cnt}' = I \cdot \sin^2 \frac{\Gamma}{2} \cdot \sin^2 2\varphi = I \cdot \sin^2 \frac{\Delta(\rho)}{2} \quad (39)$$

Thus, the radial retardance $\Delta(\rho)$ may be found by searching for the minimum intensity in a point with radius $\rho$ and $\theta=45°$ and then determining the angle $\xi(\rho)$ by measuring the intensities $I_{min}'$ and $I_{cnt}'$ when the minimum has been found, as written in expression (40) as follows:

$$\xi(\rho) = \tan^{-1}\left(\sqrt{\frac{I'_{min}}{I'_{cnt}}} \cdot \sin\frac{\Gamma}{2} \cdot \sin 2\varphi\right) \approx \frac{1}{2}\Gamma \cdot \sin 2\varphi \cdot \sqrt{\frac{I'_{min}}{I'_{cnt}}} = \quad (40)$$

$$-\frac{\Delta(\rho)}{2} \cdot \sqrt{\frac{I'_{min}}{I'_{cnt}}}.$$

The technique with the rotating analyzer allows a determination of the sign of the angle $\xi(\rho)$ but precludes determining the sign of the lens retardance. Another technique with a rotating compensator allows a determination of the sign of the lens retardance, but precludes determining the sign of the angle $\xi(\rho)$.

Depolarization can be rectified in a high numerical aperture microscope. A polarization rectifier can be used to reduce beam depolarization in a high numerical aperture microscope as described in S. Inoué and W. L. Hyde, "Studies on depolarization of light at microscope lens surfaces. II. The simultaneous realization of high resolution and high sensitivity with the polarizing microscopy", *The Journal of Biophysical and Biochemical Cytology*, 3, pp. 831–838, 1957 or U.S. Pat. No. 2,936,673 to W. L. Hide and S. Inoué, entitled "Polarizing optical system". A first kind of rectifier contains a zero power meniscus. A second kind of rectifier uses a sectored liquid crystal device such as the sectored universal compensator described above. Also, peripheral rays with low extinction ratio can be removed by a cross-shaped aperture stop in the pupil plane according to Japan Patent No.60-220307 to Y. Iba, entitled "Polarizing microscope". However, the reduction of the aperture area causes considerable loss of light intensity and decreases the microscope resolution.

A rectifier can be placed in the illumination path of the microscope before the condenser lens or in the imaging path after the objective lens. Multiple rectifiers may be used, e.g., one rectifier in the illumination path before the condenser lens and another rectifier in the imaging path after the objective lens, in which case different condenser and objective lenses can be combined in the microscope and a highly uniform polarization pattern may be observed in the specimen plane.

Figure 16:
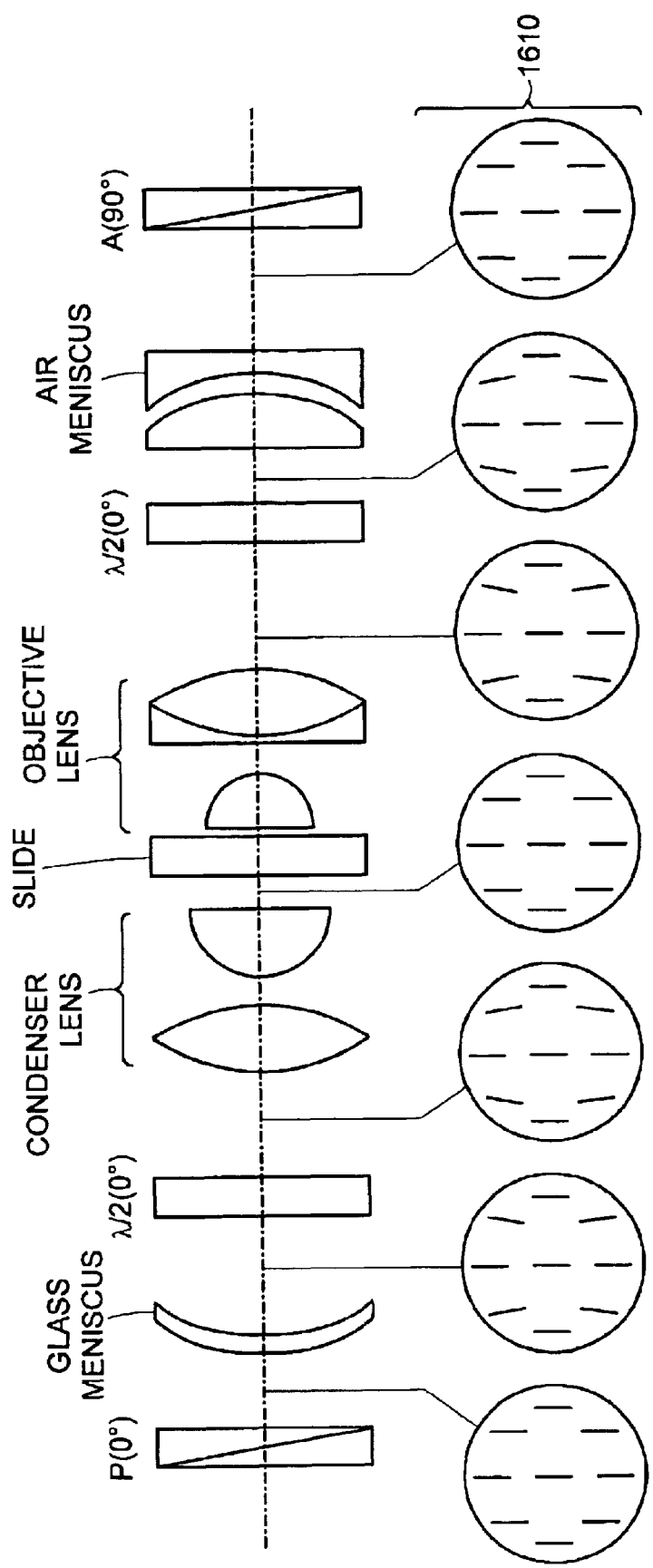
FIGS. 16, 18, 19 schematically illustrate microscope systems with different types of polarization rectifiers.

FIG. 16 illustrates a microscope scheme with two meniscus polarization rectifiers, which can be used to decrease the depolarization of a linearly polarized beam. The rectifiers include a glass or air meniscus with zero optical power and a half wave plate HWP.

The meniscus creates the same distribution of the polarization rotation angle and ellipticity as the compensated optical element. The principal axis of the half wave plate is parallel to the polarizer P. The half wave plate inverts the rotated polarization with respect to the plate's principal axis and the condenser or the objective or both condenser and objective compensate for the rotation. Accordingly, in the exit pupil, the beam has the correct linear polarization distribution and will be extinct by the analyzer A.

The optical schematic of FIG. 16 illustrates the different distributions of beam polarizations between elements of the microscope. The differential transmission of lenses rotates the polarization plane of rays in the direction of the plane of incidence (the radial direction) as shown in diagrams 1610 in FIG. 16. The rotation is zero if the electric vector is parallel or perpendicular to incidence plane and is at or near a maximum for $\theta \approx 45°$.

The first scheme of meniscus rectifier is described by the matrix equation as written in expression (41) as follows:

$$\vec{E}' = M_{micr} \bullet M_{\lambda/2}(0°) \bullet M_{rect} \bullet \vec{E} \qquad (41)$$

In expression (41), $\vec{E}'$ and $$\vec{E} = \begin{pmatrix} 1 \\ 0 \end{pmatrix}$$

represent the field vectors of the output and input beams, $M_{micr}$ represents the Jones matrix of the microscope optical system, $M_{\lambda/2}(0°)$ represents the matrix of the half wave plate with azimuth 0 degrees, and $M_{rect}$ represents the matrix of the meniscus rectifier. It is taken into account that the matrices of the optical system and rectifier are the same (see expression (11)) and $$M_{\lambda/2}(0°) = \begin{pmatrix} 1 & 0 \\ 0 & -1 \end{pmatrix},$$

and the following expression (42) is obtained:

$$\vec{E}' = \frac{1}{4} T_s^2 \begin{pmatrix} (\mu e^{i\Delta} + 1)^2 + 2(\mu^2 e^{i2\Delta} - 1)\cos 2\theta + (\mu e^{i\Delta} - 1)^2 \cos 4\theta \\ (\mu e^{i\Delta} - 1)^2 \sin 4\theta \end{pmatrix} \qquad (42)$$

Thus, the rectifier does not remove the orthogonal component completely. The extinction ratio η of a ray is as written in expression (43) as follows:

$$\eta \approx \frac{1}{\left(\tan^2 \xi + \sin^2 \frac{\Delta}{2}\right)^2 \sin^2 4\theta}. \qquad (43)$$

Figure 17B:
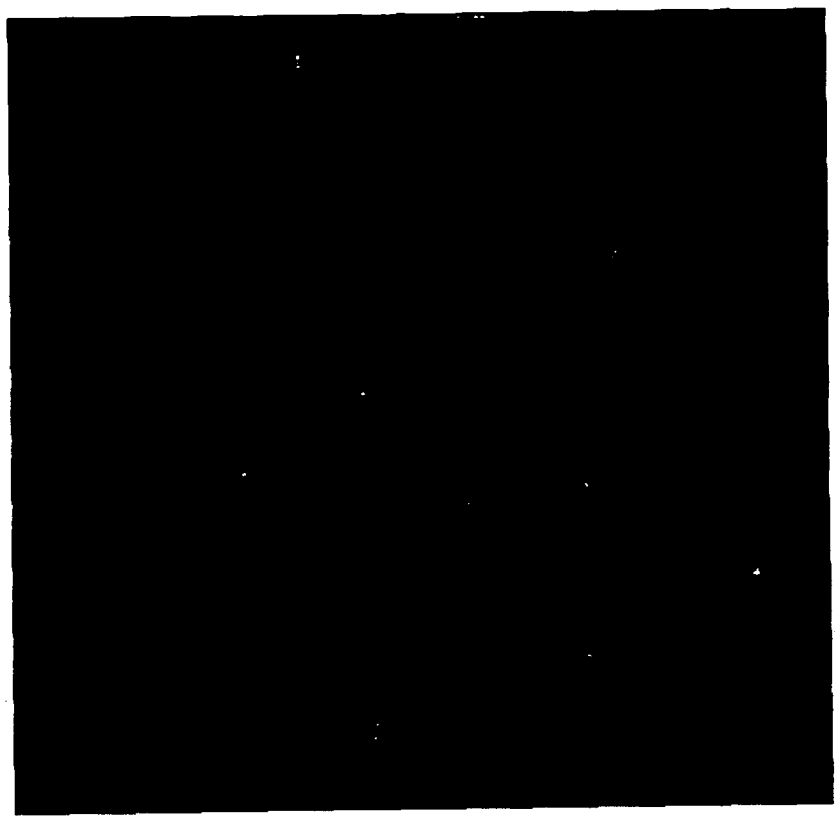
FIGS. 17A–17B illustrate displays of an aperture plane obtained using the optical system of FIG. 16.
Figure 17A:
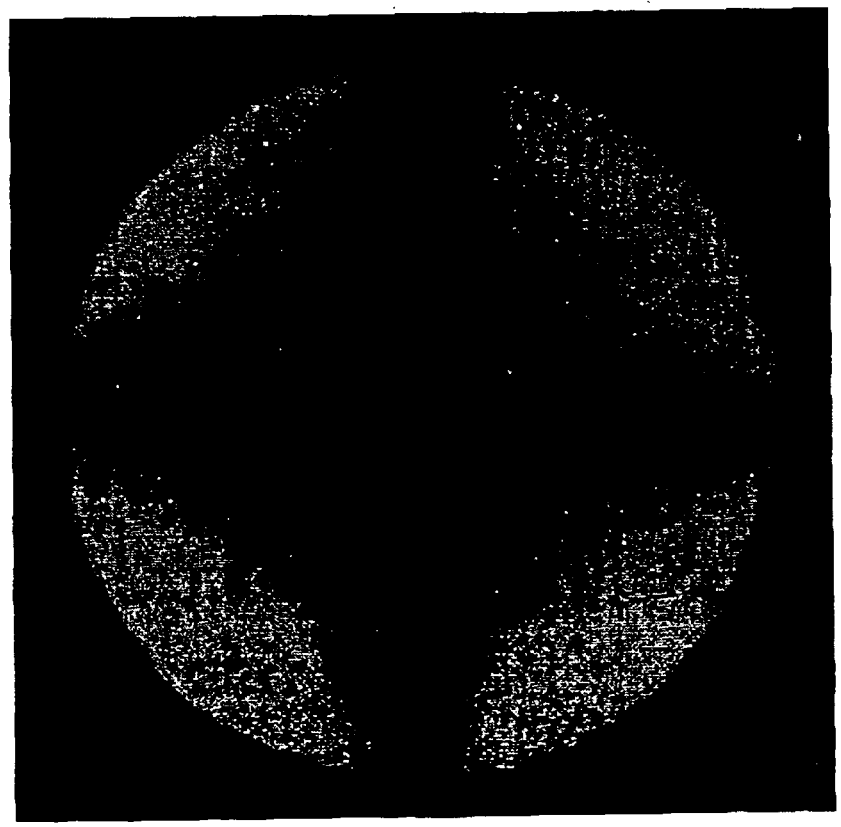

If $$\tan \xi = \sin \frac{\Delta}{2} = 0.05,$$

the extinction ratio is improved 100 times as compared to the case without the rectifier (see expression (15)). FIGS. 17A–17B show images recorded with a microscope equipped with such meniscus rectifiers. In particular, with respect to S. Inoué and W. L. Hyde, "Studies on depolarization of light at microscope lens surfaces. II. The simultaneous realization of high resolution and high sensitivity with the polarizing microscopy", *The Journal of Biophysical and Biochemical Cytology*, 3, pp. 831–838, 1957, FIGS. 17A–17B include images of the back aperture of a pair 1.25 NA oil immersion objectives between crossed polarizers without rectifiers (FIG. 17A) and the same pair equipped with meniscus rectifiers (FIG. 17B).

Other rectification schemes for systems using primarily linearly polarized light have been reported. One such scheme uses instead of the optical meniscus a second objective or condenser with the same polarization optical parameters as the first one (see Japan Patent No. 2002-6222 to K. Toshimitsu, entitled "Microscope provided with function for compensating rotation of polarizing direction"). An additional wave plate can remove polarization aberrations due to radial retardance as shown in U.S. Pat. No. 3,052,152 to C. J. Koester, entitled "Optical compensation system". Meniscus with coated and uncoated surfaces gives the same effect (see U.S. Pat. No. 6,137,626 to H. Takaoka, entitled "Optical system having polarization compensating optical system"). These latter rectification schemes can be applied to light beams with linear polarization.

Figure 18:
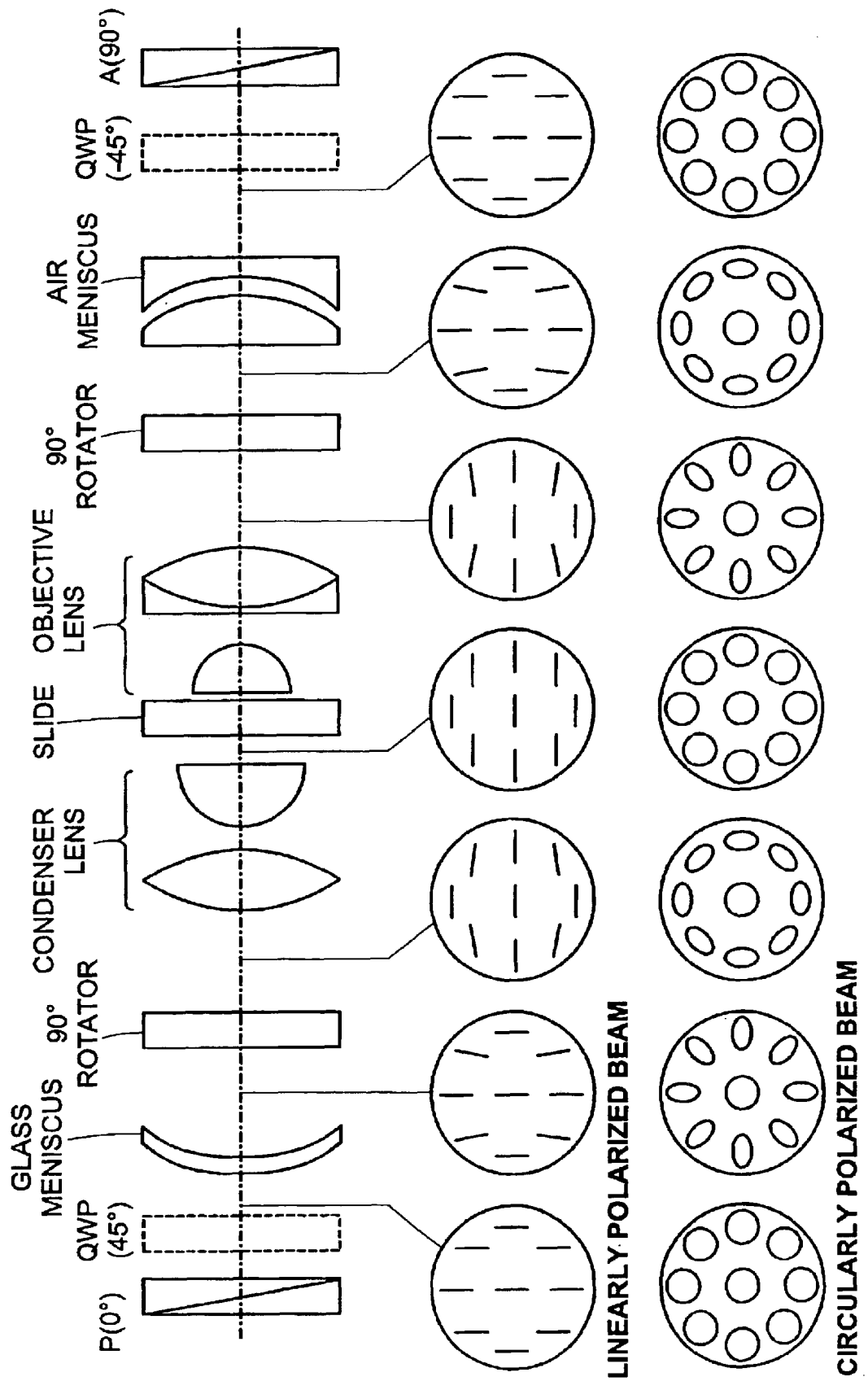

In a second rectifier scheme, referred to as a universal meniscus rectifier, a 90 degree polarization rotator is installed instead of the half wave plate (see FIG. 18 which shows an optical system with two universal meniscus rectifiers). The rotator can be a plane parallel plate from an optically active crystal, which is cut perpendicular to its optical axis, or a combination of two half-wave plates having principal axes that are rotated by 45 degrees with respect to each other. For example, a z-cut quartz plate with thickness of 3.8 mm can be used as a 90 degree rotator for λ=546 nm. The universal meniscus rectifier allows rectification of a beam with any initial polarization state. FIG. 18 shows the different distributions of beam polarizations for a linearly and circularly polarized beam. In the latter case, using a circularly polarized beam, the differential transmission of lenses narrows ("squeezes") the polarization ellipse of rays in the radial direction as shown in the diagrams of FIG. 18. If the meniscus rectifier has optical coatings with the same radial retardance as the microscope optical system, the influence of this radial retardance is reduced as well.

The universal meniscus rectifier is described by the following matrix equation as written in expression (44) as follows:

$$\vec{E}' = M_{micr} \bullet M_{rot}(90°) \bullet M_{rect} \bullet \vec{E}, \qquad (44)$$

In expression (44), $\vec{E}'$ and $\vec{E}$ represent the electric field vectors of the output and input rays, $M_{micr}$ represents the Jones matrix of the microscope optical system, $M_{rot}(90°)$ represents the matrix of the 90 degree rotator and $M_{rect}$ represents the matrix of the meniscus rectifier. In this case, the matrices of the optical system and rectifier are equal and include the differential transmittance and radial retardance terms (see expression (11)) and $$M_{rot}(90°) = \begin{pmatrix} 0 & 1 \\ -1 & 0 \end{pmatrix}.$$

After forming the matrix product of the matrices, the Jones matrix of the microscope with rectifier may be written as expression (45) as follows:

$$M_{micr} \cdot M_{rot}(90°) \cdot M_{rect} = T_p T_s e^{i(\Delta_p + \Delta_s)} \begin{pmatrix} 0 & 1 \\ -1 & 0 \end{pmatrix}. \qquad (45)$$

As follows from expression (45), the microscope preserves the polarization structure of the entrance pupil and completely or nearly completely removes the depolarization caused by differential transmission and radial retardance for any initial polarization state. The electric field vectors of the output rays are turned by 90 degrees as compared to the initial polarization.

Figure 19:
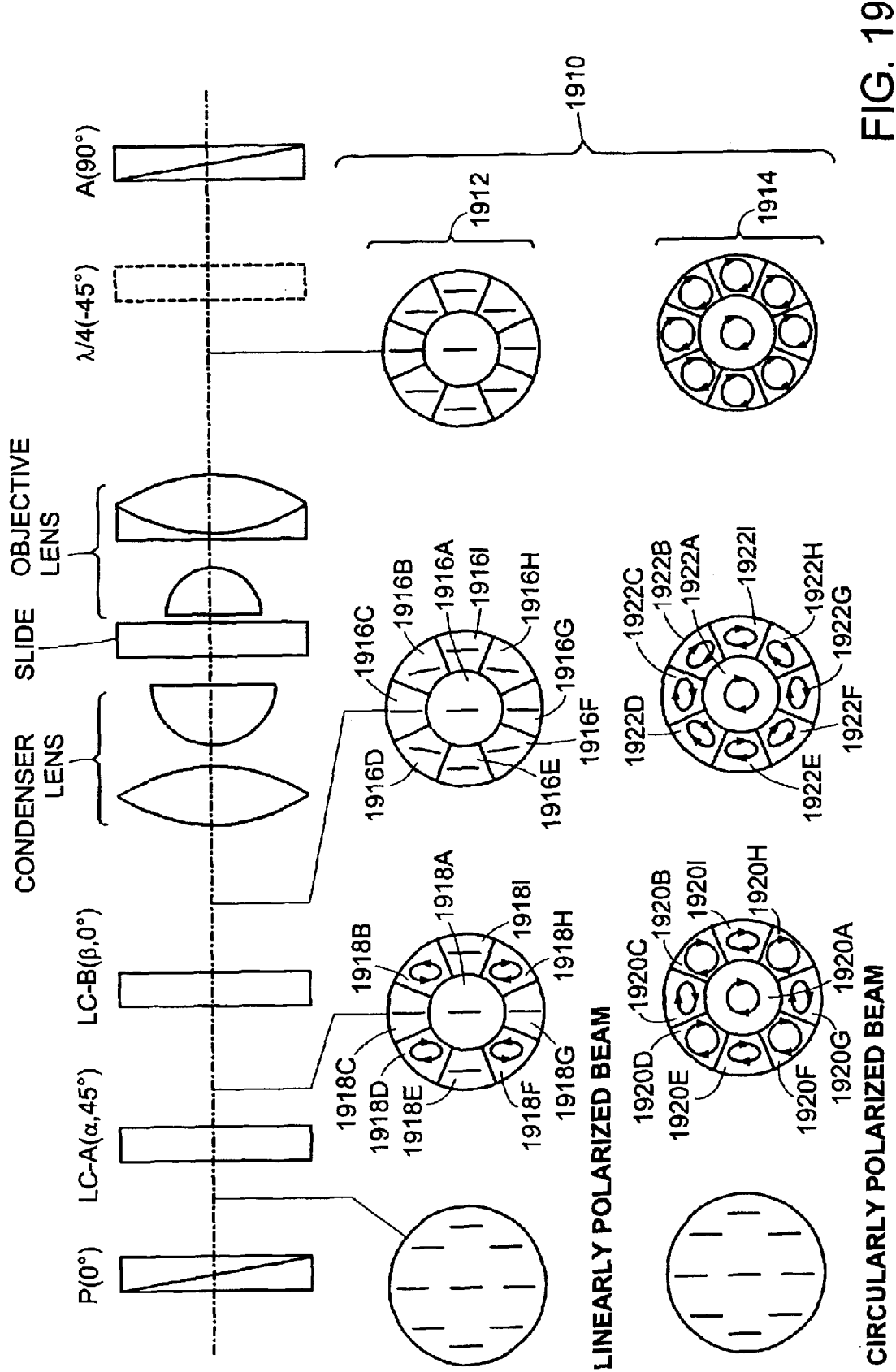

As noted above, a rectifier may use sectored universal compensators for correcting a beam with arbitrary polarization distribution, as illustrated in FIG. 19, which shows an optical system with a sample liquid crystal sectored rectifier. The sample rectifier includes two sectored liquid crystal retarders LC-A and LC-B. Each retarder is divided into one central circular sector and eight side sectors as shown in lower diagrams 1910 of FIG. 19. The slow axes of the sectors in a retarder have the same orientation. The slow axis of the first retarder LC-A is turned by 45 degrees with respect to the polarizer P.

The second retarder LC-B has the slow axis oriented parallel to the polarizer P. The retardance magnitude of each sector can be set independently of all of the other sectors. The lower diagrams 1910 under the optical schematic in FIG. 19 illustrate the polarization states of an initially linearly and circularly polarized beam when the radial differential transmittance is the dominant source of depolarization. When the optical system has additional radial retardance, the sectored compensator can also improve the extinction.

In the case of linear polarization (pertaining to diagrams 1912), the rectifier works as follows. The linearly polarized beam passes through the first retarder LC-A and then the second retarder LC-B. The retardance values of the central sector 1916A, 1918A and the horizontal and vertical side sectors 1916C, 1916G, 1916I, 1916E, 1918C, 1918G, 1918I, 1918E are adjusted so as not to change the polarization state of the beam. These sectors 1916A, 1916C, 1916G, 1916I, 1916E, 1918A, 1918C, 1918G, 1918I, 1918E have zero retardance for retarder LC-A and may have any retardance for retarder LC-B. The diagonal sectors 1916D, 1916B, 1916H, 1916F, 1918D, 1918B, 1918H, 1918F rotate the beam polarization as is shown in diagrams 1912 of FIG. 19. The magnitude of the rotation is chosen so as to obtain maximal or nearly maximal extinction for each diagonal sector 1916D, 1916B, 1916H, 1916F, 1918D, 1918B, 1918H, 1918F and is approximately $0.9\xi$.

$\xi$ represents the amount of rotation of the polarization plane of the marginal ray at the edge of the aperture and azimuth 45 degrees. Thus, retardance values of the diagonal sectors 1916D, 1916B, 1916H, 1916F, 1918D, 1918B, 1918H, 1918F are $\pm 1.8\xi$ for retarder LC-A and 90 degrees for retarder LC-B. For linearly polarized light, the second retarder LC-B can be replaced by a quarter wave plate. In this case only one sectored variable retarder plate is required.

For rectification of circularly polarized light, a circularly polarized beam is provided after the central sectors and elliptically polarized side beams as shown in diagrams 1914 of FIG. 19. The axes ratio of the polarization ellipses is $$\tan\left(45° - \frac{\xi}{2}\right).$$

This ratio is used to maximize the extinction for each side sector. In retarder LC-A, the central and diagonal sectors 1920A, 1920B, 1920D, 1920F, 1920H have 90 degree retardance, the horizontal sectors 1920E, 1920I have $90°-\xi$ retardance and the vertical sectors 1920C, 1920G have $90°+\xi$ retardance. The central sector 1922A and horizontal and vertical side sectors 1922C, 1922E, 1922G, 1922I of retarder LC-B do not change the polarization state of the beam and have zero retardance. The diagonal sectors 1922B, 1922D, 1922F, 1922H of retarder LC-B have retardance $90°\pm\xi$. Hence, the vibration ellipses of side beams have the small axis in the radial direction. The radial differential transmittance of the optical system squeeze the ellipses in the tangential direction and almost circularly polarized side beams fall on the circular polarizer that includes a quarter wave plate QWP(−45°) and a linear polarizer A(90).

FIGS. 5A, 5B show images of the sectored liquid crystal rectifier built into the front focal plane of the condenser lens of a microscope. In particular, FIGS. 5A, 5B include images of the liquid crystal sectored rectifier that is placed in the front focal plane of the 0.9 NA condenser lens in a Zeiss microscope Axiovert 200M equipped with a dry objective Plan-NEOFLUAR 40x/0,85Pol and left circular analyzer, with FIG. 5A showing sectors of a retarder having uniform retardance values and FIG. 5B showing sectors of a retarder having adjusted retardance values.

Having described embodiments of the present invention, it should be apparent that other modifications can be made without departing from the scope of the appended claims.

In other embodiments, other sectored variable retarders/electro-optic modulators, such as sectored Pockel cells, may also be used. Similarly, other light sources, e.g., incandescent lamps, light emitting diodes or lasers, may be used in place of mercury vapor lamps; monochromoters or the like may be used in lieu of an interference filter; and a general purpose two-dimensional detector maybe used in lieu of the video CCD camera and associated optics of the example embodiment.

All or part of apparatus and/or techniques as described above may be used in a system for receiving and imaging with reflected light, e.g., in epi-illumination microscopes for measurement of reflective specimens. In such epi-illumination microscopes, a single objective lens serves both as a condenser to illuminate the specimen and as an objective to collect the back-scattered light from the specimen and project an image on the video cameras. In these embodiments, a beam splitter, known to be specially designed for reflective polarized light microscopes to minimize polarization aberrations, is placed on the side of the objective away from the specimen (i.e., the objective lens is between the beam splitter and the specimen) to separate the illumination path from the imaging path.

Sectored variable retarders, polarizing analyzers, spatial light modulators and (depending on the particular embodiment) one or more other polarizing elements, may be placed in the illumination and imaging paths. Retarders, analyzers and other polarizing elements are positioned in corresponding positions in the illumination and imaging paths of reflective polarized light microscope systems.

What is claimed is:

1. A microscope system for determining optical properties of a specimen, comprising:
   a source of polarized light;
   a detector for detecting the intensity of light incident thereon;
   an optical path extending from said source to said detector;
   a condenser for providing light from the source to the specimen;
   an objective for receiving light from the specimen;
   a support for mounting the specimen;
   a first sectored variable retarder mounted in one of a focal plane and a conjugate plane of at least one of the objective and condenser in said optical path, the variable retarder having a plurality of sectors, each sector being individually addressable by a control signal that affects the light retardation characteristics of said sector;
   a polarized light analyzer mounted in said path between said first sectored variable retarder and said detector; and
   a second sectored variable retarder in said one of the focal plane and the conjugate plane of at least one of the objective and condenser in said optical path, the second sectored retarder having at least one sector, each sector being individually addressable by a control signal that affects the light retardation characteristics of said sector;
   wherein said sectored variable retarders are located between the polarized light source and the specimen, said polarized light analyzer being mounted in said path between the specimen and said detector.

2. The microscope system of claim 1, wherein said first and second sectored variable retarders are mounted with their slow axes at 45° to each other, together forming a sectored universal compensator.

3. A microscope system for determining optical properties of a specimen, comprising:

a source of polarized light;

a detector for detecting the intensity of light incident thereon;

an optical path extending from said source to said detector;

a condenser for providing light from the source to the specimen;

an objective for receiving light from the specimen;

a support for mounting the specimen;

a first sectored variable retarder mounted in one of a focal plane and a conjugate plane of at least one of the objective and condenser in said optical path, the first variable retarder having a plurality of sectors, each sector being individually addressable by a control signal that affects the light retardation characteristics of said sector;

a polarized light analyzer mounted in said path between said first sectored variable retarder and said detector; and in said one of a focal plane and said conjugate plane of at least one of said objective and condenser in said optical path, a second sectored variable retarder having at least one sector, each sector being individually addressable by a control signal that affects the light retardation characteristics of said sector;

wherein the specimen is located between the sectored variable retarders.

4. A microscope system for determining optical properties of a specimen, comprising:

a source of polarized light;

a detector for detecting the intensity of light incident thereon;

an optical path extending from said source to said detector;

a condenser for providing light from the source to the specimen;

an objective for receiving light, from the specimen;

a support for mounting the specimen;

a first sectored variable retarder mounted in one of a focal plane and a conjugate plane of at least one of the objective and condenser in said optical path, the first sectored variable retarder having a plurality of sectors, each sector being individually addressable by a control signal that affects the light retardation characteristics of said sector; and a polarized light analyzer mounted in said path between said first sectored variable retarder and said detector;

in said one of a focal plane and said conjugate plane of at least one of said objective and condenser in said optical path, a second sectored variable retarder having at least one sector, each sector being individually addressable by a control signal that affects the light retardation characteristics of said sector; and in said optical path third and fourth sectored variable retarders, each of the third and fourth retarders having at least one sector and each sector being individually addressable by a control signal that affects the light retardation characteristics of said sector, said third and fourth sectored variable retarders being mounted between second sectored variable retarder and said polarized light analyzer;

wherein said specimen is mounted between said second and third variable retarders.

5. A microscope system for determining optical properties of a specimen, comprising:

a source of polarized light;

a detector for detecting the intensity of light incident thereon;

an optical path extending from said source to said detector;

a condenser for providing light from the source to the specimen;

an objective for receiving light from the specimen;

a support for mounting the specimen;

a first sectored variable retarder mounted in one of a focal plane and a conjugate plane of at least one of the objective and condenser in said optical path, the first sectored variable retarder having a plurality of sectors, each sector being individually addressable by a control signal that affects the light retardation characteristics of said sector; and a polarized light analyzer mounted in said path between said sectored variable retarder and said detector; and in said one of a focal plane and said conjugate plane of at least one of said objective and condenser in said optical path, a second sectored variable retarder having at least one sector, each sector being individually addressable by a control signal that affects the light retardation characteristics of said sector;

wherein the source of polarized light includes a plurality of polarized light sources, each source being individually addressable by a control signal that affects the light intensity of said source.

6. A microscope system for determining optical properties of a specimen, comprising:

a source of polarized light;

a detector for detecting the intensity of light incident thereon, a optical path extending from said source to said detector, a condenser for providing light from the light source to a specimen;

an objective for receiving light from the specimen;

a support for mounting a specimen whose characteristics are to be measured;

a spatial light modulator having a plurality of sectors, each sector affecting the amplitude and/or direction of light impinging on said sector, the spatial light modulator positioned in one of a focal plane and a conjugate plane of at least one of the objective and condenser a sectored variable retarder in said optical path, the sectored variable retarder containing at least one sector, each sector being individually addressable by a control signal that affects the light retardation characteristics of said sector;

a polarized light analyzer mounted in said path between said sectored variable retarder and said detector; and a second sectored variable retarder having at least one sector, each sector being individually addressable by a control signal that affects the light retardation characteristics of said sector, wherein said second sectored variable retarder is positioned in said optical path between said first sectored variable retarder and said polarization analyzer;

wherein said spatial light modulator includes at least one rotatably mounted off-centered aperture stop.

7. The microscope system of claim 6, wherein the spatial light modulator includes two polarizers with one sectored variable retarder in between the two polarizers, the sectored variable retarder having a plurality of sectors, each sector being individually addressable by a control signal that affects the light retardation characteristics of said sector.

8. The microscope system of claim 6, wherein said spatial light modulator is mounted in said optical path between said specimen and said detector.

9. The microscope system of claim 8, further comprising:
third and fourth sectored variable retarders, each retarder having at least one sector, each sector being individually addressable by a control signal that affects the light retardation characteristics of said sector, said third and fourth sectored variable retarders being mounted in said optical path between the second sectored variable retarder and the polarization analyzer, with the specimen mounted between the second and third sectored variable retarder.

10. A microscope system for determining optical properties of a specimen, comprising:
a source of polarized light;
a detector for detecting the intensity of light incident thereon,
a optical path extending from said source to said detector,
a condenser for providing light from the light source to a specimen;
an objective for receiving light from the specimen;
a support for mounting a specimen whose characteristics are to be measured;
a spatial light modulator having a plurality of sectors, each sector affecting the amplitude and/or direction of light impinging on said sector, the spatial light modulator positioned in one of a focal plane and a conjugate plane of at least one of the objective and condenser
a first sectored variable retarder in said optical path, the first sectored variable retarder containing at least one sector, each sector being individually addressable by a control signal that affects the light retardation characteristics of said sector;
a polarized light analyzer mounted in said path between said first sectored variable retarder and said detector;
a second sectored variable retarder having at least one sector, each sector being individually addressable by a control signal that affects the light retardation characteristics of said sector, wherein said second sectored variable retarder is positioned in said optical path between said first sectored variable retarder and said polarization analyzer;
wherein said spatial light modulator includes interchangeable off-centered aperture stops.

11. A microscope system for determining optical properties of a specimen, comprising:
a source of polarized light;
a detector for detecting the intensity of light incident thereon,
a optical path extending from said source to said detector,
a condenser for providing light from the light source to a specimen;
an objective for receiving light from the specimen;
a support for mounting a specimen whose characteristics are to be measured;
a spatial light modulator having a plurality of sectors, each sector affecting the amplitude and/or direction of light impinging on said sector, the spatial light modulator positioned in one of a focal plane and a conjugate plane of at least one of the objective and condenser
a first sectored variable retarder in said optical path, the first sectored variable retarder containing at least one sector, each sector being individually addressable by a control signal that affects the light retardation characteristics of said sector;
a polarized light analyzer mounted in said path between said first sectored variable retarder and said detector;
a second sectored variable retarder having at least one sector, each sector being individually addressable by a control signal that affects the light retardation characteristics of said sector, wherein said second sectored variable retarder is positioned in said optical path between said first sectored variable retarder and said polarization analyzer;
wherein the spatial light modulator includes a wavefront beam splitter, being mounted in said optical path between said specimen and said detector.

12. A microscope system for determining optical properties of a specimen, comprising:
a source of polarized light;
a detector for detecting the intensity of light incident thereon,
a optical path extending from said source to said detector,
a condenser for providing light from the light source to a specimen;
an objective for receiving light from the specimen;
a support for mounting a specimen whose characteristics are to be measured;
a spatial light modulator having a plurality of sectors, each sector affecting the amplitude and/or direction of light impinging on said sector, the spatial light modulator positioned in one of a focal plane and a conjugate plane of at least one of the objective and condenser
a first sectored variable retarder in said optical path, the first sectored variable retarder containing at least one sector, each sector being individually addressable by a control signal that affects the light retardation characteristics of said sector;
a polarized light analyzer mounted in said path between said first sectored variable retarder and said detector;
a second sectored variable retarder having at least one sector, each sector being individually addressable by a control signal that affects the light retardation characteristics of said sector, wherein said second sectored variable retarder is positioned in said optical path between said first sectored variable retarder and said polarization analyzer;
wherein said spatial light modulator is mounted in said optical path between the polarized light source and the specimen.

13. The microscope system of claim 12, further comprising:
third and fourth sectored variable retarders, each retarder having at least one sector, each sector being individually addressable by a control signal that affects the light retardation characteristics of said sector, positioning said third and fourth sectored variable retarders in said optical path between the second sectored variable retarder and the polarization analyzer, with the specimen mounted between the second and third sectored variable retarder.

14. The microscope system of claim 12, further comprising:
a second spatial light modulator mounted in said optical path between said specimen and said detector.

15. The microscope system of claim 14, further comprising:
third and fourth sectored variable retarders, each retarder having at least one sector, each sector being individually addressable by a control signal that affects the light retardation characteristics of said sector, said third and fourth sectored variable retarders being mounted in said optical path between the second sectored variable retarder and the polarization analyzer, with the specimen mounted between the second and third sectored variable retarder.

16. A method for use in determining polarization optical properties of an object, the method comprising:
providing a source of polarized light;
providing a detector for detecting the intensity of light incident thereon;
providing an optical path between said source and said detector;
providing in one of a focal plane and a conjugate plane of an imaging lens in said optical path a first sectored variable retarder, the first sectored variable retarder having a plurality of sectors, each sector being individually addressable by a control signal that affects the light retardation characteristics of said sector;
providing in said one of a focal plane and said conjugate plane in said optical path a second, third and fourth sectored variable retarder, each retarder having at least one sector, each sector being individually addressable by a control signal that affects the light retardation characteristics of said sector;
providing a polarization analyzer in said optical path between said fourth sectored variable retarder and said detector;
providing a support for mounting an object whose optical characteristics are to be measured, said support being located in said optical path so that two sectored variable retarders are located on each side of the object;
configuring the light retardation characteristics of sectors of said first, second, third and fourth sectored variable retarder;
determining the intensity of light incident on said detector when said variable retarder sectors are configured for selected light retardation characteristics; and
determining polarization optical properties of the object, based on said light intensities being passed by the polarization analyzer and detected by the detector.

17. The method of claim 16, further comprising:
providing in said optical path a spatial light modulator, having a plurality of sectors, each sector affecting the amplitude and/or direction of light impinging on said sector;
determining polarization optical properties of said object, based on light intensities being passed by the polarization analyzer and detected by said detector when sectors of said spatial light modulator and first, second, third and fourth variable retarders are configured for selected light transmission and retardation characteristics.

18. The method of claim 17, further comprising:
providing in said optical path a second spatial light modulator, having a plurality of sectors, each sector affecting the amplitude and/or direction of light impinging on said sector, positioning said second spatial light modulator so that said object support is located between first and second spatial light modulator;
determining polarization optical properties of said object, based on light intensities being passed by the polarization analyzer and detected by said detector when sectors of said first and second spatial light modulator and first, second, third and fourth variable retarders are configured for selected light transmission and retardation characteristics.

19. A microscope system for determining optical properties of a specimen, comprising:
a source of polarized light including a plurality of polarized light sources, each source being individually addressable by a control signal that affects the light intensity of said source;
a detector for detecting the intensity of light incident thereon;
an optical path extending from said source to said detector;
a condenser for providing light from the source to the specimen;
an objective for receiving light from the specimen;
a support for mounting the specimen;
a sectored variable retarder mounted in said optical path, the variable retarder having a plurality of sectors, each sector being individually addressable by a control signal that affects the light retardation characteristics of said sector;
a polarized light analyzer mounted in said path between said sectored variable retarder and said detector; and
a second sectored variable retarder mounted in said optical path, the second sectored variable retarder having at least one sector, each sector being individually addressable by a control signal that affects the light retardation characteristics of said sector.

20. The microscope system of claim 18 wherein said first and second sectored variable retarders are mounted with their slow axes at 45° to each other, together forming a sectored universal compensator.

21. The microscope system of claim 18, wherein said sectored variable retarders are located between the polarized light source and the specimen, said polarized light analyzer being mounted in said path between the specimen and said detector.

22. The microscope system of claim 18, wherein said sectored variable retarders are located between the specimen and the detector.

23. The microscope system of claim 18, wherein the specimen is located between the sectored variable retarders.

24. The microscope system of claim 18, further comprising:
in said optical path third and fourth sectored variable retarders, each retarder having at least one sector and each sector being individually addressable by a control signal that affects the light retardation characteristics of said sector, said third and fourth sectored variable retarders being mounted between second sectored variable retarder and said polarized light analyzer; and wherein said specimen is mounted between said second and third variable retarder.

25. A microscope system for determining optical properties of a specimen, comprising:
- a source of polarized light;
- a detector for detecting the intensity of light incident thereon,
- a optical path extending from said source to said detector,
- a condenser for providing light from the light source to a specimen;
- an objective for receiving light from the specimen;
- a support for mounting a specimen whose characteristics are to be measured;
- a spatial light modulator having a plurality of sectors, each sector affecting the amplitude and/or direction of light impinging on said sector, said spatial light modulator includes at least one rotatably mounted off-centered aperture stop;
- a sectored variable retarder in said optical path, the sectored variable retarder containing at least one sector, each sector being individually addressable by a control signal that affects the light retardation characteristics of said sector; and
- a polarized light analyzer mounted in said path between said sectored variable retarder and said detector.

26. The microscope system of claim 25, further comprising:
- a second sectored variable retarder having at least one sector, each sector being individually addressable by a control signal that affects the light retardation characteristics of said sector, wherein said second sectored variable retarder is positioned in said optical path between said first sectored variable retarder and said polarization analyzer.

27. The microscope system of claim 26, wherein the spatial light modulator includes two polarizers with one sectored variable retarder in between the two polarizers, the sectored variable retarder having a plurality of sectors, each sector being individually addressable by a control signal that affects the light retardation characteristics of said sector.

28. The microscope system of claim 26, wherein said spatial light modulator is mounted in said optical path between the polarized light source and the specimen.

29. The microscope system of claim 28, further comprising:
- third and fourth sectored variable retarders, each retarder having at least one sector, each sector being individually addressable by a control signal that affects the light retardation characteristics of said sector, positioning said third and fourth sectored variable retarders in said optical path between the second sectored variable retarder and the polarization analyzer, with the specimen mounted between the second and third sectored variable retarder.

30. The microscope system of claim 26, wherein said spatial light modulator is mounted in said optical path between said specimen and said detector.

31. A microscope system for determining optical properties of a specimen, comprising:
- a source of polarized light;
- a detector for detecting the intensity of light incident thereon,
- a optical path extending from said source to said detector,
- a condenser for providing light from the light source to a specimen;
- an objective for receiving light from the specimen;
- a support for mounting a specimen whose characteristics are to be measured;
- a spatial light modulator having a plurality of sectors, each sector affecting the amplitude and/or direction of light impinging on said sector, said spatial light modulator including interchangeable off-centered aperture stops;
- a sectored variable retarder in said optical path, the sectored variable retarder containing at least one sector, each sector being individually addressable by a control signal that affects the light retardation characteristics of said sector; and
- a polarized light analyzer mounted in said path between said sectored variable retarder and said detector.

32. A microscope system for determining optical properties of a specimen, comprising:
- a source of polarized light;
- a detector for detecting the intensity of light incident thereon,
- a optical path extending from said source to said detector,
- a condenser for providing light from the light source to a specimen;
- an objective for receiving light from the specimen;
- a support for mounting a specimen whose characteristics are to be measured;
- a spatial light modulator having a plurality of sectors, each sector affecting the amplitude and/or direction of light impinging on said sector, the spatial light modulator including a wavefront beam splitter, being mounted in said optical path between said specimen and said detector;
- a sectored variable retarder in said optical path, the sectored variable retarder containing at least one sector, each sector being individually addressable by a control signal that affects the light retardation characteristics of said sector; and
- a polarized light analyzer mounted in said path between said sectored variable retarder and said detector.

33. A microscope system for determining optical properties of a specimen, comprising:
- a source of polarized light;
- a detector for detecting the intensity of light incident thereon,
- a optical path extending from said source to said detector,
- a condenser for providing light from the light source to a specimen;
- an objective for receiving light from the specimen;
- a support for mounting a specimen whose characteristics are to be measured;
- a spatial light modulator having a plurality of sectors, each sector affecting the amplitude and/or direction of light impinging on said sector;
- a sectored variable retarder in said optical path, the sectored variable retarder containing at least one sector, each sector being individually addressable by a control signal that affects the light retardation characteristics of said sector;
- a second sectored variable retarder having at least one sector, each sector being individually addressable by a control signal that affects the light retardation characteristics of said sector, wherein said second sectored variable retarder is positioned in said optical path between said first sectored variable retarder and said polarization analyzer;

third and fourth sectored variable retarders, each retarder having at least one sector, each sector being individually addressable by a control signal that affects the light retardation characteristics of said sector, said third and fourth sectored variable retarders being mounted in said optical path between the second sectored variable retarder and the polarization analyzer, with the specimen mounted between the second and third sectored variable retarder; and a polarized light analyzer mounted in said path between said sectored variable retarder and said detector.

34. The microscope system of claim 33, further comprising:

a second spatial light modulator mounted in said optical path between said specimen and said detector.

35. The microscope system of claim 33, wherein said spatial light modulator is mounted in said optical path between the polarized light source and the specimen.

36. A method for use in determining polarization optical properties of an object, the method comprising:

providing a source of polarized light;

providing a detector for detecting the intensity of light incident thereon;

providing an optical path between said source and said detector;

providing in said optical path a first sectored variable retarder, having a plurality of sectors, each sector being individually addressable by a control signal that affects the light retardation characteristics of said sector;

providing in said optical path a second, third and fourth sectored variable retarder, each retarder having at least one sector, each sector being individually addressable by a control signal that affects the light retardation characteristics of said sector;

providing a polarization analyzer in said optical path between said fourth sectored variable retarder and said detector;

providing a support for mounting an object whose optical characteristics are to be measured, said support being located in said optical path so that two sectored variable retarders are located on each side of the object;

configuring the light retardation characteristics of sectors of said first, second, third and fourth sectored variable retarder;

determining the intensity of light incident on said detector when said variable retarder sectors are configured for selected light retardation characteristics;

providing in said optical path a spatial light modulator, having a plurality of sectors, each sector affecting the amplitude and/or direction of light impinging on said sector; and determining polarization optical properties of said object, based on light intensities being passed by the polarization analyzer and detected by said detector when sectors of said spatial light modulator and first, second, third and fourth variable retarders are configured for selected light transmission and retardation characteristics.

37. The method for use in determining polarization optical properties of claim 36 further comprising:

providing in said optical path a second spatial light modulator, having a plurality of sectors, each sector affecting the amplitude and/or direction of light impinging on said sector, positioning said second spatial light modulator so that said object support is located between first and second spatial light modulator; and determining polarization optical properties of said object, based on light intensities being passed by the polarization analyzer and detected by said detector when sectors of said first and second spatial light modulator and first, second, third and fourth variable retarders are configured for selected light transmission and retardation characteristics.

* * * * *